(12) United States Patent
Di Trapani

(10) Patent No.: US 10,267,492 B2
(45) Date of Patent: Apr. 23, 2019

(54) ILLUMINATION DEVICE FOR SYNTHESIZING LIGHT FROM AN OBJECT AT VIRTUALLY INFINITE DISTANCE

(71) Applicant: CoeLux S.r.l., Como (CO) (IT)

(72) Inventor: Paolo Di Trapani, Cavallasca (IT)

(73) Assignee: CoeLux S.r.l., Como (IT)

( * ) Notice: Subject to any disclaimer, the term of this patent is extended or adjusted under 35 U.S.C. 154(b) by 82 days.

(21) Appl. No.: 14/711,586

(22) Filed: May 13, 2015

(65) Prior Publication Data

US 2015/0330607 A1    Nov. 19, 2015

Related U.S. Application Data

(63) Continuation of application No. PCT/EP2013/073894, filed on Nov. 14, 2013, and a
(Continued)

(30) Foreign Application Priority Data

Jul. 15, 2013   (EP) ..................... 13176571

(51) Int. Cl.
*F21V 7/04* (2006.01)
*F21V 13/14* (2006.01)
(Continued)

(52) U.S. Cl.
CPC .............. *F21V 13/14* (2013.01); *F21V 5/045* (2013.01); *F21V 7/045* (2013.01); *F21V 13/12* (2013.01);
(Continued)

(58) Field of Classification Search
CPC .......... F21V 13/14; F21V 7/045; F21V 5/045; B02B 6/0023; B02B 6/0046; B02B 6/0055
(Continued)

(56) References Cited

U.S. PATENT DOCUMENTS 3,302,016 A    1/1967 Larraburu
5,719,706 A *  2/1998 Masumoto ........... G02B 3/0056
                                                        348/E5.141
(Continued)

FOREIGN PATENT DOCUMENTS

CN    102341641 A    2/2012
EP    1744197         1/2007
(Continued)

OTHER PUBLICATIONS

International Search Report & Written Opinion, equivalent PCT Application No. PCT/EP2013/073894, dated Apr. 3, 2014, 24 pages.
(Continued)

*Primary Examiner* — Anh T Mai
*Assistant Examiner* — Matthew J. Peerce
(74) *Attorney, Agent, or Firm* — DiBerardino McGovern IP Group LLC

(57) ABSTRACT

An illumination device for synthesizing light from an object at virtually infinite distance comprises a primary light source configured to emit a primary light, a concentrator positioned downstream the primary light source and configured to reduce the divergence of the primary light, an emitting surface positioned downstream the concentrator, and an absorber made of light-absorbing material positioned upstream the emitting surface and configured to absorb light rays which cross the emitting surface in an upstream direction and which, in the absence of the absorber would not be directed toward the primary light source, wherein the primary light source, the concentrator, the emitting surface and the absorber are configured so that they produces from the primary light an output light that exits the emitting surface with a luminance profile which is spatially uniform across the emitting surface, and has a narrow peak in the polar-angle distribution around an output-light direction.

33 Claims, 20 Drawing Sheets

Related U.S. Application Data continuation of application No. PCT/EP2012/072648, filed on Nov. 14, 2012.

(51) Int. Cl.
| | | |
|---|---|---|
| *F21V 8/00* | (2006.01) | |
| *F21V 5/04* | (2006.01) | |
| *G02B 19/00* | (2006.01) | |
| *F21V 13/12* | (2006.01) | |
| *F21V 5/00* | (2018.01) | |
| *F21V 7/00* | (2006.01) | |
| *F21Y 105/10* | (2016.01) | |
| *F21Y 115/10* | (2016.01) | |

(52) U.S. Cl.
CPC ......... *G02B 6/0023* (2013.01); *G02B 6/0046* (2013.01); *G02B 6/0055* (2013.01); *G02B 6/0061* (2013.01); *G02B 19/0014* (2013.01); *G02B 19/0028* (2013.01); *G02B 19/0066* (2013.01); *F21V 5/007* (2013.01); *F21V 7/0083* (2013.01); *F21Y 2105/10* (2016.08); *F21Y 2115/10* (2016.08); *G02B 6/0031* (2013.01); *G02B 6/0038* (2013.01); *G02B 6/0053* (2013.01); *G02B 6/0068* (2013.01)

(58) Field of Classification Search
USPC .......................................... 362/608
See application file for complete search history.

(56) References Cited

U.S. PATENT DOCUMENTS

| | | | | |
|---|---|---|---|---|
| 6,402,347 | B1 * | 6/2002 | Maas ............... | F21V 5/007 315/312 |
| 6,771,419 | B1 * | 8/2004 | Yamagishi ........... | G03B 21/62 348/E9.025 |
| 6,971,748 | B2 * | 12/2005 | Cho .................... | G02B 5/045 348/E9.027 |
| 7,575,358 | B2 | 8/2009 | Suzuki et al. | |
| 8,068,285 | B1 | 11/2011 | Flynn | |
| 8,100,540 | B2 | 1/2012 | Huebner | |
| 8,469,550 | B2 | 6/2013 | Di Trapani et al. | |
| 9,022,589 | B2 * | 5/2015 | Minami ................ | G02B 6/005 362/2 |
| 9,476,567 | B2 | 10/2016 | Seuntiens et al. | |
| 2005/0051706 | A1 | 3/2005 | Witney et al. | |
| 2006/0228070 | A1 * | 10/2006 | Davis ................. | G02B 6/29311 385/16 |
| 2009/0284685 | A1 | 11/2009 | Yamaguchi | |
| 2010/0061090 | A1 | 3/2010 | Bergman et al. | |
| 2010/0118540 | A1 * | 5/2010 | Destain ................ | G02B 27/102 362/293 |
| 2011/0194270 | A1 * | 8/2011 | Di Trapani ............ | G02B 6/001 362/2 |
| 2012/0014085 | A1 | 1/2012 | Minami | |
| 2013/0003341 | A1 * | 1/2013 | Kubo ...................... | F21S 8/006 362/1 |
| 2014/0133125 | A1 | 5/2014 | Di Trapani et al. | |
| 2015/0109773 | A1 * | 4/2015 | Li .......................... | F21V 5/007 362/231 |
| 2015/0184812 | A1 | 7/2015 | Van Bommel et al. | |
| 2016/0363777 | A1 | 12/2016 | Flynn et al. | |
| 2017/0074486 | A1 | 3/2017 | Flynn et al. | |

FOREIGN PATENT DOCUMENTS

| | | |
|---|---|---|
| EP | 2442015 | 4/2012 |
| EP | 2549178 | 1/2013 |
| GB | 2450192 C | 12/2008 |
| JP | 2002184206 A | 6/2002 |
| JP | 2010067441 A | 3/2010 |
| JP | 2012059584 A | 3/2012 |
| WO | 2007123134 A1 | 11/2007 |
| WO | 2009156347 | 12/2009 |
| WO | 2009156348 | 12/2009 |
| WO | 2010122468 | 10/2010 |
| WO | 2011115030 | 9/2011 |
| WO | 2012091975 A1 | 7/2012 |
| WO | 2012140579 | 10/2012 |
| WO | 2014076217 | 5/2014 |
| WO | 2014076218 | 5/2014 |

OTHER PUBLICATIONS

International Preliminary Report on Patentability, equivalent PCT Application No. PCT/EP2013/073894, dated May 23, 2015, 17 pages.
International Search Report & Written Opinion, equivalent PCT Application No. PCT/EP2012/072648, dated Apr. 3, 2014, 13 pages.
International Preliminary Report on Patentability, equivalent PCT Application No. PCT/EP2012/072648, dated Mar. 5, 2015, 11 pages.
Office Action in counterpart Japanese Patent Application No. 2015-542172, dated Aug. 23, 2016, 20 pages total (including English translation of 10 pages).
Office Action issued by the State Intellectual Property Office (SIPO) in counterpart Chinese Patent Application No. 201280078131.0, dated Oct. 10, 2016, 5 pages.

* cited by examiner

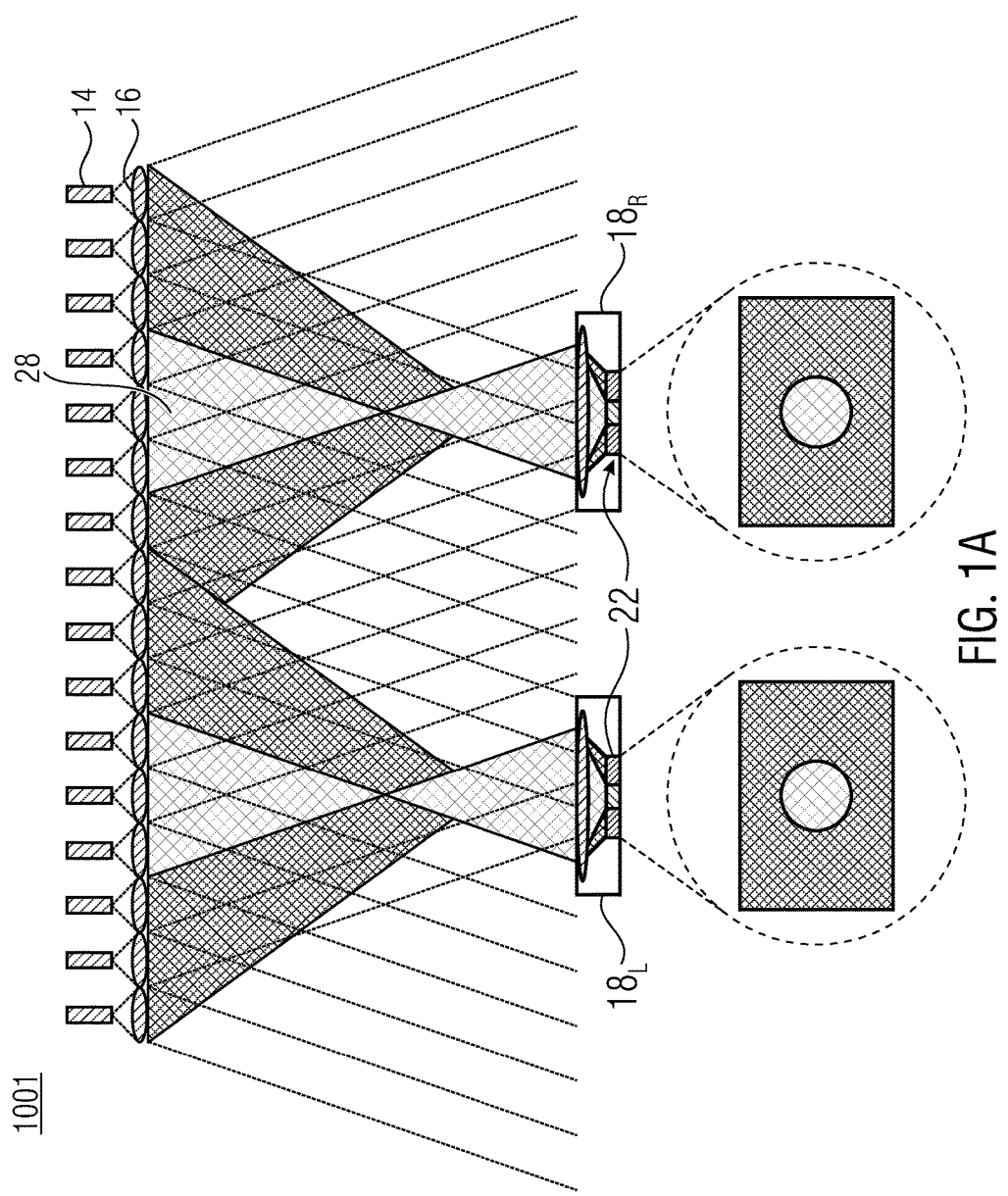

ILLUMINATION DEVICE FOR SYNTHESIZING LIGHT FROM AN OBJECT AT VIRTUALLY INFINITE DISTANCE

CROSS-REFERENCE TO RELATED APPLICATIONS

This application is a continuation of copending International Application No. PCT/EP2013/073894, filed Nov. 14, 2013, which is incorporated herein by reference in its entirety, and additionally claims priority from WO Application No. PCT/EP2012/072648, filed Nov. 14, 2012, and EP Application No. 13 176 571.1, filed Jul. 15, 2013, both of which are incorporated herein by reference in their entirety.

The present invention is concerned with an illumination device which realizes the perception of the natural light from an object in virtually infinite distance like the sun or moon.

BACKGROUND OF THE INVENTION

More precisely, the perception of the natural light from an object at infinite distance like the sun or moon is related both to the capacity of the illumination device to illuminate an ambient with effects very similar to the effects that would manifest in the same room if an aperture with the object such as moon or sun beyond it, i.e. a window, would be positioned at the same place, and also to the appearance of the device itself when directly viewing at it, which creates the visual appearance of infinite depth related to the position at virtually infinite distance of the object.

Therefore the aims which the embodiments of the present invention fulfill may be divided into two main categories, related to the illumination of an ambient by the light emitted by the artificial illumination device;

the visual appearance of the illumination device itself.

For the requirement concerning the illumination of an ambient for the perception of natural light from sun, reference can be made to artificial illumination devices described in WO 2009/156347 A1 submitted by the same Applicant. One of these artificial illumination devices, for example, is shown in FIG. 19. Same comprises a broadband, spot like, light source 902 and a Rayleigh scattering panel 906 placed at a certain distance from the source 902

As long as the light source 902 is small in comparison to the panel 906, the output light 907 is able to cast object shadows, which are bluish under the diffused cold light caused by the panel 906

However the rays 907 forming the output light component are by far not parallel, as light is from natural illumination by the sun, since they all diverge from the single source. Notably, this circumstance prevents object shadows from having parallel orientations, as it occurs in the case of the natural sun. In fact each object casts onto an illuminated plane a shadow which is oriented toward the projection of the source 902 onto said illuminated plane. For example, in the typical case where the light source 902 is positioned along the normal of the illuminated plane (e.g. a floor or a wall) passing through the center of the diffuser 906, shadows of elongated objects with axis perpendicular to said plane are oriented toward the center of the illuminated scene, contrary to what occurs in nature. This fact thus prevents these illumination devices from faithfully achieving the visual characteristics of an ambient illuminated by natural sun.

Moreover, these devices do not properly satisfy the requirements concerning the visual appearance of the illumination device itself when directly viewing at it. In fact, an observer who sees the source through the panel 906 does not see it at infinity, but at the given spatial position at which the light source 902 is positioned. The divergence of the direct-light rays 907 implies that neither the direction under which the spot of the artificial sun is seen nor the aperture angle (penumbra) is fixed, but they depend on the observer's position and on his/her distance from the source. Such visual cues prevent the observer to naturally interpret the light source as located at infinite distance, i.e. the visual cues prevents the sun scene from being perceived as having infinite depth, the source itself defining the limit depth of the scene. All these circumstances make the resulting effect not natural, in the sense that it differs from the effect produced by the actual sun or moon. A prevailing infinite depth perception of the sun image generated by the illumination device when viewing directly at it is thus one of the aims concerning the visual appearance of the present invention.

The presence of intra-conflicts in the visual perception cues afflicts for example a further artificial illumination device presented in the above mentioned WO 2009/156347 A1, shown in FIG. 20. In this layout the light source 902 is made of an extended array of white light light-emitting diodes (LEDs) 910, with each single LED 910 comprising a blue/UV emitter, a phosphor and a collimating dome lens so that each LED 910 generates a white light cone with limited divergence, i.e. with a divergence smaller than the divergence of the light scattered by the Rayleigh panel 906. However, as will be further described in the following, such illumination device depicted in FIG. 20 features an intra-conflict between two different planes perceived by an observer. These planes are the real image of the LED 910 array and the virtual image of the sun spot at infinity.

A further artificial illumination device presented in the aforementioned WO pamphlet is shown in FIG. 21. Here, a light source 990 and the chromatic diffuser 992 are totally separated and spaced apart from each other with the chromatic diffuser forming a window of a wall 994 of a house 996. However, due to the arrangement chosen, shadows cast by the device of FIG. 21 show the typical radially symmetric outwardly pointing behavior resulting from an illumination using a single light source at a limited distance. Last but not least, the ambient light which enters the observer's eyes from the chromatic diffuser without stemming from light source 990, but from ambient light, i.e. from the environment external to the house, spoils the large depth of field effect which the observer would experience if the light source is seen against a dark background.

As a matter of facts, the possibility that an illumination device induces a perception of a substantially enhanced depth of field involves not only that the observer perceives a real or virtual image of a light source at very large, e.g. at virtually infinite distance, but also that he/she sees said light source surrounded by a wide, dark and uniform background. In fact, only in this case the perceived distance of the light source is dragged over the entire background. i.e. over the entire solid angle subtended by said background. As a consequence, the overall enhancement in the perceived depth of field increases with the increase of the solid angle under which said dark and uniform background is observed. In contrast, if the background surrounding the light source is luminous and not uniform, the observer looking at said background focuses its visual attention at the physical plane where the background is located. As a consequence, a conflict between visual cues at finite and virtually infinite distance arises and the desired source-induced enhancement of the depth of field is spoiled. Notably, the level of uniformity in the background luminance needed to preserve the depth of field increases with the increase of its average luminance. In other terms, background luminance fluctuations are less relevant for a dark than for a bright background. In a particular embodiment, the presence of a bluish luminous and uniform background might be considered without the risk of spoiling the depth perception due to the depth enhancement effect induced by the aerial-perspective visual cue (see below), which tends to locate bluish scenarios at far distance from the observer.

SUMMARY

According to an embodiment, an illumination device for synthesizing natural light from the moon with making an observer experience a visual infinite depth perception of an image the moon when the observer directly looks at said illumination device may have: a primary light source configured to emit a primary light; and a concentrator positioned downstream the primary light source and configured to collimate the primary light; and an emitting surface positioned downstream the concentrator; and an absorber made of light-absorbing material positioned upstream the emitting surface and configured to absorb light rays which cross the emitting surface in an upstream direction and which, in the absence of the absorber would not be directed toward the primary light source; wherein primary light source, concentrator, emitting surface and absorber are configured so that they produce from the primary light an output light that exits the emitting surface with a luminance profile $L(x, y, \vartheta, \varphi)$ which:
  (i) is spatially uniform across the emitting surface,
  (ii) is substantially independent from the azimuthal direction,
  (iii) has a narrow peak in the polar-angle distribution around the output-light direction
  (iv) has a low background for observation directions corresponding to polar angle outside the narrow peak.

According to another embodiment, an illumination device for synthesizing light from an object at virtually infinite distance may have: a plurality of pairs of a primary light source element configured to emit a primary light; and a concentrator element configured to collimate the primary light into a output-light direction; and an emitting surface positioned downstream the concentrators; and an absorber made of light-absorbing material positioned upstream the emitting surface and configured to absorb light rays which cross the emitting surface in an upstream direction and which, in the absence of the absorber would not be directed toward the primary light source; wherein the primary light source and the concentrator of the plurality of pairs, the emitting surface and the absorber are configured so that they produce from the primary light an output light that exits the emitting surface along the output-light direction so that an observer sees, when looking towards the emitting surface, a bright spot which, when the observer moves relative to the light-emitting surface, moves relative to the emitting surface as if the bright spot stemmed from an object positioned at infinity.

According to another embodiment, an illumination device for synthesizing light from an object at virtually infinite distance may have: a plurality of triplets of a primary light source element configured to emit primary light; and a collimating lens and a concave reflector both having the primary light source element positioned therebetween and configured to focus the primary light from the primary source element in order to create a beam waist upstream of the collimating lens; and a pin hole in an absorbing layer, the pin hole positioned so that the pin-hole is located at the beam waist, an emitting surface positioned downstream the collimating lenses; and wherein the primary light source element, the collimating lens and the concave reflector of the plurality of triplets, the emitting surface and the absorbing layer are configured so that they produce from the primary light an output light that exits the emitting surface along the output-light direction so that an observer sees, when looking towards the emitting surface, a bright spot which, when the observer moves relative to the light-emitting surface, moves relative to the emitting surface as if the bright spot stemmed from an object positioned at infinity.

Another embodiment may have an artificial illumination device for reproducing the natural light of the sun and the sky having an illumination-device according to claim 1 and a layer of a Rayleigh-like scattering material which advantageously scatters short-wavelength components of the impinging radiation with respect to the long-wavelength components, wherein said layer of Rayleigh-like scattering material is positioned downstream the illumination-device.

Another embodiment may have an artificial illumination device for reproducing the natural light of the sun and the sky having an illumination-device according to claim 1 and an edge-lit diffusing panel lit by a secondary light source with Correlated Color Temperature (CCT) at least 1.2 times larger than a CCT of the primary light source, wherein said edge-lit diffusing panel is positioned downstream the illumination-device.

Another embodiment may have an system made-up by a juxtaposition of a plurality of the illumination devices according to claim 1 so that the output light direction is equal for the plurality of the illumination devices.

Another embodiment may have an method for synthesizing natural light from the moon, using an illumination device, with making an observer experience a visual infinite depth perception of an image of the moon when the observer directly looks at said illumination device, which illumination device may have: a primary light source configured to emit a primary light; and a concentrator positioned downstream the primary light source and configured to collimate the primary light; and an emitting surface positioned downstream the concentrator; and an absorber made of light-absorbing material positioned upstream the emitting surface and configured to absorb light rays which cross the emitting surface in an upstream direction and which, in the absence of the absorber would not be directed toward the primary light source; wherein primary light source, concentrator, emitting surface and absorber are configured so that they produce from the primary light an output light that exits the emitting surface with a luminance profile $L(x, y, \vartheta, \varphi)$ which:
  (i) is spatially uniform across the emitting surface,
  (ii) is substantially independent from the azimuthal direction,
  (iii) has a narrow peak in the polar-angle distribution around the output-light direction
  (iv) has a low background for observation directions corresponding to polar angle outside the narrow peak.

According to some embodiments, an artificial illumination device generates natural light similar to that from the sun and the sky. The artificial illumination device includes a direct-light source having a first emitting surface and configured to produce, from a primary light, a direct light that exits the first emitting surface into a direct-light direction at low divergence. The direct-light source includes a plurality of pairs of a first light-emitting devices positioned upstream of the first emitting surface and configured to emit the primary light. The direct-light source also includes a collimator configured to collimate the primary light emitted by the first light-emitting device along the direct-light direction. The artificial illumination device also includes a diffused-light generator configured to cause or produce diffused light at a second emitting surface. One of the first emitting surface and the second emitting surface is positioned downstream with respect to the other and forms an outer emitting surface of the artificial illumination device, or both the first emitting surface and the second emitting surface coincide to form the outer emitting surface of the artificial illumination device. The artificial illumination device is configured such that the direct-light source and the diffused-light generator co-operate to form outer light at the outer emitting surface, which comprises a first light component, which propagates within a low divergence cone along the direct light direction and a second light component, which propagates along directions outside the low divergence cone. The first light component has a correlated color temperature (CCT) that is lower than a CCT of the second light component so that an observer sees, when looking towards the first emitting surface, a bright spot surrounded by a bluish background which mimics the sky. The bright spot has a lower CCT, and corresponds to the sun and is moving, when the observer moves relative to the first emitting surface as if the bright spot stemmed from an object positioned at infinity.

Implementations can include one or more of the following features. For example, the diffused light can have a CCT that is higher than a CCT of the direct light. The direct light can have a CCT that is greater than or equal to the CCT of the first light component. The diffused-light generator can include a diffused-light source that includes a second light-emitting device, where the diffused-light source is configured to emit the diffused light independently from the direct-light source. The diffused-light source can include an edge-illuminated scattering diffuser or an OLED. A CCT of at least one of the direct-light source or the diffused-light source can be controllable.

The diffused-light generator can include a diffuser positioned so as to be lit by the direct-light or the primary light or an intermediate light evolving from the primary light and resulting in the direct-light, and configured to scatter the direct-light or the primary light or the intermediate light by which the diffuser is lit, with a scattering efficiency that is higher for shorter wavelengths within the visible wavelength region than compared to longer wavelengths. The diffuser can include a solid matrix of a first material having a dispersion of nanoparticles of a second material configured to obtain a light-scattering efficiency that is higher for shorter wavelengths within the visible wavelength region than compared to longer wavelengths. The dispersion of nanoparticles features a gradient in the nanoparticle area concentration across a second emitting surface, the gradient being tailored for improving a luminance uniformity of the diffused light over the second emitting surface relative to a uniformity of an illuminance of the direct-light or the primary light or the intermediate light by which the diffused-light generator is lit.

The direct-light source can be configured such that the narrow peak in the angular distribution forces the two eyes of an observer looking at the direct-light source to be aligned along parallel directions so that the observer sees the bright spot under a narrow visual cone angle, the spot being perceived at infinite distance both with respect to binocular-convergence and motion-parallax depth cues.

The artificial illumination device can include an absorber upstream from the first emitting surface and made of light-absorbing material arranged so that the first emitting surface has a total reflectance factor $\eta_r$ less than or equal to 0.4.

The artificial illumination device can include an absorber made of light-absorbing material positioned downstream from the first light-emitting device and upstream from the first emitting surface and configured to substantially absorb light rays that cross the first emitting surface in an upstream direction and that, in the absence of the absorber would not be directed toward the first light-emitting device.

The diffused-light generator can be positioned downstream from the first emitting surface. The direct-light source can be configured to produce the direct light such that the direct light exits the first emitting surface with a luminance profile that has a narrow peak in the angular distribution around the direct-light direction, the narrow peak being subtended by a solid angle smaller than 0.2 steradians (sr).

The plurality of pairs can be positioned in juxtaposition with the collimators of the pairs abutting each other so that the collimators form a joint surface. For each pair, a collimators' aperture can be greater than 300 cm$^2$.

The artificial illumination device can include a coffered ceiling structure positioned downstream of the outer emitting surface, wherein the coffered ceiling structure has a first periodicity that is an integer multiple or unit fraction of a second periodicity at which the pairs of the plurality of pairs are arranged along the outer emitting surface. The direct-light direction can be oblique to a normal of the outer emitting surface. The direct light direction can be oblique with respect to more than 90% of the outer surface of the coffered ceiling structure. An outer surface of the coffered ceiling structure can have an absorption coefficient for visible light less than 50%. A projection of the coffered ceiling structure onto the first emitting surface along the direct-light direction can cover less than 50% of an area spanned by the first emitting surface. The coffered ceiling structure can protrude, perpendicular to the first emitting surface, by less than a period length of the coffered ceiling structure from the first emitting surface.

The artificial illumination device can include a dark box having a top face coinciding an aperture of the collimators and a bottom face into apertures of which the first light-emitting devices are integrated. An internal surface of the dark box can be formed by a light-absorbing material and the light-absorbing material can have an absorption coefficient for visible light greater than 90%.

The collimator can be a Fresnel lens. The first light-emitting device can include an LED.

The artificial illumination device can include a freeform concentrator or a freeform lens configured to flatten an illuminance distribution of the primary light onto the collimator. A freeform lens can be positioned between the first light-emitting device and the collimator, the freeform lens being configured to flatten an illuminance distribution of the primary light onto the collimator.

The first light-emitting device can have a circular aperture.

The direct-light source can include a micro-optics beam-homogenizer layer positioned downstream the pairs' collimators, wherein the micro-optics beam-homogenizer layer is configured to reduce a stray light component of light pre-collimated by the pairs' collimators.

The micro-optics beam-homogenizer layer can include a 2-dimensional array of microlenses and a light-absorbing layer perforated by a 2-dimensional array of pinholes positioned and extending downstream the 2-dimensional array of microlenses so that each microlens has a pinhole associated therewith that is positioned at a distance to the respective microlens corresponding to a focal length of the respective microlens and at a direction coincident with the direct light direction. The ratio between a diameter $D_m$ and a focal length $f_m$ of the microlenses can be $D_m/f_m < 2\tan(7.5°)$, and the diameter can be $D_m < 5$ mm.

The microlenses can have a circular aperture.

The micro-optics beam-homogenizer layer can include a channel separation structure configured to reduce cross-talk between neighboring pairs of microlenses and the associated pinholes.

Space between the microlenses can include a material that absorbs light impinging onto the space between the lenses. A pitch of the arrays of microlenses and pinholes can be below 5 mm.

The micro-optics beam-homogenizer layer can include a 2-dimensional array of microlenses and a channel separation structure of a 2-dimensional array of micro-channels extending downstream the 2-dimensional array of microlenses so that each microlens has a micro-channel associated therewith, which extends, from the respective microlens, into the direct-light direction. A ratio between a diameter $D_m$ of the microlenses and a focal length $f_m$ of the microlenses can be $D_m/f_m < 2 \cdot \tan(7.5°)$, wherein $D_m < 5$ mm, and wherein for each microlens, an output aperture of the associated micro-channel is spaced apart from the respective microlens, at a distance l with $0.5\,f_m < l < 1.2\,f_m$.

The micro-optics beam-homogenizer layer can include a first 2-dimensional array of microlenses of focal length $f_{m1}$, a second 2-dimensional array of microlenses of focal length $f_{m2}$, and an absorbing layer perforated by an array of pinholes arranged between the first and second arrays of micro lenses so as to form an array of telescopes distributed over a plane parallel to a plane of the first emitting surface and having their telescope axis parallel to each other and parallel to the direct light direction. In each telescope, the respective pinhole, the respective microlens of the first 2-dimensional array and the respective microlens of the second 2-dimensional array can be arranged along the telescope axis with a distance between the respective pinhole and the respective microlens of the first 2-dimensional array being $f_{m1}$, and a distance between the respective pinhole and the respective microlens of the second 2-dimensional array being $f_{m2}$, wherein $f_{m2} < \gamma f_{m1}$, for $\gamma < 1$.

A downstream-facing outer surface of the array of telescopes can include an anti-reflection coating.

The micro-optics beam-homogenizer layer can include a 2-dimensional tandem lens array.

The artificial illumination device can include a low-angle white-light diffuser configured to subject an angular characteristic of a luminance profile at which the direct light exits the first emitting surface to blur filtering with a filter impulse response HWHM of lower than 10° degrees. The low-angle white-light diffuser can include a random distribution of micro-refractors formed in an outer surface of a transparent-layer material, or a dispersion of transparent micro-particles in a transparent bulk material with a refractive-index mismatch between the transparent micro particles and the transparent bulk material.

A downstream-facing outer surface of the pairs' collimators can include an anti-reflection coating. The direct-light source can include an angularly selective filter configured to absorb light divergent relative to the direct-light direction by more than a predetermined threshold.

In some embodiments, a system can be made-up by a juxtaposition of a plurality of the artificial illumination devices in accordance with the above description so that the direct light direction is equal for the plurality of the artificial illumination devices.

In some embodiments, a method is performed for generating natural light similar to that from the sun and the sky, using a direct-light source; and a diffused-light generator. The direct-light source can include a first emitting surface and be configured to produce, from a primary light, a direct light that exits the first emitting surface into a direct-light direction at low divergence, the direct-light source including a plurality of pairs of a first light-emitting devices positioned upstream from the first emitting surface and configured to emit the primary light and a collimator configured to collimate the primary light emitted by the first light-emitting device along the direct-light direction. The diffused-light generator can be configured to cause or produce diffused light at a second emitting surface. One of the first emitting surface and the second emitting surface can be positioned downstream with respect to the other and forms an outer emitting surface or both the first emitting surface and the second emitting surface coincide to form the outer emitting surface. The direct-light source and the diffused-light generator can co-operate to form outer light at the outer emitting surface that includes a first light component that propagates within a low divergence cone along the direct light direction and a second light component that propagates along directions outside the low divergence cone. The first light component can have a correlated color temperature (CCT) that is lower than a CCT of the second light component so that an observer sees, when looking towards the first emitting surface, a bright spot surrounded by a bluish background that mimics the sky, the bright spot having a lower CCT, corresponding to the sun, and moving, when the observer moves relative to the first emitting surface, relative to the first emitting surface as if the bright spot stemmed from an object positioned at infinity.

BRIEF DESCRIPTION OF THE DRAWINGS

Embodiments of the present invention will be detailed subsequently referring to the appended drawings, in which:

FIG. 1A schematically shows an array of pairs of primary light sources and collimating lenses as an example for an artificial light source wherein observer's eyes are here shown as looking onto the artificial illumination device thus obtained;

FIG. 13b shows a view onto the upstream face of the beam-homogenizer layer of FIG. 13a;

FIG. 13c shows the view onto the downstream face of the beam-homogenizer layer of FIG. 13a;

DETAILED DESCRIPTION OF THE INVENTION

Figure 1B:
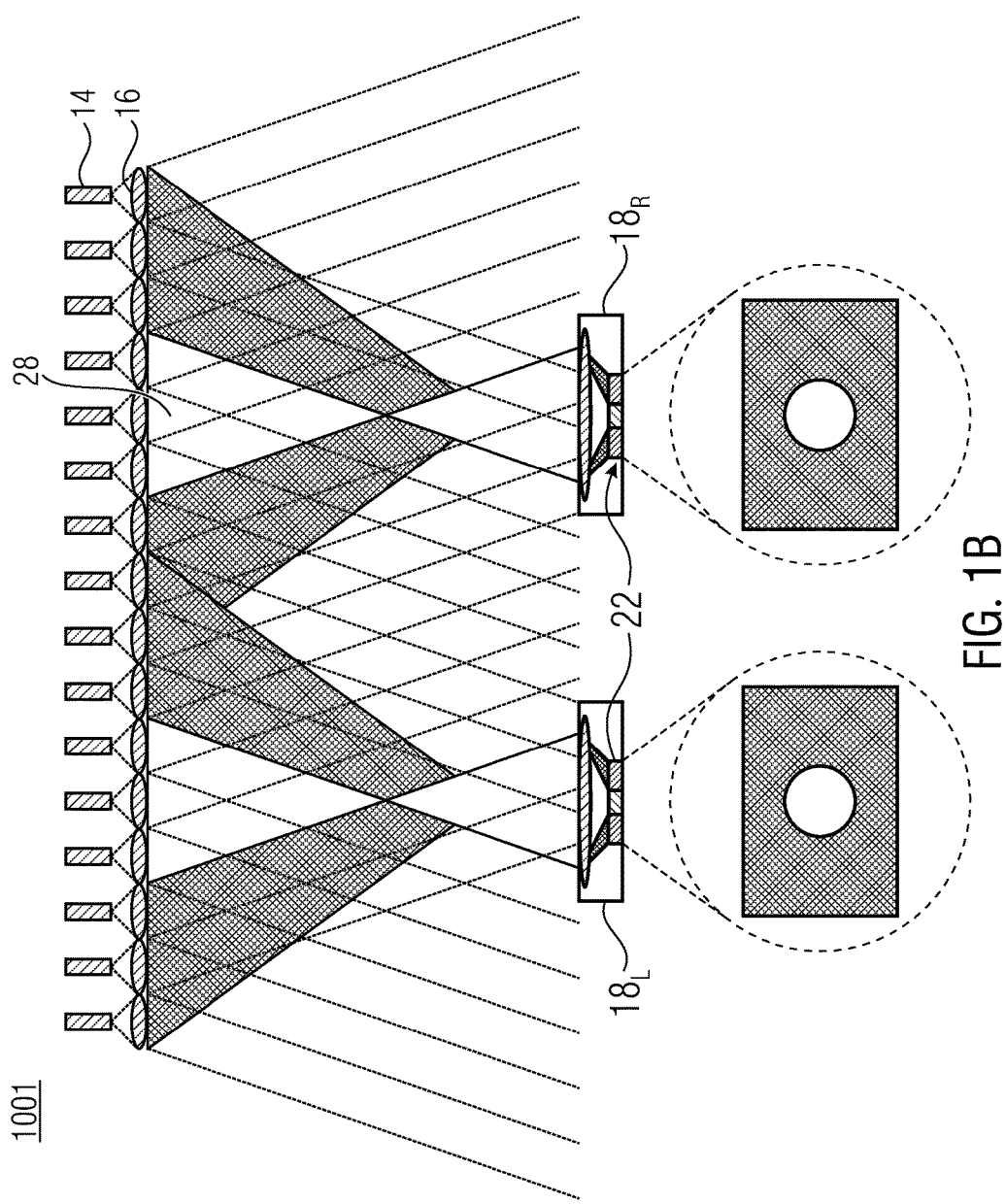
FIG. 1B schematically shows an array of pairs of primary light sources and collimating lenses as an example for an artificial light source wherein observer's eyes are here shown as looking onto the artificial illumination device thus obtained.

The capability of an observer to evaluate the distance of objects, and therefore the depth of the views that constitute a three-dimensional scenery, is based on multiple physiological and psychological mechanisms connected to focusing, binocular disparity and convergence, motion parallax, luminance, size, contrast, aerial perspective, etc. Some mechanisms may gain significance compared to the others according to both the observing conditions (e.g, whether the observer is moving or still, watching with one or two eyes, etc.) as well as the characteristics of the scenery, these latter depending, for example, on whether objects with known size, distance or luminance are present, serving as a reference to evaluate how distant the observed element of the scenery is. Notably, these mechanisms hold both in the case of real images and of virtual images. More specifically, visual discomfort or eye strain may arise when conflicts exist between two or more different image planes simultaneously perceived at different depths by an observer because of one single visual perception cue, or two or more competing different high-level visual perception cues.

In other words, the inventors noticed indeed that the visual perception of depth is determined by a series of visual cues such as:

Accommodation, i.e. the movement of ciliary muscles to adapt the eye lens to focus a scene; accommodation is most effective for distances of a few meters;

Binocular convergence, i.e. the fact that the axis of two eye balls of an observer converge onto the same object, i.e. converge onto the plane where the object is positioned.

Motion parallax, i.e. the apparent relative motion of objects against a background seen by a moving observer; strong cues to depth from motion parallax can be obtained even from only very slight body sway;

Aerial perspective, i.e. the fact that objects at a great distance away have lower luminance contrast and color saturation due to light scattering by the atmosphere. Moreover, the colors of distant objects are shifted toward the blue end of the spectrum;

Binocular disparity, i.e. the fact that each eye of an observer registers its own image of the same scene; by using such two different images seen from slightly different angles, the observer is able to triangulate the distance to an object with a high degree of accuracy. Autostereograms, 3D movies and stereoscopic photos employ this visual perception cue to obtain depth perception of a bi-dimensional scene;

Depth from motion, i.e. the dynamical change of object size;

Perspective, i.e. the property of parallel lines converging at infinity;

Relative size between known objects;

Occlusion of objects by others.

It has been found out that the infinite depth perception of the artificially reproduced images of infinitely distanced objects such as the sun or moon, and of the surrounding background, which represents one of the requirements for the illumination device to appear as the actual sun or moon does in nature, is realized when it is coherently supported in particular by the synergistic action of binocular convergence, motion parallax and accommodation visual depth perception cues, i.e. no conflict exists between these above mentioned visual perception cues.

The inventors also noticed that visual perception conflicts may arise for two main reasons:

ambiguity between two or more different depth planes depending on one single visual perception cue, which will be called intra-conflict;

conflict between information deriving from different visual perception cues, which will be called inter-conflict.

The absence of intra- and inter-conflicts between visual depth perception cues is fundamental in order to induce a natural perception of infinity depth of sun image and the surrounding solid angle. Furthermore avoiding the lack of congruence among cues prevents from eye strain and discomfort, while increases viewing comfort.

Figure 20:
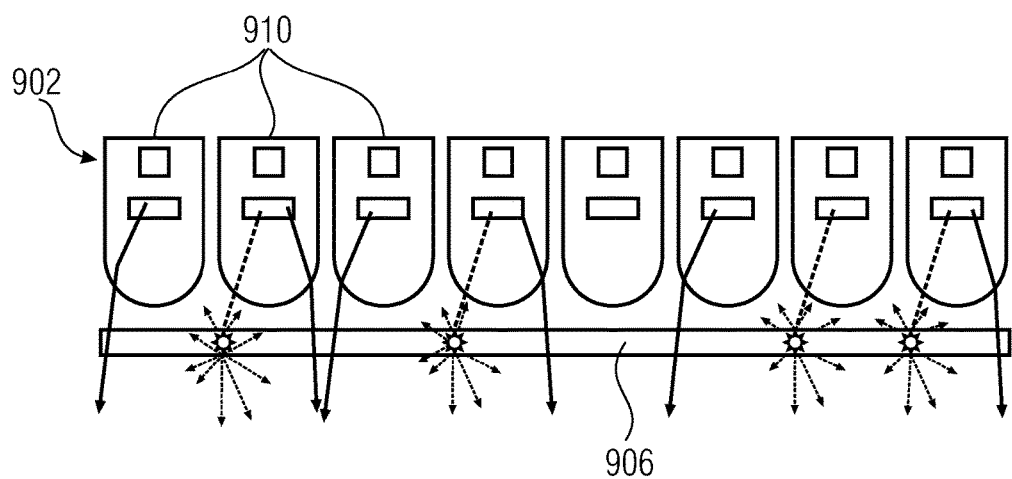

For example, reference is made to the already mentioned artificial illumination device shown in FIG. 20. In particular, when directly viewing at the light source 902, two competing images are simultaneously perceived by an observer. The first image, owing to the inherent transparency of the Rayleigh panel, is the real image of the LED array, the finite distance of which is supported in particular by accommodation and binocular convergence onto the LED array plane, and motion parallax. The second image is the virtual image of a bright spot surrounded by a bluish background, which is perceived at infinity. This second image is given by the fact that, as long as each LED 910 shines a circular symmetric light cone having divergence and orientation identical to those of all other LEDs, the group of LEDs 910 seen by each eye form a circular spot at the retina of the eyes of the observer. In other words, the LEDs 910 are seen under a cone with a fixed direction being given by the LED alignment direction which is, in the case of FIG. 20, perpendicular to the panel 906, and with fixed angular aperture which coincides with the LED divergence cone angle. Notably, each of the observer's eyes sees its own group of illuminated LEDs 910 under the given direction and cone angle. These bright spots are perceived by binocular convergence at infinite distance, this being the setting which produces identical and equally centered images of such round spots on the retinas, as normal vision presupposes. The size of this bright spot depends on the angular divergence of the light emitted by each single LED element 910.

Since the light source 902 does not contain any mechanism which prevents the first image plane, i.e. the plane of the real image of the array of LEDs 910, to be seen by an observer who directly looks at the light source 902, a visual perception conflict arises between the two above mentioned images perceived at different planes. This conflict, which for example may be explained as an intra-conflict determined by binocular convergence, thus prevents the observer to perceive the appearance of natural sun. Notably, such perception conflict makes the device in FIG. 20 unfit for solving the technical problem at the base of the present invention. In fact, even if most of the light from the LEDs is shined inside their divergence cone, a non-negligible portion is still shined outside of it (e.g. because of the scattering occurring inside the dome-LED device 910, and because of the fact that the dome lens is by far not an imaging optical component), which makes an illuminated LED clearly visible as a luminous object from almost any angle of observation.

The background light produced by the LEDs at large angles, i.e. outside the LED divergence cone, is by far not uniform and follows the LED pitch periodicity. Such absence of uniformity is interpreted by the inventors as the main reason which makes the first image of the LED array at finite distance to prevail onto the second image of the bright spot at infinite distance, even in the case where the average luminance due to LED at large angle is much lower with respect to the bright spot, and even if it is weaker with respect to a uniform luminance of a potentially present diffused-light generator, too, as it is discussed later. In fact, the human eye is made to be very sensitive to luminance spatial gradients, and particularly to luminance spatial periodic modulations.

Moreover, the minimum divergence achievable by commercial, dome-equipped LEDs is typically of the order of a few tens of degrees, i.e. a much larger figure than the 0.5° value featuring the actual sun beam divergence. This limit causes for the light source 902 an angle of penumbra by far larger than the natural one. As a consequence, shadows of objects but those having huge size are not formed at all, whilst the sharpness of said large-object shadows is anyway very weak. The LED light-beam divergence may be reduced, e.g. to values as low as 6° to 7°, by using larger concentrators, e.g. the commercially available TIR (total internal reflection) lenses, or CPC (compound parabolic concentrator) reflectors. This option, however, does not help in supporting the perception of infinite depth, these large concentrators leading to a very coarse pixelation which is even easier to be spotted by the eye than standard LED domes.

Indeed, a further problem of the light source 902 depicted in FIG. 20 detrimental in the visual appearance of the natural sun is the perceivable pixelation of the bright spot, i.e. on the angle under which such bright spot is observed. In fact, highly collimated LEDs lead to lens (and thus pitch) sizes that are usually much larger than the standard dome, i.e. of about 1 cm or more, which causes the bright spot to be formed by very few pixels, i.e. LED/lens pairs, where the number decreases with the decrease in LED divergence both because of the lower cone angle under which the spot is observed and because of the increase of the lens size. In this circumstance the virtual image which corresponds to an infinite depth plane splits into two substantially different pixelated images which make the perception of the LED array plane to prevail over the infinite depth image. Such circumstance thus prevents an observer to spontaneously perceive an infinite depth for the sun image.

Furthermore, the effect of the ambient light, i.e. of the light which comes from the ambient lit by the illumination device or some other light sources and which, crossing the surface of the LED dome lenses into upstream/reverse direction, lights the internal LED components and is reflected or scattered back to the ambient in the downstream direction, should be considered. This light, which typically comes from all of the directions, i.e. is diffuse, provides an undesired contribution which further increases the visibility of the LED array. In other terms, the device of FIG. 20 is not black even when it is switched off, as it happens when light feedback from the ambient does not play a role.

Summarizing, the device of FIG. 20 fails in solving the technical problem at the base of the present invention because it fails in the requirement of visual appearance as the sun when an observer directly views at the device itself, since it triggers visual perception cue conflicts between concurring visual planes, these planes being for example the real image of the LED 910 array and the virtual image of a bright spot corresponding to the sun. Moreover, it also fails in properly representing the image corresponding to the sun due to the clearly perceivable pixelation of such virtual image, as well as because the source reflects and/or diffuses back ambient light at any angle.

Like problems occur when synthesizing another illuminating, infinitely distanced object such as the moon.

Accordingly, it is an object of the present invention to provide an artificial illumination device for synthesizing the light of a very far illuminating object such as the sun or the moon to illuminate an ambient, in particular by forming shadows that are parallel and sharp, and to make an observer experience an infinite visual depth perception of the object's image surrounded by a dark and uniform background when he/she directly looks at said black-when-off illumination device, without inter- and intra-conflicts among visual perception cues and which, in addition, appears black when off at least along observation directions different from the observation directions along which the real or virtual image of the object is seen when the device is on.

In order to further clarify the mechanism by which the virtual image of the bright spot may be formed at infinite distance in the case of an array of identical sources, the inventors of the present invention abstracted the structure shown in FIG. 20 as illustrated in FIGS. 1a and 1b. The embodiment comprises a plurality of pairs of a primary light source (14), configured to emit primary light, and a concentrator (16)—alternatively called "collimator"—, configured to collimate the light. FIG. 1a also illustrates the observer's left and right eyes 18L and 18R looking into the artificial illumination device in the upstream direction. In FIG. 1a, the eyes 18L and 18R will naturally be set to infinity, i.e. will be set with their axes aligned along parallel direction, since due to binocular vision the observer will naturally try to align eyes so to have two object images in the same position on the respective retina 22, as for example in the central position of each retina, as shown in FIG. 1. Due to the fact that each pair of primary source 14 and collimating lens 16 delivers a beam with radially symmetric divergence, i.e. a conic-like beam, substantially identical to the beam delivered by all the other pairs of primary sources 14 and collimating lenses 16, the eyes 18L and 18R will see a round bright spot that is perceived as the virtual image of a round source at infinite distance. Notably, by walking in the room an observer will see the apparent object crossing the panel as it happens in reality. If the source angular spectrum is not flat-top but bell shaped, the object image will not be sharp, but blurred. It is reminded that FIG. 1a concerns only the formation of the virtual image of the bright spot at infinite distance, while not considering the light emitted, reflected or back scattered by the LED out of their divergence cone, which in FIG. 1a is schematically represented by the pixelated plot. In fact this light is responsible for the formation of the real image of the LED array, which is formed by eye accommodation and convergence onto the LED array plane. This second image, therefore, contributes in creating conflict in the visual cue, thus preventing the device represented in FIG. 20 from guaranteeing a natural visual appearance of the infinitely distanced object. In order to achieve the goal, the device in FIG. 20 should perform as schematically depicted in FIG. 1b, where the black plot is meant to indicate the ideal case wherein both direct and reflected luminance are null out of the divergence cone.

Figure 2:
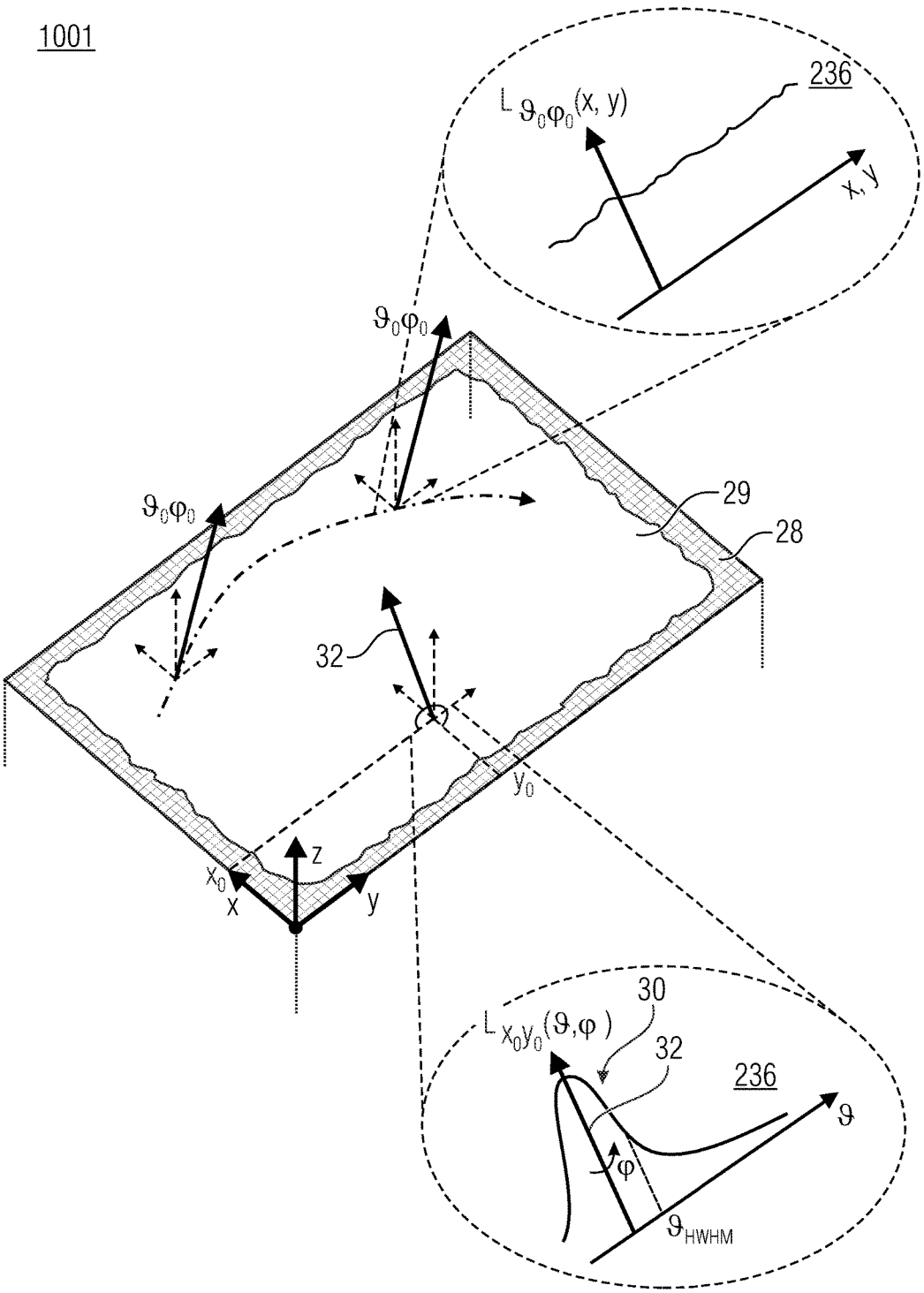
FIG. 2 schematically shows an artificial illumination device in accordance with an embodiment with additionally schematically showing the luminance profile of the output light.

FIG. 2 illustrates an embodiment of the black-when-off illumination device according to the present invention, which is capable of illuminating an ambient like an illuminating, virtually infinitely distanced object does through a window, and which guarantees at the same time a visual appearance of the illumination device that ensures the experience of virtually infinite depth under all the directions along which an observer will look at the device.

In a certain embodiment according to the present invention, sketched in FIG. 2, the primary light source, the concentrator (not shown in the figure) and the emitting surface 28 are configured to produce from the primary light an output light 236 which exits the emitting surface 28 with a luminance profile $L(x, y, \vartheta, \varphi)$, wherein x and y are the transverse coordinates along axes x and y spanning the emitting surface 28, $\vartheta$, is the polar angle measured relative to an output-light direction 32, and $\varphi$ is the azimuthal angle, and wherein $L(x, y, \vartheta, \varphi)$ is:

(i) spatially uniform (i.e. the luminance value does not depend on the spatial coordinates x,y, this being true for any polar angular coordinate $\vartheta$ and any azimuthal angular coordinate $\varphi$, respectively) across the emitting surface 28; for example, for any assigned direction of observation $\vartheta_0$, $\varphi_0$, $L_{\vartheta_0 \varphi_0}(x, y)$ varies by less than 50%, advantageously less than 30%, most advantageously less than 20% of its spatial-average when the spatial coordinates x,y are varied over an effective_surface 29, wherein said effective_surface is a selected portion of the emitting surface 28 covering at least 80%, advantageously at least 90%, most advantageously at least 95% of the emitting_surface 28, and wherein the spatial average is performed over said effective_surface.

(ii) has a narrow polar-angle peak 30 (i.e. the luminance value has a peak with respect to dependence on the polar angle $\vartheta$, for any x,y and $\varphi$ values) along an output-light direction 32; for example said narrow peak has an average half-width at half maximum (HWHM) value, $\vartheta_{HWHM}$, less than 10°, advantageously less than 5°, more advantageously less than 2°, wherein the average is performed over x,y and $\varphi$ variables or, in formulas, $\vartheta_{HWHM}$=HWHM ($L_{mean\ polar\ angle\ distr}(\vartheta)$) wherein $$L_{mean\ polar\ angle\ distr}(\vartheta) \equiv \frac{1}{2\pi} \frac{1}{A} \int_{\varphi \in [0; 2\pi[} \int_{(x,y) \in effective\_surface} L(x, y, \vartheta, \varphi) d\varphi\, dx\, dy,$$

and (iii) for example, but not necessarily, has a dark background, i.e. the luminance value outside the narrow peak (i.e. for any coordinate x,y over the entire emitting surface 28, for any azimuthal angle $\varphi$ and any polar angle $\vartheta$ outside the narrow peak) is very weak; for example the $L(x, y, \vartheta\varphi)$ is lower than 10%, advantageously lower than 3%, most advantageously lower than 1% of the maximum value $$L_{max} \equiv \max_{x,y,\vartheta,\varphi} (L(x, y, \vartheta, \varphi))$$

for any polar angle $\vartheta > 4\vartheta_{HWHM}$, advantageously for $\vartheta > 3\vartheta_{HWHM}$, most advantageously for $\vartheta > 2\vartheta_{HWHM}$.

In the context of the description of embodiments of the present invention, the emitting surface 28 is the surface of a black-when-off illumination device, generically indicated with the sign 1001, through which light is emitted. More precisely, the emitting surface might be referred as a portion of the surface of the smallest connected volume embedding the black-when-off illumination device 1001 through which light is emitted, e.g. is delivered from the black-when-off illumination device 1001 into the ambient. In the embodiment shown in FIG. 1, the emitting surface 28 is the outer surface of the collimating lenses 16 operated as light concentrators. In different embodiments, the emitting surface 28 might be an outer surface of other optical elements, such as for example of a protective glass or other transparent material. Alternatively, an emitting surface 28 might be a purely geometrical surface not corresponding to any physical material, as for the case of a portion of a geometrical surface facing an aperture trough which light is emitted.

It is noticed that, in the ideal case, the spatial uniformity of $L(x, y, \vartheta, \varphi)$ (i.e. its independence on the spatial coordinates) might be sufficient to avoid visual perception cue conflicts. In fact, the inventors noticed that a perfectly uniform luminance profile cannot lead to a depth perception at any finite distance for any among the accommodation, binocular-convergence and motion parallax visual cues. In other terms, a perfectly uniform luminance profile either leads to an undetermined depth perception or to an infinite depth perception. Such uniformity overcomes the evident limitations of the embodiment in FIG. 20, since the real image of the LED array is determined by the non-spatially uniform (direct or reflected) luminance due to, for example, the LED elements pitch.

In the presence of uniform luminance spatial profile, the narrow peak 30 in the luminance polar-angle profile combined with dark background outside said narrow peak plays the key role in dragging the otherwise undetermined perceived depth into an infinite depth perception. Notably, the inventors have noticed that said narrow peak and dark background can drag the perceived depth to infinity even in the presence of a weakly not uniform luminance profile.

Indeed, the presence of a uniform luminance profile along spatial coordinates with a sharp angular peak and dark background generates a virtual image supported by binocular convergence at infinity.

In order to clarify as to why a peak 30 and a dark background in the angular profile of the spatially uniform $L(x, y, \vartheta, \varphi)$ further improve an infinite depth perception, it should be mentioned that an observer's visual attention is advantageously attracted by the plane where the highest luminance, the highest contrast and the highest spatial frequency (provided that it is smaller than the frequency corresponding to the angular resolution limit) occur. In other terms, the binocular convergence sets the eyes in order to avoid sharp and bright images to be differently positioned on the two retinas, with respect to correlated positions. Therefore, the narrow peak in the $L(x, y, \vartheta, \varphi)$ angular profile surrounded by a dark background, as long as it is perceived by the two eyes from the same direction (which follows from L spatial uniformity and the fact that it is peaked along output light direction 32) forces the two eyes to be aligned along parallel directions, supporting infinite depth perception of a bright spot representing the sun, for example. Notably, this happens independently of the actual direction along which both the axes of the eye balls are aligned, i.e. even if the eyes are oriented so that the L peak creates a spot far from the center of eyes' retinas. In other words, the effect occurs as long as the bright and narrow spot is in the visual field, no matter if it is in the center or on a side.

Moreover, due to the already mentioned fact that an observer's visual attention is advantageously attracted by the plane where the highest luminance, the highest contrast and the highest spatial frequency (below resolution limit) occur, also eye accommodation in the case of the embodiment of FIG. 2 is prevailingly brought to an infinite plane, this being the virtual plane at which the highest luminance, contrast and spatial frequency occur because of the narrow angular peak 30 in the luminance $L(x, y, \vartheta, \varphi)$.

The spatial uniformity of $L(x, y, \vartheta, \varphi)$ ensures also an infinite depth perception for the visual cue of motion parallax, since a moving observer experiences the virtual image due to any angular structure of $L(x, y, \vartheta, \varphi)$, e.g the narrow peak 30 which represents the illuminating object at virtually infinite distance, as moving together with him/her as very far away objects appear to move in reality.

Moreover, the characteristics of the luminance profile in the embodiments above described result in the appearance of the illumination source not depending on the number of observers and their relative position with respect to the source, in the sense that each single observer experiences the same infinite depth perception coherently supported by visual perception cues.

The luminance profile $L(x, y, \vartheta, \varphi)$ of the light exiting the emitting surface 28 therefore ensures the absence of intra- and inter-conflicts between visual depth perception cues, this being fundamental in order to induce a natural perception of infinity depth of both object and background.

It is noted that the capacity of $L(x, y, \vartheta, \varphi)$ to determine infinite depth perception typically increases with the increase of the contrast between peak and background in the luminance angular profile, i.e. a dark background strongly supports a prevailing infinite depth perception, in presence of a bright angular peak.

It is also pointed out that a dark background further improves the prevailing infinite depth perception with respect to a brighter one since the lower the average luminance value of these non-uniform structures is with respect to the main narrow angular peak, the lower the visibility of possible non-uniformities in the background luminance profile is. In other terms, a non-uniformity in a dark background determines much weaker visual perception cue conflicts than a non-uniformity of an intense background, for the same relative amplitude of fluctuations with respect to the average value of the background, where dark or intense are to be intended with respect to the luminance of the narrow angular peak 30.

It is also noticed that the request of $L(x, y, \vartheta, \varphi)$ being at the same time uniform in the (x,y) profile and peaked in the $(\vartheta, \varphi)$ profile is contradictory for the case of the embodiment in FIG. 20, since uniformity in the (x,y) profile demands for a minimization of the concentrators' size down to the micro-optics regime, so that fluctuations become unperceivable, whilst the narrow peak in the $(\vartheta, \varphi)$ profile demands for a maximization of the concentrators' size, e.g. in order to remove the inherent divergence of the LED sources.

In commenting the relevance of the assigned "luminance" profile for the purpose of the present invention it should be clarified that, up to date, the feature related to how an artificial light source might appear has not been considered, especially with respect to the perceived depth of field. In contrast, the standard relevant feature of a light source is how it is capable of illuminating an object, this feature being described by the "illuminance", or "radiant exitance". More precisely, the "luminance" is "the luminous flux in a beam, emanating from a surface, or falling on a surface, in a given direction, per unit of projected area of the surface as viewed from that direction, per unit solid angle—see ASTM E284—90a, Standard Terminology of Appearance", and therefore it is the quantity useful for characterizing the appearance of a luminous surface as seen by an observer looking at said surface under a given direction. In contrast, the "radiant exitance" (or "illuminance"), is the total flux leaving a point on a surface into all directions, i.e. an angularly integrated quantity, the uniformity of which only guarantees a uniform illumination of an object positioned very close to the source. Therefore, a uniform radiant exitance does not guarantee a uniform appearance of a light emitting surface.

As a consequence of the ability of a black-when-off illumination device according to an an embodiment of the present invention to produce the output light such that same exits the emitting surface 28 with a luminance profile L which is uniform across the emitting surface 28 and has the narrow peak 30 around the output-light direction 32 and a weak background around it follows that:

(i) the output-light direction 32 is substantially constant all over the emitting surface 28; for example output-light direction 32 varies by less than 3°, advantageously less than 2°, most advantageously less than 1° over at least 90% of the emitting surface 28;

(ii) the divergence is substantially constant over all the emitting surface 28, for example it varies by less than 50%, advantageously less than 20%, most advantageously less than 10% of the average value over at least 90% of the emitting surface 28.

Figure 3:
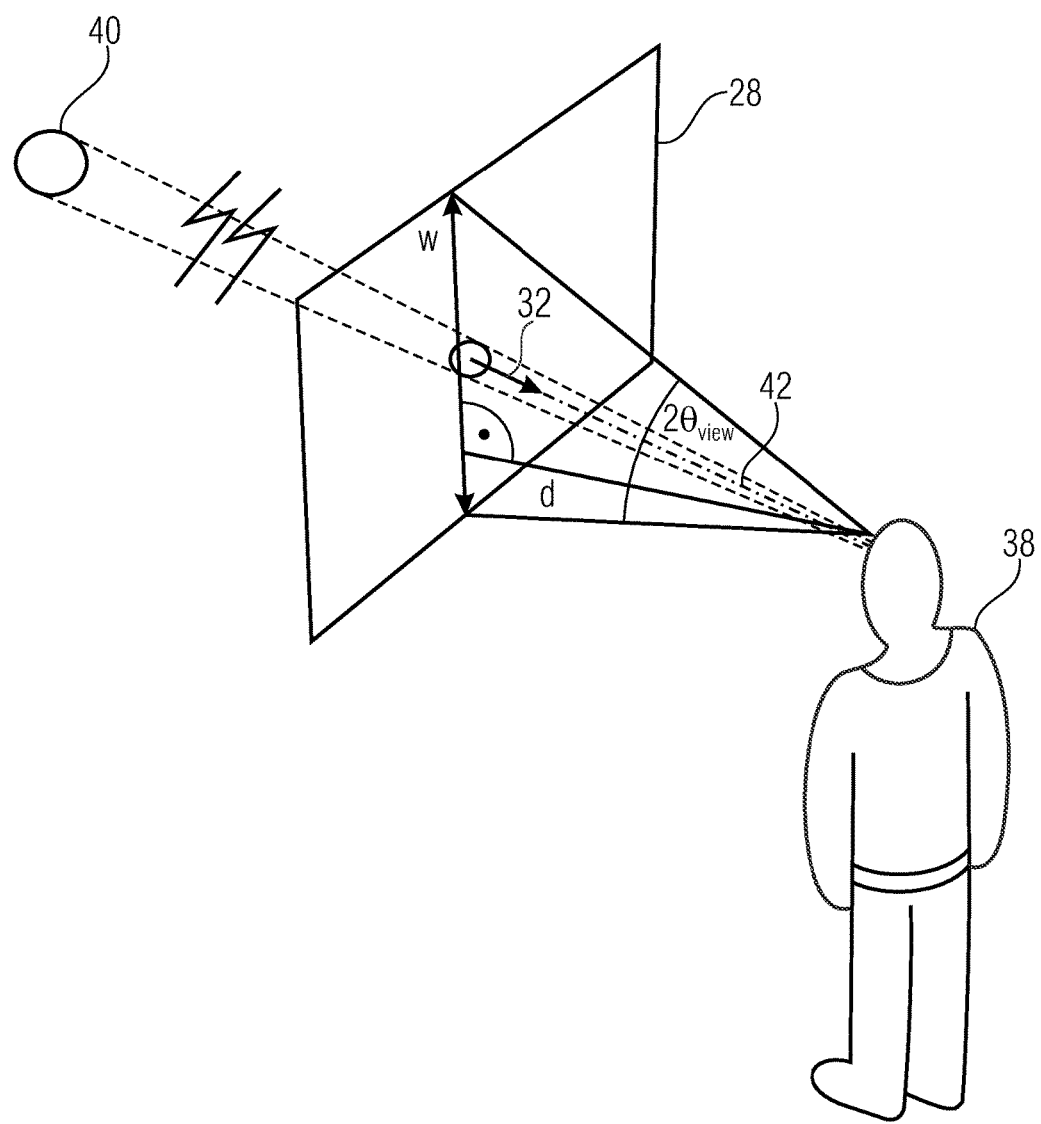
FIG. 3 shows schematically an observer looking onto the emitting surface of a black-when-off artificial illumination device and the bright spot appearing for the observer when looking onto the emitting surface.

In any case, with reference to FIG. 3, due to the output light generated by the black-when-off illumination device, an observer 38 who looks at the illumination device and its emitting surface 28, respectively, sees a bright spot 40 under a narrow visual cone angle 42, surrounded by a dark background, the spot being perceived at infinite distance with respect to binocular-convergence, accommodation and motion parallax depth cues. In other words, the observer 38 sees, when looking towards the emitting surface 28, a bright spot 40 which, when the observer moves relative to the light-emitting surface, moves relative to the emitting surface 28 as if the bright spot 40 stemmed from an object positioned at infinity.

In a certain embodiment, the black-when-off illumination device is configured to ensure dark and uniform background also when it is operated inside a fairly luminous environment, i.e. it is configured so that ambient light is not reflected or back scattered in an amount which may spoil the appearance of the emitting surface 28 in terms of background luminance level and uniformity. In fact, in use, the emitting surface 28 not only emits but also may receive light from the ambient. For example, in the ideal case of the black-when-off illumination device 1001 illuminating a perfectly white room, a portion of luminous flux generated by the illumination device would return to the illumination device itself The request of above translates into a request for the emitting surface 28 to have a dark and uniform appearance under diffuse external illumination when the black-when-off illumination device is off Specifically, in the present embodiment the black-when-off illumination device is configured so that the emitting surface 28 has a total reflectance (average) factor $\eta_r \leq 0.4$, advantageously $\eta_r \leq 0.2$, more advantageously $\eta_r \leq 0.1$, even more advantageously $\eta_r \leq 0.04$, wherein the total reflectance factor $\eta_r$ is defined as the ratio of the luminous flux, reflected at all angles within the hemisphere bounded by the plane of the specimen, to the flux reflected from a perfect reflecting diffuser under the same geometric and spectral conditions of measurement, e.g. under diffuse illumination by a D65 standard illuminant which provides uniform illuminance (lux/m) onto the sample.

Figure 19:
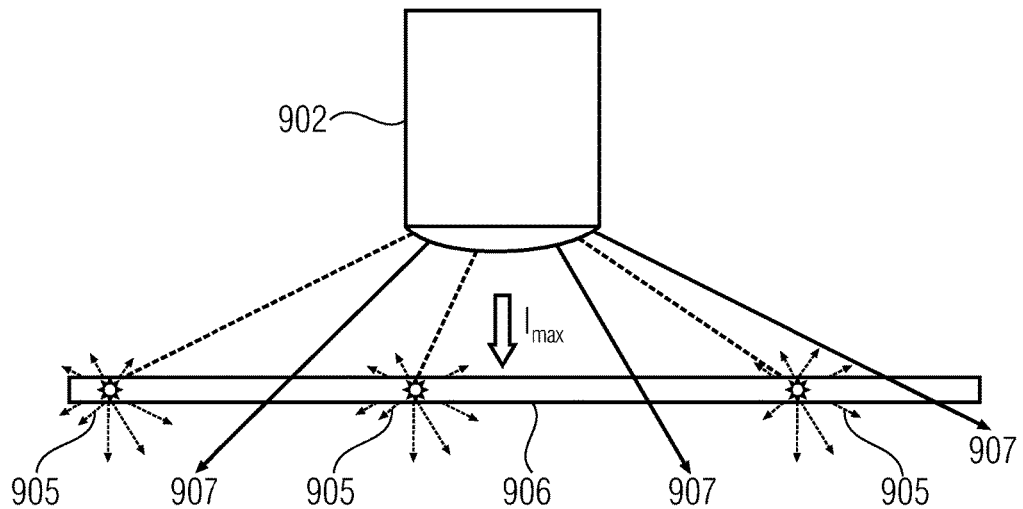
FIGS. 19-21 show comparison embodiments for illumination devices.
Figure 21:
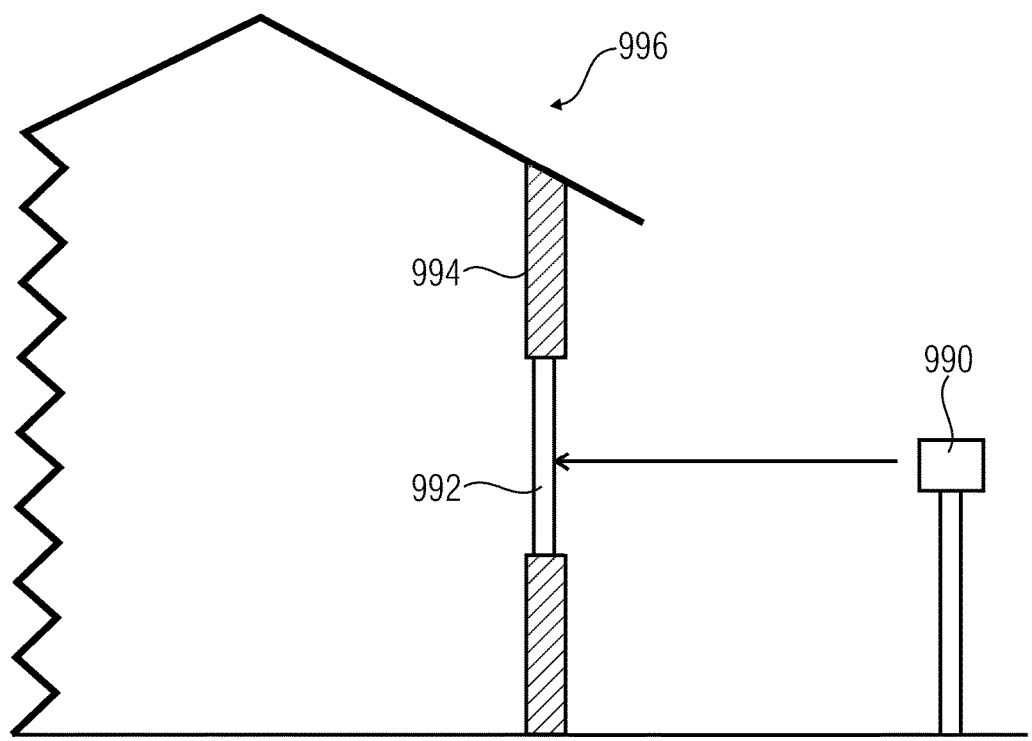

Naturally, the distribution of the direction of the maximum value of the luminance profile should differ from a radially symmetric vector field so that shadows cast by objects in the output light are not aligned along converging directions, as it would be the case in the device of FIG. 19, FIG. 20 and FIG. 21. More precisely, the black-when-off illumination device is configured such that a plurality of elongated objects that are lit by the black-when-off illumination device and are oriented along direction 32 and parallel to each other cast onto an arbitrary plane a plurality of shadows that should not be featured by radially symmetric outwardly pointing behavior which is typical for illumination by a localized source at finite distance. To this end, the spatial fluctuations in the direction of the narrow peak 30, which may occur within the limitation of above, may be irregular or random.

Notably, once the output light of the black-when-off illumination device is seen by the observer 38 with both eyes, the observer 38 will perceive the bright spot 40 at infinite distance. In fact, the outlined features of the luminance profile L impose that the eyes are parallel in order to perceive equally positioned bright spots on the two retinas as depicted in FIG. 1. This is the condition which guarantees the illumination device to provide large depth perception. These conditions will be ideally guaranteed if L is independent from x, y and φ and virtually null for $\vartheta > \vartheta_0$ and has a constant value for $\vartheta < \vartheta_0$ where $\vartheta_0$ is, for example, 3° or more advantageously 1° or even more advantageously 0.5°. However, some discrepancy from this ideal regime is obviously acceptable as the above examples for possible constraints showed. The amount of acceptable discrepancy is mainly dictated by the need of guaranteeing the above-mentioned large (virtually infinite) depth perception to occur in absence of visual perception conflicts, or at least in absence of conflicts which lead to a prevailing depth perception at finite distance. This condition is ensured by the above examples for possible constraints.

With any of the above outlined constraints, it is clear that these constraints are not fulfilled with the setup shown in FIG. 19, as the light source 902 would have to be placed incredibly far away from panel 906 in order to ensure the spatial uniformity of L and prevent shadows to be featured by radially symmetric outwardly pointing behavior. Moreover, the setup of FIG. 20, which represents an array of LEDs with dome concentrators, does not fulfill the constraints, both because the HWHM of the luminance is more than one order to magnitude larger than may be usefel and because the resulting luminance shows strong spatial fluctuations for angles larger than the HWHM cone emission angle due to the pitch of the LED array and on a scale by far larger than 1 mm. It is worth noting that the desired specifications can also not be achieved even if the LEDs of the setup of FIG. 20 would be coupled, e.g. with TIR optical concentrators, or more generally, by any among the standard concentrators used in the field of non-imaging optics such as, e.g. compound parabolic concentrators (CPCs) devices. In fact, the transverse size that these optical elements should have in order to ensure the desired low divergence is fairly large, namely several centimeters if one considers the minimum size of currently available general lighting LED chips of about 1 mm and the need of coupling most of the LED general light to the optics. This means that, at least close to the light-emitting surface, i.e. for observers as close as 1 m away from the light-emitting surface, for example, the observer's eyes will see the bright spot 40 inside each single optics, i.e. the spot size is smaller than the optics size such as, for example, the spot is roughly 2 cm at 1 m distance for 1° full divergence. The observer who looks at such low divergence non-imaging optics at a short distance from it (see above) cannot perceive a true image of any round spot, and moreover cannot experience any infinite focal depth, because the luminance generated by such non-imaging optics is neither truly uniform (i.e. shift invariant) nor invariant with respect to the azimuthal angle. As a consequence, the two eyes will capture two images which are in general not round, even if the emitting source, e.g. a LED, coupled to the optic is round and are not equal. The fact that the two eyes perceive different images is very detrimental with respect to what forces the two eyes to be set in parallel directions. Under this circumstance, it is much easier for the two eyes to focus on what, in contrast, is really seen as equal by both, i.e. the black-when-off illumination device object at finite distance. This spoils not only the roundness of the object's appearance, but also the infinite depth perception.

The just mentioned thoughts suggest that a further embodiment for the black-when-off illumination device could even be construed in line with the structure of FIG. 20, if the following constraints could be fulfilled by the LEDs:

(i) The size of each LED (including the lens dome) in the direction perpendicular to the emission direction would have to be substantially reduced, i.e. it should be reduced down to 3 mm, advantageously 1 mm, most advantageously 0.5 mm. This would obey the uniformity constraint both in the on and off mode.

(ii) The ratio between the size of the LED emitter, i.e. the size of the phosphor or dye zone, i.e. its linear dimension which is typically about 1 mm for the smallest currently available general lighting LEDs, and the dome lens focal length, should be about 1/10 to 1/50 in order to guarantee divergences in the range of 1° to 5°. By considering for example 1° divergence and assuming a focal length of 1 mm and a dome diameter comparable to the focal length as would be needed to ensure maximum throughput, one would end up with LED emitter sizes below 20 μm.

(iii) Moreover, each LED emitter and its associated dome should be embedded into a micro dark box. This box should be covered by an absorber which substantially absorbs all the ambient light which crosses the dome lens apart from the ambient light which returns onto the LED emitter. In this case, the LED matrix would appear dark when lit by external light. Moreover, it should avoid scattered light from the surrounding of the LED (e.g. from the LED board) to be coupled with the lens dome.

(iv) The LED dome lenses could be antireflection coated in order to minimize reflection of ambient light back to the ambient.

Summarizing the above, the black-when-off illumination device could be construed such that it comprises a 2-dimensional array of LEDs of special structure set out in more detail herein below with respect to FIG. 4. In particular, each of LEDs 44 comprises a light emitter 46 as primary light source, such as a light emitting diode comprising phosphor and/or dye or the like and a concentrator, e.g. a dome lens 48, wherein the dome is positioned at a distance 49 from the light emitter 46 substantially equal to the dome focal length. Advantageously, the light emitters 46 have a circular cross section in a plane perpendicular to direction 32, in order to facilitate the achievement of a luminance distribution independent of the azimuthal coordinate.

All internal surfaces of domes 48, but the windows 52 at the upstream side thereof through which the light emitters 46 emit their light, and the downstream ends thereof where the light collimating lens surfaces 54 are formed, are covered by a light absorber so as to form micro dark boxes as indicated at 56. As just described, surface 54 may be antireflection coated and the lateral dimension or width of the light emitting zones of the light emitters 46, i.e. 58, should be small enough so that the ratio between width 58 on the one hand and length 49 on the other hand is smaller than 1/10, advantageously smaller than 1/20, most advantageously smaller than 1/50. Additionally, pitch 50 should be smaller than 3 mm, advantageously 1 mm, most advantageously 0.5 mm. As mentioned before, the LEDs 44 may be packed closely such as in a hexagonal manner. The array of LEDs 44 would cover an area as wide as the emitting surface 28.

Figure 5:
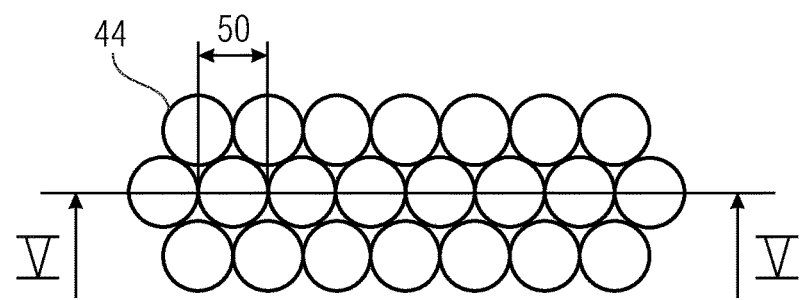
FIG. 5 shows a top-view of the array of FIG. 4.
Figure 6:
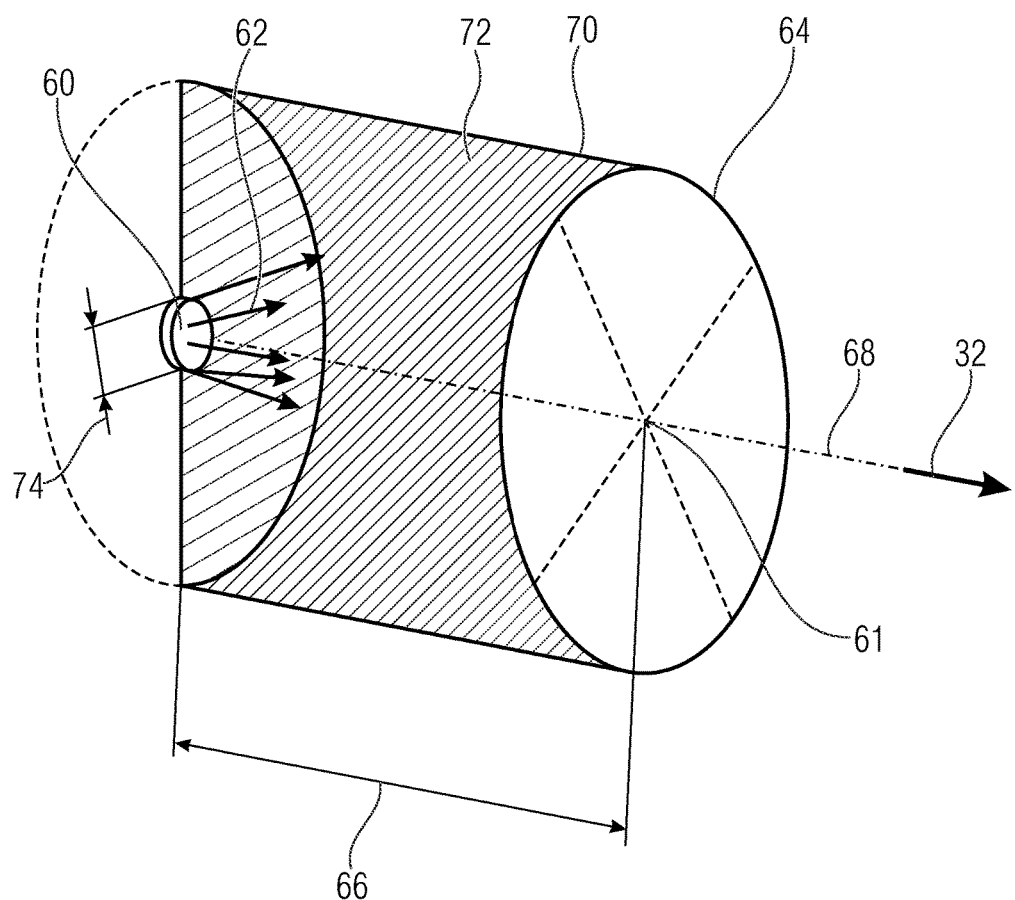
FIG. 6 shows a schematic partial perspective view of a black-when-off artificial illumination device in accordance with an embodiment, comprising a pair of a primary light source and a collimating lens.

Naturally, it is not necessary to implement the primary light source/concentrator pairs of FIG. 1 into individual LED devices 44 as shown in FIGS. 5 and 6. This is explained by way of the following embodiments.

FIG. 6, for example, shows the black-when-off illumination device as comprising a primary light source 60 configured to emit primary light 62 and a concentrator in the shape of a collimating lens 64 positioned downstream to, and at a focal distance 66 from, the primary light source along an optical axis 68 which coincides with the output-light direction 32.

Differently from standard lighting devices, e.g. the case of the LED dome lens featuring the embodiments of FIG. 19, in the present embodiment the lens 64 may be an imaging optical component, in the sense that the lens quality with respect to the given optical lay out parameters (i.e. the system numerical aperture, the distance between lens and emitting device, the ratio between focal length and transverse size of the emitting device, etc.) may be such as to ensure the lens to perform an image of the primary light source 60 at infinity.

In order to achieve lower fabrication costs and structural compactness, the collimating lens 64 may be a Fresnel lens. The primary light source 60, in turn, may be embodied as an LED.

With regard to the description of FIG. 6, it should be noted that the optical axis 68 may coincide with the optical axis of the collimating lens 64 or may be oblique thereto with the optical axis 68 then being defined by a line connecting the intersection 61 between the collimating lens' 64 principal plane (in case of two principal planes, the one positioned nearer to the primary light source 60) and the lens' 64 optical axis, with a barycenter of the primary light source's 60 light emitting zone. In the case of Fresnel lens 64, the Fresnel lens 64 may be oriented in parallel to the emitting surface 28 or may lie within the same as further outlined below. In case of other collimating lenses 64, the same may apply for the principal plane. In any case, the lens' 64 aperture covers an area as wide as the emitting surface 28.

The primary light source 60 may have a circular aperture so as to result in a circular shape of the bright spot 40, in the observer's eyes focused at infinity.

As also shown in FIG. 6, the black-when-off illumination device of FIG. 6 may additionally comprise an absorber forming a dark box 70 housing the primary light source 60 and having an aperture where the collimating lens 64 is positioned, wherein an internal surface 72 of the dark box 70 is formed by a light absorbing material having an absorption coefficient for visible light greater than 70%, advantageously 90%, more advantageously 95%. This results in obeying the reflectance luminance angular profile constraints.

It should be noted that FIG. 6 is illustrative with respect to many features and could be varied accordingly. For example, the collimating lens' 64 aperture does not need to be circular as depicted in FIG. 6. Alternatively, it may be rectangular, hexagonal or have some other polygonal shape. With respect to the shape of the dark box 70 and its internal surface 72, it should be noted that same does not need to be cylindrical with a top face coinciding with the collimating lens' 64 aperture and the primary light source 60 being integrated into an aperture of the bottom face of the cylinder or positioned within the cylinder. Any other shape may also be valid as long as any output light paths between the primary light source 60 and the collimating lens' 64 aperture is left unblocked. For example, the internal surface 72 could extend between the cylinder shown in FIG. 6 and the frustum being non-concave, having minimum volume and extending between the light emitting zone of primary light source 60 on the one hand and the aperture of the collimating lens 64 on the other hand.

In order to fulfill the above outlined possible constraints regarding the luminance profile L, the ratio between the focal length 66 of collimating lens 64 on the one hand and the width 74 of the primary light source's 60 aperture may be greater than 10 and advantageously greater than 50. The focal length 66 may, for example, be greater than 10 cm and advantageously greater than 20 cm. The area of the collimating lens' 64 aperture may, for example, be greater than 80 $cm^2$ and advantageously greater than 300 $cm^2$. The downstream face of collimating lens 64 may form the light-emitting surface.

Figure 4:
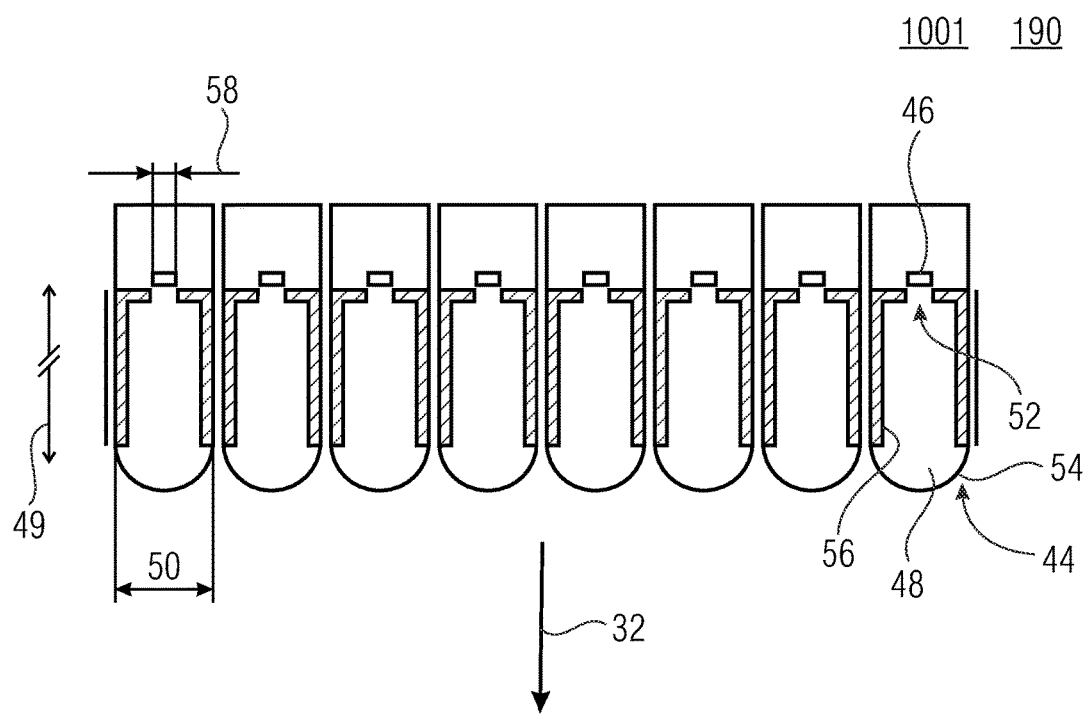
FIG. 4 shows a sectional view of an array of LEDs appropriately configured to result in an appropriate black-when-off artificial illumination device in accordance with an embodiment.

With respect to the values presented regarding the embodiments of FIGS. 4 to 6, it should be noted that the values presented for these embodiments with regard to for example the ratio between the focal length and the light emitting aperture, do not need to result in a complete obedience of the previously outlined constraints regarding the luminance profile. Rather, the embodiments of FIGS. 4 to 6 may be combined for example with subsequently described embodiments for micro-optics beam-homogenizer layer so as to fulfill the constraints. Accordingly, embodiments of FIGS. 4 to 6 may also form merely a part of the black-when-off illumination device, namely a collimated light source for generating pre-collimated light, e.g. a light beam with limited HWHM angular divergence (for example with HWHM angular divergence smaller than 2.5°) but featured by the presence of stray light at larger angles, as for example stray light leading to secondary peaks or spikes in the light-beam angular profile.

In any case, for a typical size of the Fresnel lens 64 of about 20 cm and for a typical distance between the lens 64 and the observer of about 1.5 m the configuration of FIG. 6 results in the angular divergence of the virtual image of the primary light source 60 being smaller than the angular aperture with respect to the observer of the collimating lens 64, thereby ensuring that the image of the bright spot 40, i.e. the image of the primary light source 60, appears as a luminous dot beyond the collimating lens' 64 aperture. That is, the image of the object appears smaller than the aperture of lens 64 and the lens 64 itself is interpreted as a transparent window between the eye and the virtually distant object 40. An advantage of using a Fresnel lens as lens 64 is the technical possibility of achieving smaller output divergence angles. As an example, typical divergence angles of combinations of LEDs plus TIR lenses, for example, are of the order or larger than 8° to 10°. One of the main limits is due to the focal distance of the optical element, i.e. the TIR lens, which is of the order or less than 1 to 5 cm. In the case of the Fresnel lens, the focal length of such a lens may be of the order of 20 to 30 cm, for example. The output angular divergence is thus given by the ratio between the spatial aperture 74 of the primary light source 60 (including or not including a primary optics element, such as an LED dome) and the above mentioned focal length 66. For a 1 to 2 mm LED as an example for the primary light source 60, and a focal length of 20 to 30 cm, the divergence is of the order or lower than 1°.

A further advantage of the configuration of FIG. 6 is the absence of pixelation of the infinite-distance object image. In the case of FIG. 20, the output divergence is likely to be larger than the angular aperture of the LEDs' optics with respect to the final observer in the final setup for a viewing distance, for example, of the order of, or larger than, 1 m and an aperture of the primary optics, i.e. domes, of the order of 1 cm resulting in an angular aperture of 0.6° to be compared to the output divergence of 8° to 10°. This determines a pixelation of the image over the different lens elements. Such a pixelation features an angular period definitely larger than the limit period for which the eye is not able to distinguish each single element. This fact along with the additional sensitivity of the eye to contrasts spoils the image effect of the infinite distance source by enabling the observer to actually see each single lens element of the structure of FIG. 20. This does not happen in the case of FIG. 6.

Figure 7:
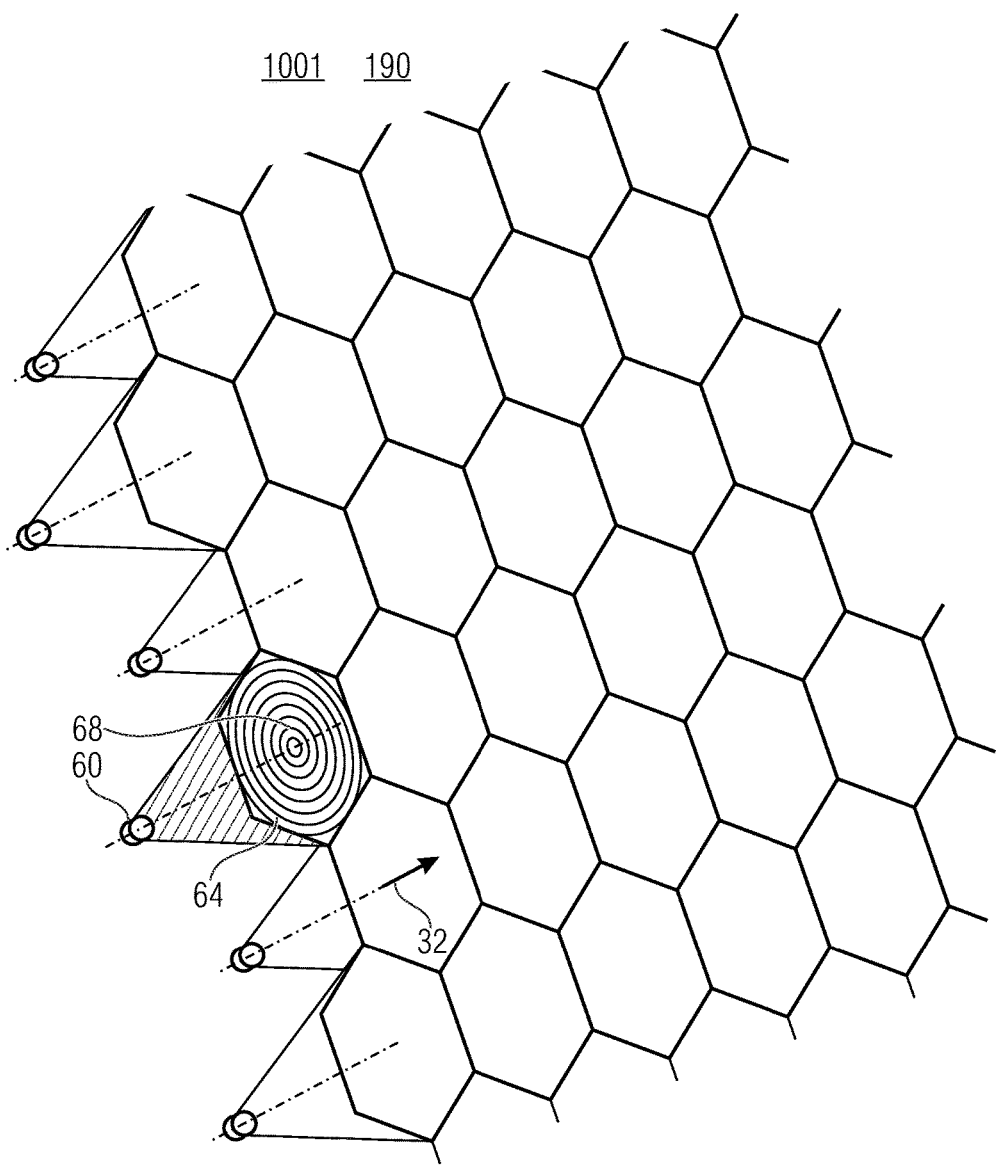
FIG. 7 shows 3-dimensionally an array of pairs in accordance with FIG. 6 so as to result in a black-when-off artificial illumination device in accordance with a further embodiment.

As shown in FIG. 7, pairs of primary light sources 60 and lenses 64 may be combined together and positioned in juxtaposition so that the collimating lenses 64 of the pairs abut each other so as to form a joined continuous surface. If the collimating lenses 64 are formed as Fresnel lenses as illustrated in FIG. 7 by circular lines within one of the lenses 64, then the array of Fresnel lenses may be easily formed by one continuous monolithic object such as plastic or glass. As in the case of FIG. 5, the pairs of primary light sources 60 and collimating lenses 64 may be packed together along the 2-dimensional array of pairs in a hexagonal manner. Accordingly, the apertures of the individual collimating lenses 64 may be formed hexagonally. The optical axis 68 of the individual pairs of device 60 and lens 64 can be arranged to extend parallel to each other and the output-light direction 32, respectively. The downstream face of lenses 64 could form the emitting surface 28 or have, at least, an area being as great as the surface 28.

That is, in the case of FIG. 7, the black-when-off illumination device comprises a 2-dimensional array of primary light sources 60 which, as described above with respect to FIG. 6 may comprise a circular aperture in order to provide for a circular appearance of spot 40, a 2-dimensional array of collimating lenses 64, which are advantageously formed as Fresnel lenses, wherein the two arrays are registered to each other so that the optical axes 68 are parallel to each other and parallel to the output-light direction 32. As described with respect to FIG. 6, the array of lenses and the array of primary light sources may be displaced relative to each other such that the optical axes of the lenses 64 are offset from the positions of the primary light sources so as to result in an output-light direction 32 which is oblique relative to the plane within which the apertures of lenses 64 are positioned and distributed, respectively.

As already described above, by placing each collimating lens 64 at a distance from the primary light source 60, which corresponds to, or is of the order of, the focal length of the collimating lenses 64, it is possible to achieve the low divergence constraint previously formulated. Since each collimating lens 64 is coupled to a single associated primary light source, the primary light source pitch is sizably increased relative to the configuration in accordance with FIG. 20, which means that higher luminous flux per primary light source 60 is needed in order to have the same lumen per unit area. Notably, the collimating lenses 64 make with the eye lens of the observer a telescope which forms the primary light source and its aperture, respectively, onto the retina. This is the reason why each primary light source should have a circular aperture in order to form a circular image in the observer's eye, i.e. form the roundness of spot 40.

So far, the embodiments for black-when-off illumination device showed the actual light emitting zone to be positioned downstream relative to some collimating lens along an optical axis coinciding with an output-light direction. The embodiments outlined further below show that the black-when-off illumination device may comprise an edge-illuminated lightguide emitter panel comprising a wave guiding panel, operated via total internal reflection, one or more light source(s) coupled to an edge of the wave guiding panel, and a plurality of micro-optical elements such as microprisms, microlenses, etc. which contribute in extracting the light from the wave guiding panel into the output-light direction. Thus, while the embodiments of FIGS. 5 to 8 could be called "back-illuminated emitters", the embodiments further outlined with respect to the following figures are termed "edge-illuminated lightguide emitter panels".

Figure 8:
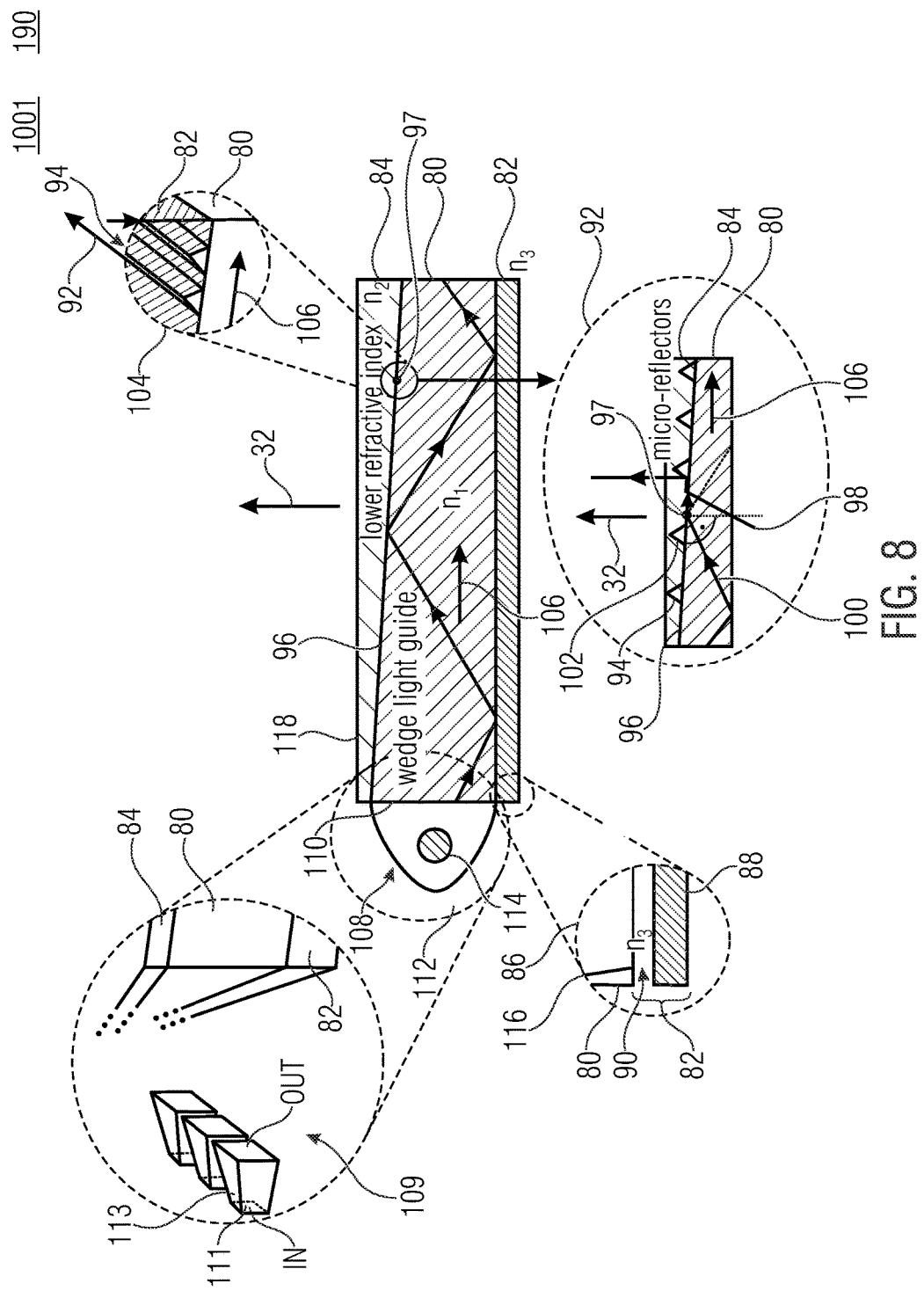
FIG. 8 shows a schematic of an edge-illuminated lightguide emitter panel in accordance with an embodiment.

FIG. 8 shows an embodiment for an edge-illuminated lightguide emitter panel as an example for the black-when-off illumination device according to which same comprises a wedge-shaped lightguide layer 80 sandwiched between an absorber shaped as a light absorbing layer 82 and a light exit layer 84 so that the wedge-shaped lightguide layer guides light by total internal reflection and so that the light absorbing layer 82 is positioned upstream relative to the wedge shaped layer 80 and the light exit layer 84 is positioned downstream relative to the wedge shaped lightguide layer 80, wherein $n_3<n_2<n_1$ with $n_1$ being the refractive index of the wedge shaped lightguide layer 80, and $n_2$ being the refractive index of the light exit layer 84 and $n_3$ being the refractive index of the light absorbing layer 82. As to layers 80 and 84, they may be made of glass or transparent plastics, while several possibilities exist to realize the light absorbing layer 82. The wedge-shaped layer 80 may feature a wedge-slope below 1 degree. As illustrated in FIG. 8 at 86, the light absorbing layer 82 may actually be a light absorbing panel 88 separated from the wedge shaped lightguide layer 80 via a gap 90 filled, for example, with air, vacuum or another low refractive index material, the refractive index of which is denoted by $n_3$. Another possibility would be to form the light absorbing layer 82 by some coating, the coating being composed of material having the refractive index $n_3$ small enough in order to be lower than $n_1$ and $n_2$, concurrently. The light-absorbing layer 82 may absorb at least 70%, advantageously 90%, most advantageously 95% of the visible light which impinges on the light-absorbing layer 82.

As shown in a magnified section 92, the light exit layer 84 comprises a plurality of micro-reflectors 94 at an interface 96 between the light exit layer 84 and the wedge shaped lightguide layer 80 so as to redirect light rays 98 having crossed the interface 96 between the wedge shaped lightguide layer 80 and the light exit layer 84 and propagating at an angle with respect to a normal to an upper (or external) surface 118 of the exit layer which is lower than a limit angle for total internal reflection at said upper surface, wherein said upper surface is a surface of the exit layer facing away from the wedge layer, so that the light reflected by the micro-reflectors propagates out of the light-exit layer into the output light direction 32.

To be more precise, FIG. 8 exemplarily shows a light ray propagating by internal reflection through the wedge shaped lightguide layer 80 along a guiding direction 106, i.e. the direction of gradient along which the wedge shaped lightguide layer 80 gets thinner, which intersects the interface 96 at a point 97 where the angle of the light ray with respect to the normal to the interface 96 is slightly less than the limit angle for total internal reflection. This allows a portion of the light to cross interface 96 and to propagate further at a small angle relative to interface 96 along guiding direction 106, such as ray 98. The micro-reflectors 94 protrude from the interface 96 away from wedge shaped lightguide layer 80 and have reflective surfaces 102 oriented such that reflection of ray 98 points, after refraction from the upper surface 118, into the output-light direction 32. Accordingly, as shown in at 104, the micro-reflectors 94 may be formed translatory invariant or longitudinally along a direction 99 laying in the plane of interface 96 and perpendicular to the direction of gradient 106, with their face 102 facing upstream relative to this guiding direction 106 being oriented for example at approximately 40° to 50° relative to interface 96 in order to achieve an output-light direction 32 nearby the normal direction of interface 96. In particular, the micro-reflectors may, for example, be formed as grooves or voids in the material of the light exit layer 84, at the face of this layer 84 forming the interface 96 with the wedge shaped lightguide layer 80. However, other possibilities do exist, too. In other words, the edge illuminated lightguide emitter panel of FIG. 8 comprises a three-layer structure (TLS). The central layer 80 has a wedge shape and is made of a transparent material of refractive index $n_1$. The bottom layer has refractive index $n_3<n_1$ and is made to absorb visible light which eventually enters the TLS structure from the upper surface 118 of layer 84, e.g. ambient light. The upper layer 84 is transparent, has refractive index $n_2$ fulfilling $n_3<n_2<n_1$ and comprises micro-optical elements such as void microprisms for extraction of the light out of the TLS.

The black-when-off illumination device of FIG. 8 further comprises a concentrator shaped as edge illuminator 108 and configured to couple light into the wedge shaped lightguide layer 80 from an edge 110 thereof into the guiding direction 106. The edge illuminator 108 comprises a light concentrator 112 such as a reflective concentrator and a primary light source in the shape of light source 114. The combination of the concentrator 112 and the light source 114 generates light collimated in a first plane determined by directions 106 and 99 and in a second plane containing guiding direction 106 and the normal to surface 118. The collimation in the first plane may be stronger than the one in the second plane. Such a concentrating device may be shaped for example as a rectangular compound parabolic concentrator (CPC), as depicted in FIG. 8, which comprises a rectangular input aperture IN that is coupled to the LED source and a rectangular output aperture OUT that faces the input facet of the lightguide 110 and comprises four parabolic mirror surfaces each of which is one-dimensionally curved and has a generator parabola lying either in the first or in the second plane, and with all the generating parabolas having their focus in the plane of the input aperture IN. For example, the input aperture IN is shaped as a thin rectangle elongated along the normal to the first plane. Light source 114 may be formed by a 1-dimensional array of primary light sources 111 such as LEDs and the same applies for concentrator 112 in the sense that a 1-dimensional array 109 of pairs of primary light sources 111 and light concentrators 113 such as reflective ones, could be used as edge illuminator 108.

For what concerns the optical operating principles of the embodiment described in FIG. 8, it is noticed that the collimation in the first plane being stronger than in the second plane is useful for guaranteeing the beam exiting the surface 118 to feature similar divergence in a third plane, containing the directions 32 and 106, and in a fourth plane, containing the directions 32 and 99. In fact, the light extraction mechanism here described may perform a substantial reduction of the beam divergence in the plane of incidence of light rays onto the interface 96, but not in orthogonal planes. The combination of layers 80 and 84 behaves as a concentrator, which reduces the beam divergence in said plane of incidence of light rays onto the interface 96, and therefore further contributes to the action of the collimating optics 112 to minimize the divergence of the output beam. When the collimating optics 112 couples the light generated by the primary source 114, such as white light, into the wedge shaped lightguide layer 80, the light rays 100 strike and are initially reflected by total internal reflection by the lower surface 116 of layer 80 facing the light absorbing layer 82 and interface 96 facing layer 84.

The value $n_1/n_2$ should be chosen large enough to guarantee the coupling for the chosen input light divergence as determined by the combination of primary source 114 and concentrator 112. Owing to the wedge structure of the wedge shaped lightguide layer 80, the light beam divergence increases with propagation inside the lightguide layer 80 along propagation guiding direction 106, leading to continuous leakage from layer 80 to layer 84 when crossing interface 96. Notably, for a proper selection of the refractive index values no leakage occurs at the interface between the central and the bottom zone, namely if $n_1/n_2 < n_1/n_3$. The light that has crossed the interface 96 between layer 80 and layer 84 propagates in the light exit layer 84 almost parallel to interface 96, i.e. at a small grazing angle which is, for example, lower than 5° with respect to interface 96. This light could hit the upper surface 118 of layer 84 facing away from layer 80, experience total internal reflection and then cross the interface 96 between layer 80 and layer 84 again. Alternatively, however, light 98 hits one of the micro reflectors 94, thereby being reflected outside the TLS into direction 32. The reflective surface facet of the micro reflectors 84 pointing into the direction of edge illuminator 108 are oriented such that the normal direction of these reflection surfaces 102 are angled relative to the interface 96 at an angle relative to interface 96 corresponding to half the angle which direction 32 encloses with interface 96, plus the aforementioned grazing angle of rays 98. In other words, the angle is chosen according to the desired output angle direction 32. In fact, the micro reflectors 84 may be formed as microprisms, and in particular these prisms may be made as void prisms as already outlined above and illustrated at 104. Those void prisms would reflect the light via total internal reflection. Alternatively, the micro reflectors may be mirror coated indentations of the light exit layer 84. All micro-reflectors 94 may be arranged in parallel to each other and may have the same apex angle in order to achieve a constant output direction 32.

The size and the number per unit area of the micro-reflectors 94, i.e. their density, may change across the TSL, i.e. along the guiding direction 106, in order to optimize the luminance uniformity, i.e. in order to obey the above outlined luminance uniformity request.

The divergence of the light beam exiting the surface 118 in the third plane decreases with decreasing input divergence of the edge illuminator 108 in the second plane on the one hand and the wedge slope on the other hand. For example, for $n_1/n_2=1.0076$, leading to a lightguide 80 that supports an internal mode of about 14°, and for a wedge slope of 0.5°, the output divergence of the light exiting the TLS in direction 32 in the just mentioned third plane is about 2.25° HWHM. Alternatively, $1.001 < n_1/n_2 < 1.1$ may hold true, for example. For the embodiment described in FIG. 8, the output divergence in the orthogonal plane, i.e. in the fourth plane, is basically identical to the input divergence in the first plane. Notably, the output divergences in the two just mentioned orthogonal planes are independent from each other, and the output angular spectrum or luminance angular profile L would likely show a rectangular peak into direction 32. A square spectrum could be obtained by suitably choosing the ratio between the input divergence in the first and second plane. The desired roundness in the light source image appearance, i.e. a round appearance of spot 40, may be achieved by adding a low-angle white-light diffuser such as a "Lee filter 253 Hampshire Frost", or a "Lee filter 750 Durham Frost" downstream the TLS shown in FIG. 8, as it is described herein below. As it is known, a low-angle white-light diffuser is a diffuser which operates by performing the convolution of the angular spectrum of the impinging light with a given response function, which is here taken symmetric around a certain direction (e.g. a normal to a surface of the low-angle white-light diffuser) and having a HWHM divergence less than 10°, advantageously less than 5°, more advantageously less than 2°.

A solution alternative to the usage of the edge illuminator 108 for the purpose of obtaining a collimation in the first plane stronger than in the second plane may be also obtained by using an array of LEDs similar to those described in FIG. 5 but configured in such a way to deliver two different divergence values in two orthogonal planes containing direction 49. For example, HWHM divergence of 2.25° and 20° in the two planes may be obtained using rectangular LED emitters 46 of size 0.31·2.8mm² and a lens dome with focal length 49 of about 4 mm.

The fact that the light absorbing layer 82 of the TLS is light absorbing ensures the black appearance of the black-when-off illumination device when the same is off, thereby fulfilling the above outlined constraints regarding the reflectance luminance profile, i.e. the low luminance value outside the emission cone. In fact, the light absorbing layer's interface to layer 80 behaves as a mirror only for the light guided inside the lightguide layer 80, but is virtually transparent for the light coming from outside the TLS, i.e. such as the aforementioned diffused light entering the light-emitting surface of the black-when-off illumination device from outside. Such light is then, for example, absorbed by the light absorbing panel 88.

Figure 9:
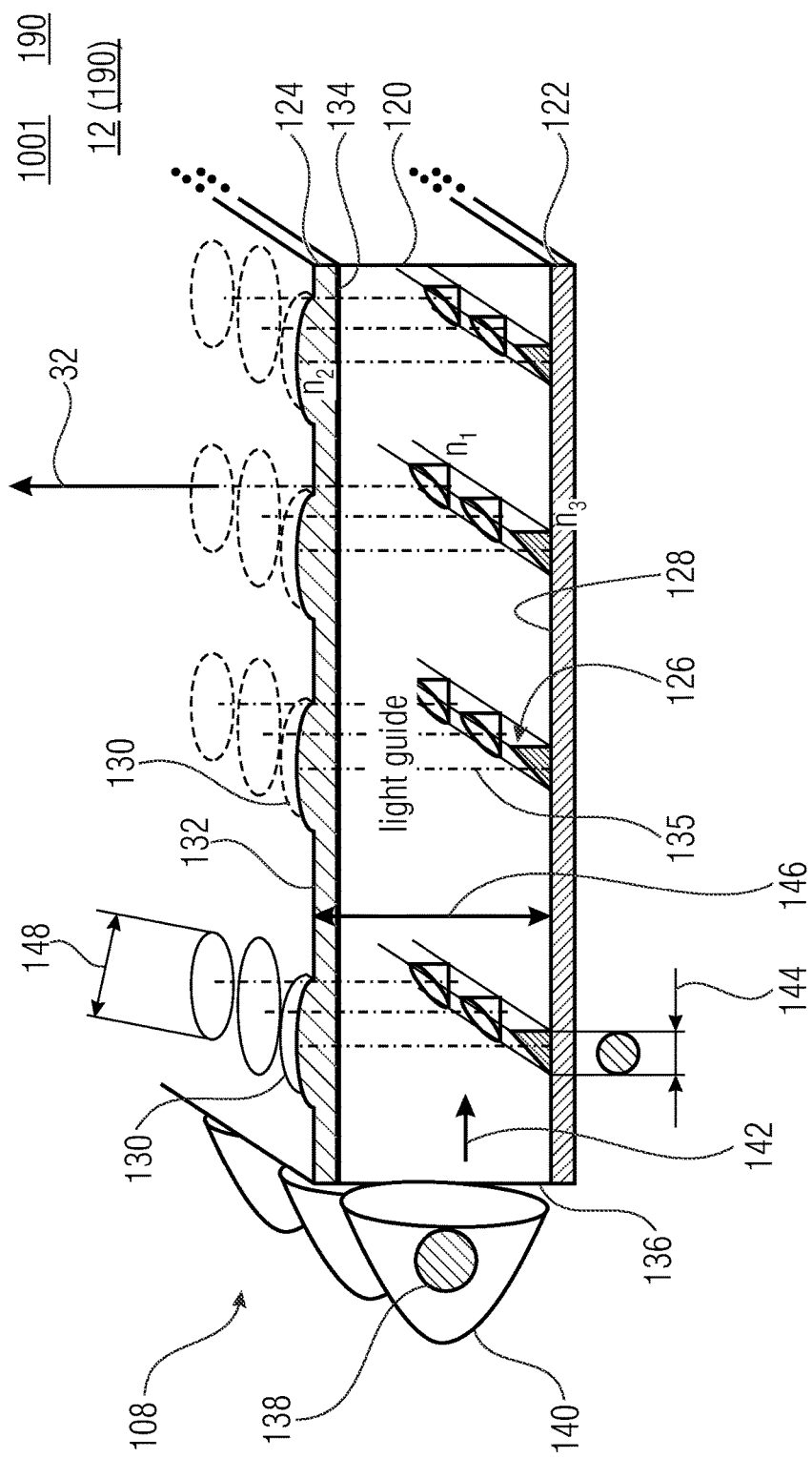
FIG. 9 shows an alternative embodiment for an edge-illuminated lightguide emitter panel.

FIG. 9 shows another example for an implementation of the black-when-off illumination device in the form of an edge illuminated lightguide emitter. Here, the edge illuminated lightguide emitter panel comprises a light guide layer 120 sandwiched between an absorber shaped as a light absorbing layer 122 and a light exit layer 124 so that the light absorbing layer 122 is positioned upstream relative to light guide layer 120 and the light exit layer 124 is positioned downstream relative to the light guide layer 120. With regard to possible implementations of layers 120, 122 and 124, reference is made to the description of FIG. 8. However, there is a greater freedom in choosing the refractive indices of layers 120 to 124. In particular, $n_3 < n_1$ and $n_2 < n_1$ is sufficient with $n_1$ being the refractive index of the light guide layer 120, $n_2$ being the refractive index of the light exit layer 124, and $n_3$ being the refractive index of the light absorbing layer 122, which may comprise a transparent gap as described for the layer 82 of FIG. 8. The light guide layer 120 comprises a plurality of micro-reflectors 126 at an interface 128 between the light absorbing layer 122 and the light guide layer 120 so as to redirect light internally guided within the light guide layer 120 toward the light exit layer 124 at an angle with respect to the normal to the interface 134 between layer 120 and 124 which is smaller than the limit angle for total internal reflection for the light guided within layer 120. Each micro-reflector 126 is positioned at a focal point of a respective lens 130 formed on an outer surface 132 of the light exit layer 124 facing away from the light guide layer 120. The combination of the micro-reflector 126 and lens 130 arrays thus constitutes a concentrator to reduce the divergence of the output light.

Other than the embodiment of FIG. 8, the configuration of the edge illuminated lightguide emitter panel of FIG. 9 is based on a rectangular light guide layer 120, i.e. the light guide layer 120 has parallel interfaces to layers 122 and 124, respectively, namely interface 128 to light absorbing layer 122, and interface 134 to light exit layer 124. The micro-reflectors 126 and the collimating lens formed at the outer surface of the light exit layer 124 are 2-dimensionally distributed along the interface 128 and the outer surface 132, respectively, and registered to each other so that the optical axis 135 extending through each micro-reflector 126 and the respective collimating lens 130 are parallel to each other and the output-light direction 32, respectively. Further, an edge illuminator 108 couples light into an edge 136 of the light guide layer 120, wherein as shown in FIG. 9 this edge illuminator 108 may also be composed of a 1-dimensional array of pairs of a primary light source 138 and corresponding concentrator 140 extending 1-dimensionally along the edge 136 just as illustrated in FIG. 8.

That is, each micro-reflector 126 faces a corresponding one of the collimating lenses 130, both being positioned at a focal distance from each other. The micro-reflectors 126 have an elliptic mirror face oriented so as to mirror light coupled into the light guide layer 120 along a central propagation direction 142 (i.e. the direction along which the lightguide is illuminated), into the direction 32, i.e. along optical axis 135. In particular, the shape of the micro-reflectors 126 may be that of a cylinder protruding from interface 128 and being cut at the just mentioned mirror angle, i.e. the angle that may be used in order to lead to a circular cross section when projected onto a plane orthogonal to direction 32. This circumstance ensures circular output angular spectrum, and thus the visual appearance of a round source or spot 40. The ratio between the lenses' focal length and reflectors' size/width measured in the just mentioned plane orthogonal to direction 32, for example as indicated at 144 in FIG. 9 for the case of direction 32 perpendicular to surface 134, defines the output FWHM angular spectrum or luminance profile L and therefore has, for example, a value in the range of 10 to 100, depending on the desired divergence. For example, reflectors 126 with diameters 144 of 100 micron and lenses of 3 mm focal length 146, wherein the focal length is defined in the refractive layers 120 and 124, lead to about 1.5° divergence HWHM downstream the surface 132, wherein refractive index of layers 120 and 124 are assumed to have value about 1.5 and propagation in air is assumed downstream layer 124. The size of the lenses 130 is determined by the need of capturing the light reflected by the micro-reflectors. For example, it can be taken 1.5 times the product between the focal length 146 and 2 times the tangent of the internal lightguide mode half divergence, which means a lens diameter 148 of the order of one half of the focal length for a lightguide coupling 2×10° internal divergence mode. The lateral distribution or density of the 2-dimensional distribution of the reflector/lens-coupler pairs should be tailored in order to maximize luminance uniformity, averaged over an area of few-lens diameter. The lenses 130 may be formed on the material of layer 124 featuring a flat interface 134 with the lightguide layer 120 and a lower refractive index. In doing so, the lenses 130 do not interfere with the lightguide 120 and operate only on that light which is reflected by the micro-reflectors 126 so as to exit the emitting surface 28 in direction 32.

Figure 10:
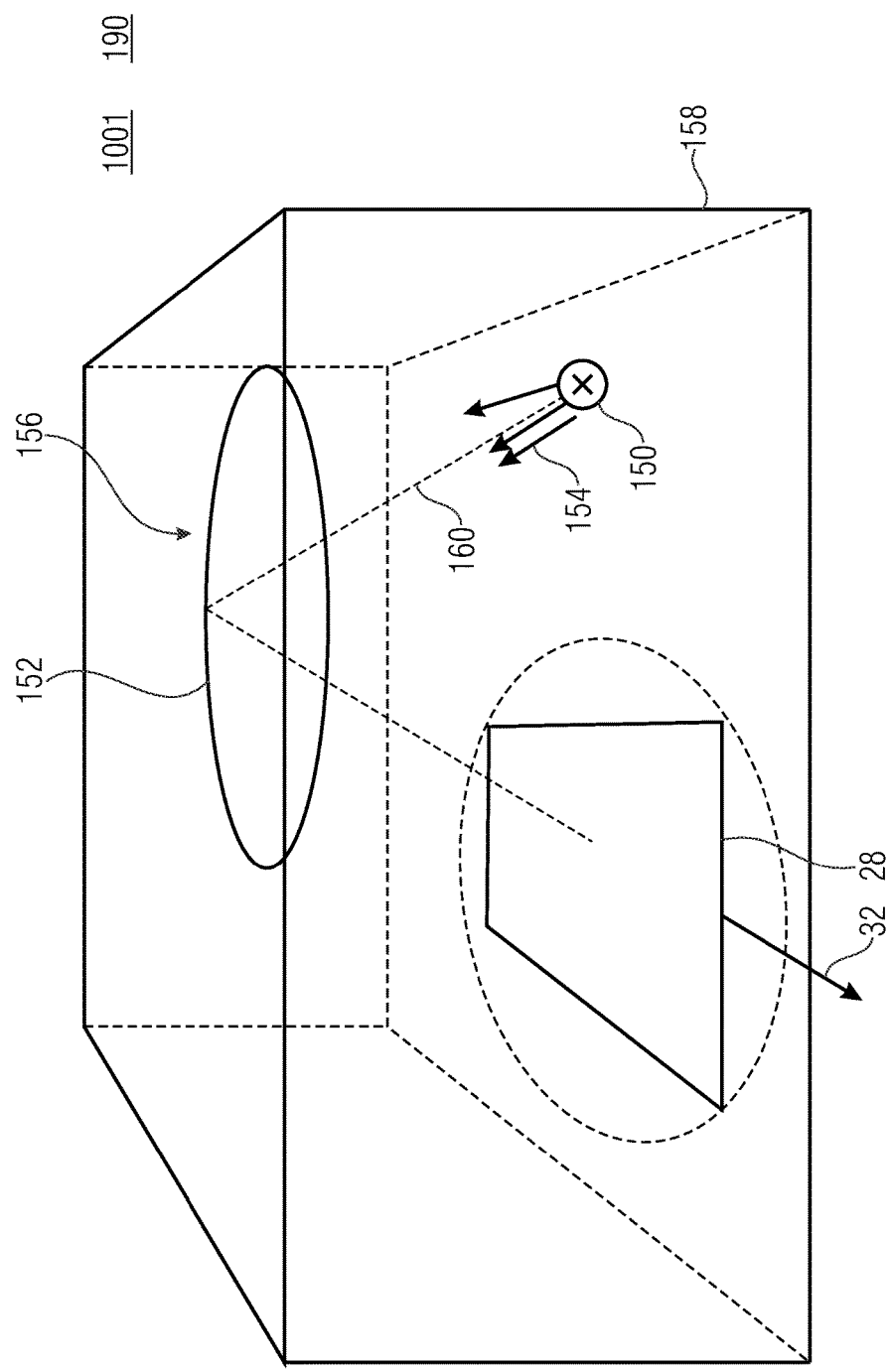
FIG. 10 shows 3-dimensionally a schematic of an embodiment for the black-when-off artificial illumination device using an optical mirror system, oblique back-illumination of the emitting surface and a dark box.

FIG. 10 briefly shows another possibility of forming the black-when-off illumination device. In that case the primary light source comprises a primary light source such as a combination of a light emitter and a concentrator, indicated at 150 in FIG. 10. Said primary light source lights the emitting surface 28 of the black-when-off illumination device via a mirror system 156 which, exemplarily, merely consist of one mirror 152 in the case of FIG. 10. Light source 150 and mirror system 156 are arranged such that the light beam 154 generated by light source 150 is collimated by the mirror system 156 and, thus collimated, impinges onto a rear face of the emitting surface 28 so as to exit the emitting surface 28 with a luminance angular profile L obeying any of the above mentioned constraints into the output-light direction 32. To this end, the mirror system 156 comprises, for example, a concavely curved mirror such as mirror 152. In other words, the primary light source 150 is placed at a focal plane of mirror system 156, which in turn acts as a concentrator for light exiting the primary light source 150, and images primary light source's 150 aperture into infinity along direction 32 through emitting surface 28. In order to conform to the above identified constraints with respect to the reflectance luminance angular profile LR, light source 150 and mirror system 150 are housed within an absorber shaped as a dark box 158 fully covered by light absorbing material along the dark box's internal surface and comprising a window forming the emitting surface 28. Advantageously, the mirror system 150 is configured such that no light beam emanating from emitting surface 28 into the inner of dark box 158, which hits that mirror 152 of mirror system 156, which is positioned most downstream along the optical, bended light path 160 leading from light source 150 to emitting surface 28, is reflected by this mirror system 156 back to emitting surface 28.

It should be noted that the examples for black-when-off illumination devices presented with regard to FIGS. 4 to 9 are advantageous over the embodiment of FIG. 10 in that same are more compact and that same are easier to be implemented such that the angle between the output-light direction 32 on the one hand and the normal direction of the emitting surface 28 on the other hand is, for example, smaller than 10° or even smaller than 5°.

Some of the embodiments for the black-when-off illumination device outlined above may suffer from strong spatial luminance modulation over the emitting surface 28. For example, in case of the embodiments of FIGS. 6 and 7, the light illuminance over each collimating lens 64 is featured by such spatial modulation being, for example, a few times more intense at the center of the lens aperture than at the border of each lens 64. In such case, the just mentioned illuminance periodic modulation of the collimating lens 64 automatically translates into a periodic luminance modulation over the emitting surface 28. Such effect is detrimental with respect to the quality of the scope of the present invention.

With respect to the embodiments of FIGS. 6 and 7 it should also be mentioned that the problem just described, namely the problem regarding the non-constant illumination across the collimating lens' aperture, might also be addressed by the usage of primary lenses, such as freeform lenses, placed downstream the primary light source 60 between the primary light source and the collimating lens 64, advantageously nearer to the primary light source 60, in order to provide a homogeneous illumination of the collimating lens 64 across its aperture. In other terms, the freeform lens is configured to flatten the illuminance distribution of the primary light onto the collimating lens.

Figure 11A:
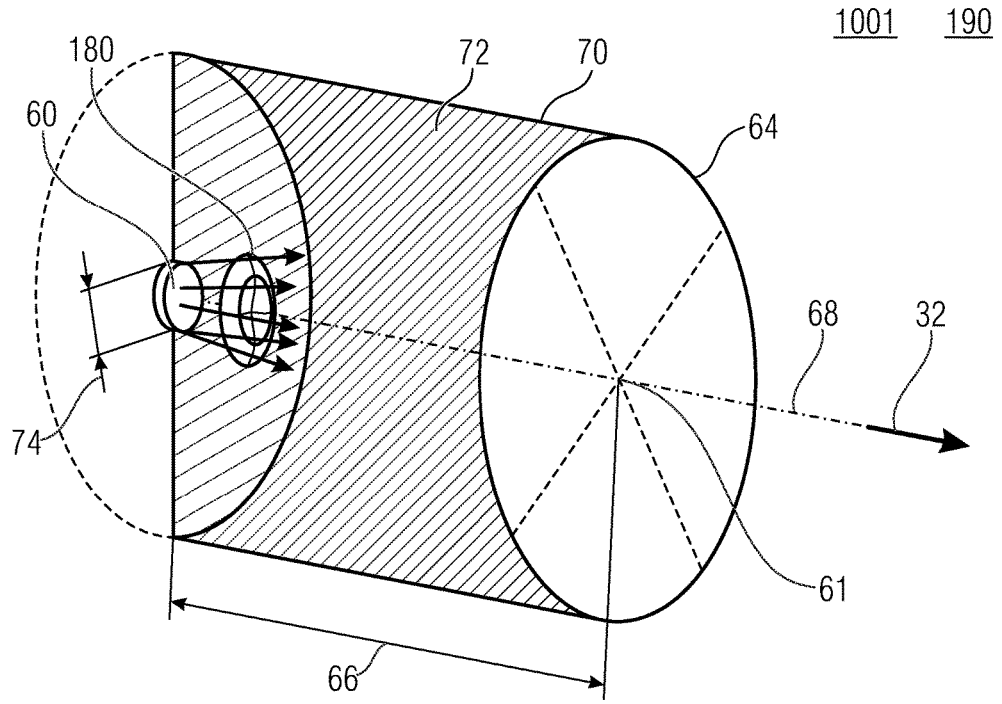
FIG. 11a schematically shows the artificial illumination device of FIG. 6 including a freeform lens for achieving a homogeneous illumination.

Exemplarily, FIG. 11a shows a freeform lens 180 positioned between the primary light source 60 and its collimating lens 64 along optical axis 68. Naturally, such freeform lenses 180 may also be used in the embodiment of FIG. 7 with respect to each pair of primary light source 60 and collimating lens 64.

Figure 12:
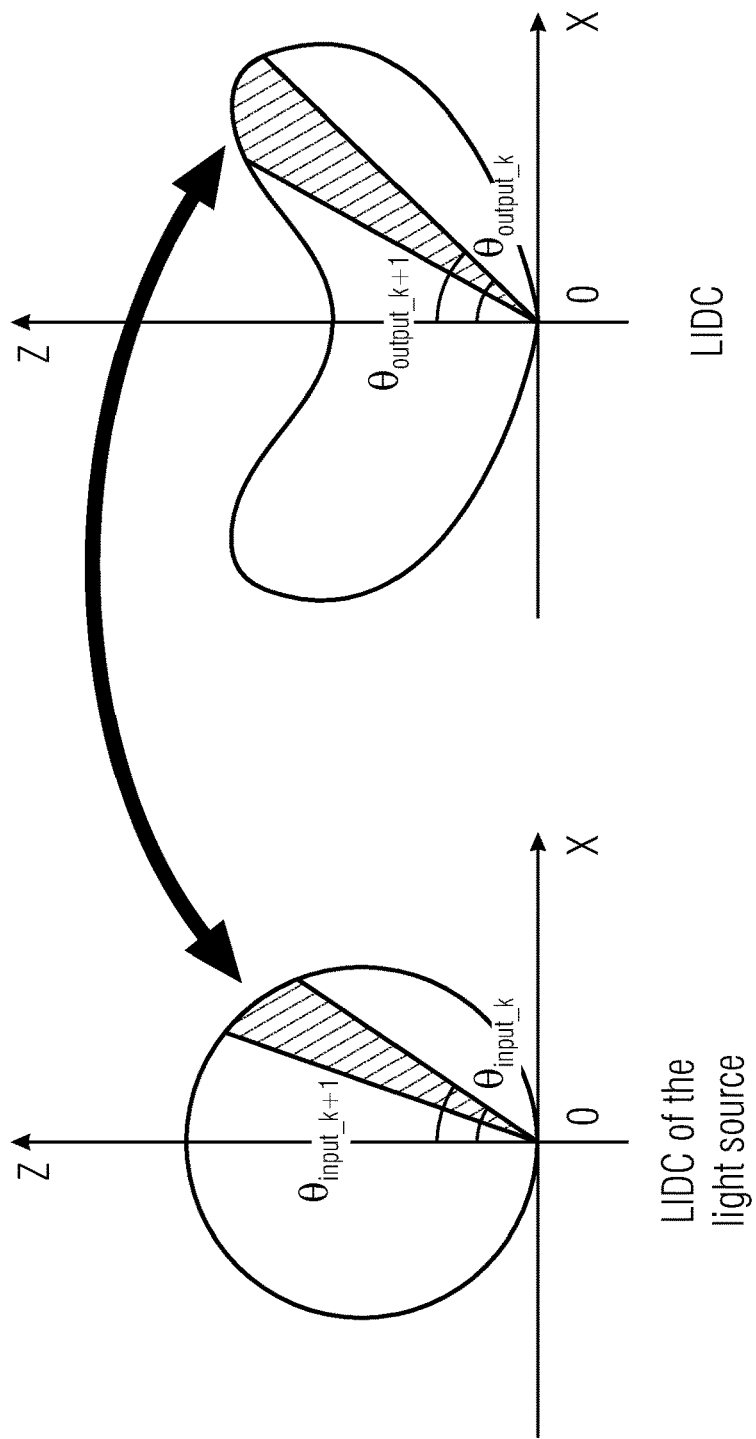
FIG. 12 schematically shows the targeted influence of the freeform lens and the light concentrator of FIG. 11a and 11b onto the light intensity distribution curve of the primary light source with the left hand side showing the original distribution curve and the right hand side showing the target distribution curve for achieving a homogenous illumination in lateral dimensions along the emitting surface.

In order to understand the issue of the freeform lens better, reference is made to FIG. 12. Due to the propagation of light between the primary light source 60 on the one hand and the collimating lens 64 on the other hand, the illumination distribution over the input surface (aperture) of lens 64 is in general non-homogeneous. Moreover, in order to minimize loss of light, a further requirement for the light distribution at the input surface of the lens 64 is that the illuminance rapidly decreases outside the area of the aperture of lens 64.

A second important point is the visual appearance of the source 60 in the observer's eye. Since a circular image of the artificial infinite-distance object shall be obtained, a circular appearance of the primary light source 60 is needed.

Freeform lenses could achieve one or possibly most of the previous requirements. In particular, the requirement of uniform illumination may be tackled by using an optical element which redirects light propagating around the axial direction with low propagation angle towards the outer region of emission, as shown on the left hand side of FIG. 12.

After a certain propagation distance, such intensity profiles achieve a sufficient uniformity on the target.

In a particular embodiment, the freeform lens 180 features a circular shape in order to facilitate the visual appearance of a round source of light when the freeform lens 180 is imaged by the eye of the observer through the lens 64.

Finally, it should be mentioned that optical components different from freeform lenses could also be used for the previous requirements. For example, reflective compound parabolic concentrators CPCs may be used to achieve uniform illumination onto lens 64. Analogously to the freeform lens case, the output aperture of such CPC elements may be circular in order to facilitate the visual appearance of a round source of light when the output aperture of the CPC is imaged by the eye of the observer through the lens 64.

Figure 11B:
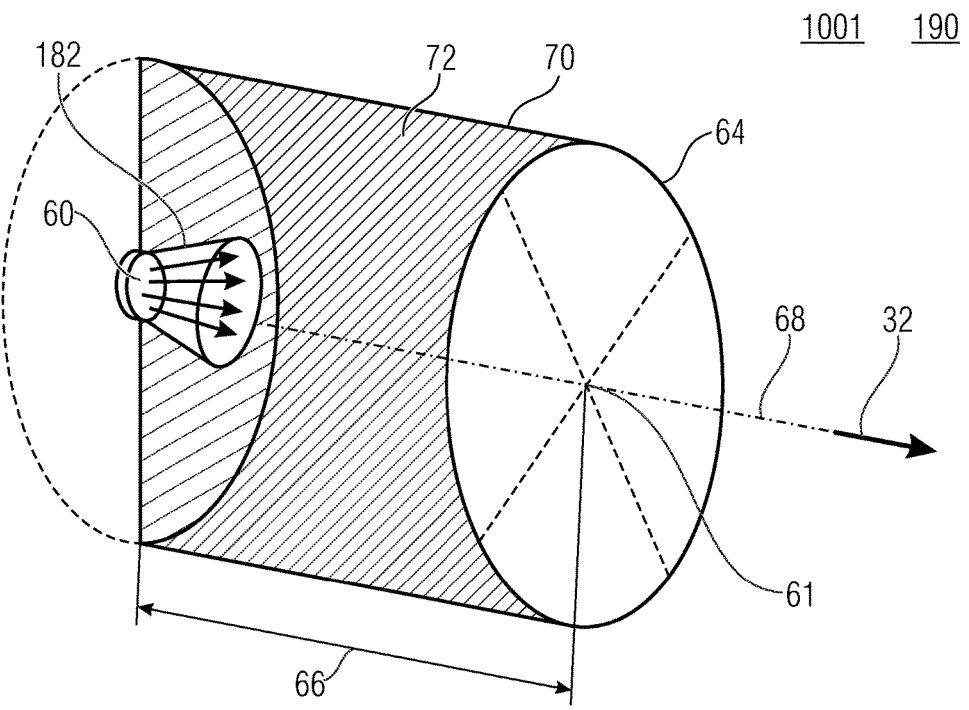
FIG. 11b schematically shows a black-when-off artificial illumination device of FIG. 6 including a light concentrator for achieving a homogeneous illumination.

For the sake of completeness, FIG. 11b shows the alternative of using such a reflective CPC 182 in front of, i.e. downstream, the primary light source 60.

In the cases of the embodiments shown in FIGS. 11a,b and 12 the width 74 of the primary light source 60 and distance 66 between primary light source 60 and lens 64 are corrected in order to account for the differences in construction, due to the presence of the freeform lens 180 or CPC 182.

Notably, the embodiment of FIGS. 11a,b and 12 are also combinable with the embodiment of FIG. 7.

The embodiments for the black-when-off illumination device provided so far may in some cases exhibit minor problems in achieving the above identified luminance angular profile constraints due to, for example, scattering problems or the like. In accordance with the embodiments further outlined below, these problems are addressed by using any of the above outlined embodiments for the black-when-off illumination device, namely the ones described with respect to FIGS. 4 to 11, 11a,b and 12, with any of the micro-optics beam-homogenizer layers described next in that the aforementioned embodiments for black-when-off illumination device are used as a collimated light source 190 for generating a pre-collimated light front with a micro-optics beam-homogenizer layer 192 being positioned downstream the collimated light source 190 and upstream the emitting surface 28. The micro-optics beam-homogenizer layer 192 thus positioned is able to transform a first collimated beam featured by the presence of stray light that impinges onto said homogenizer layer 192 from the collimated light source 190 into a second collimated beam with divergence equal to or larger than the divergence of the first collimated beam and which is free from stray light. Such second collimated beam thus exits the emitting surface 28 as depicted in FIG. 13a.

Stray light as just described may for example stem from non-ideal behavior of some Fresnel lenses in the case of using Fresnel lenses in order to embody the collimating lens 64. Owing to scattering from the groove tips of such Fresnel lenses 64, multiple internal reflection, etc., the Fresnel lens 64 lit by the primary light source 60 may have a luminance profile which does not go to zero out of the narrow peak 30. In contrast, it may be featured by a residual profile, which is also structured both in angle and in position, which finally might make the Fresnel lenses 64 a clearly visible and luminous object in embodiments of FIGS. 6 and 7, where in contrast a complete dark or uniform background would be needed. Problems like this may also occur with respect to the other embodiments for the black-when-off illumination device and collimated light source 190, respectively, described so far.

Even if such luminance background is low, e.g. below 1% of the peak luminance value, due to its inhomogeneity, such luminance background may be visible thus spoiling the quality of the natural sky. In order to solve such a problem, a micro-optics beam-homogenizer layer 192 may be used, for which specific embodiments are described further below.

Figure 13A:
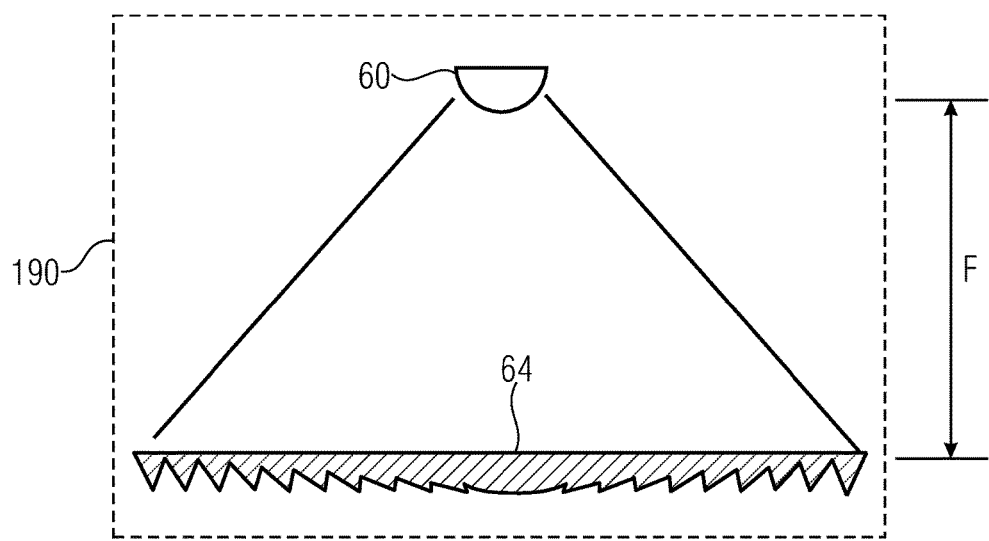
FIG. 13a schematically shows a cross section of a micro-optics beam-homogenizer layer in accordance with a first embodiment where same comprises one lens array and one pinhole array.
Figure 13A:
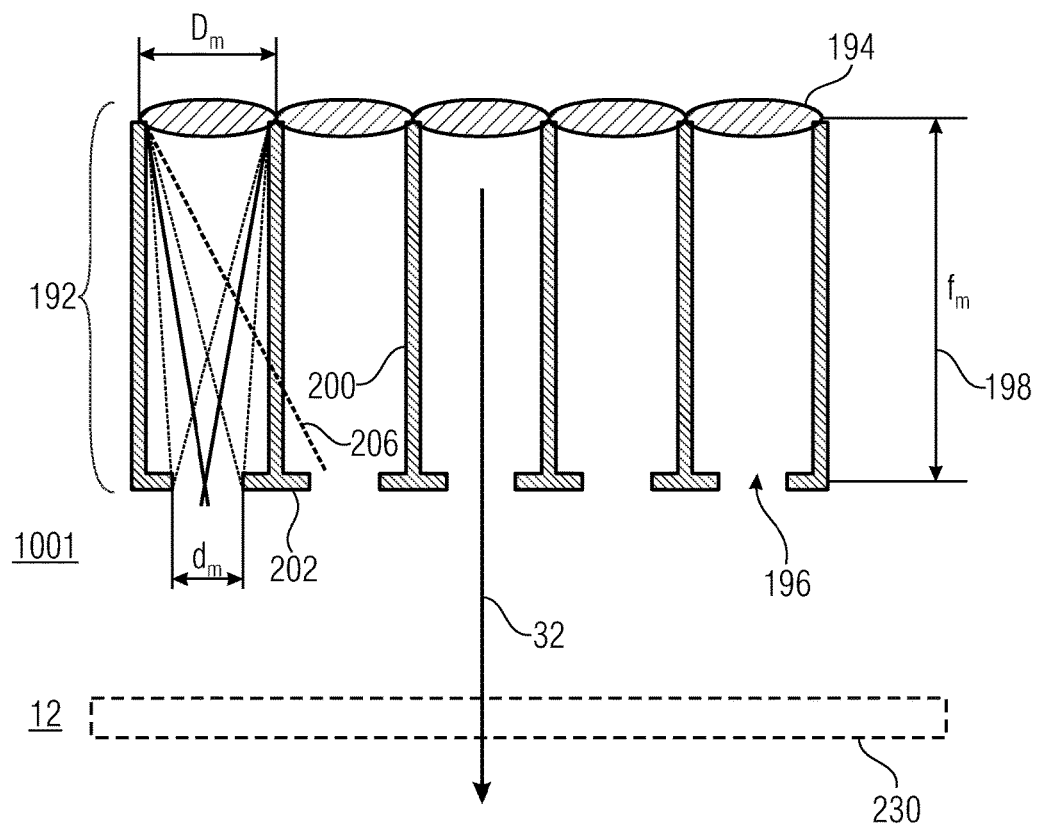
Figure 13B:
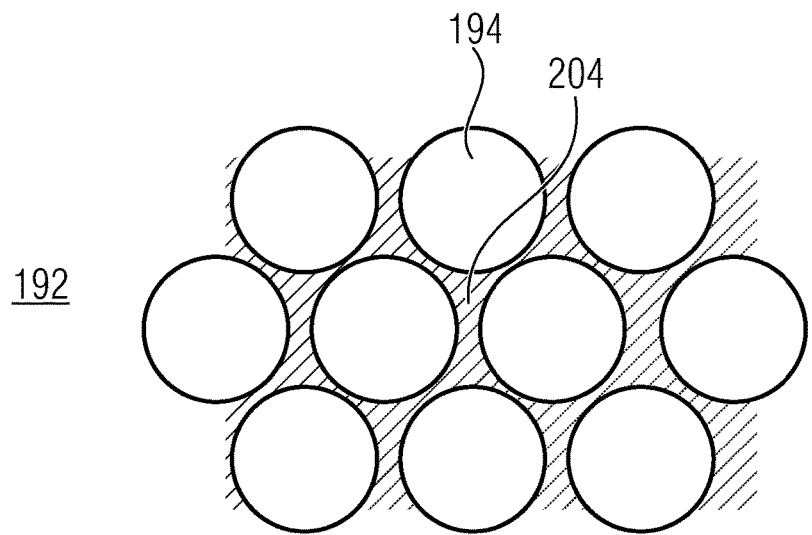
Figure 13C:
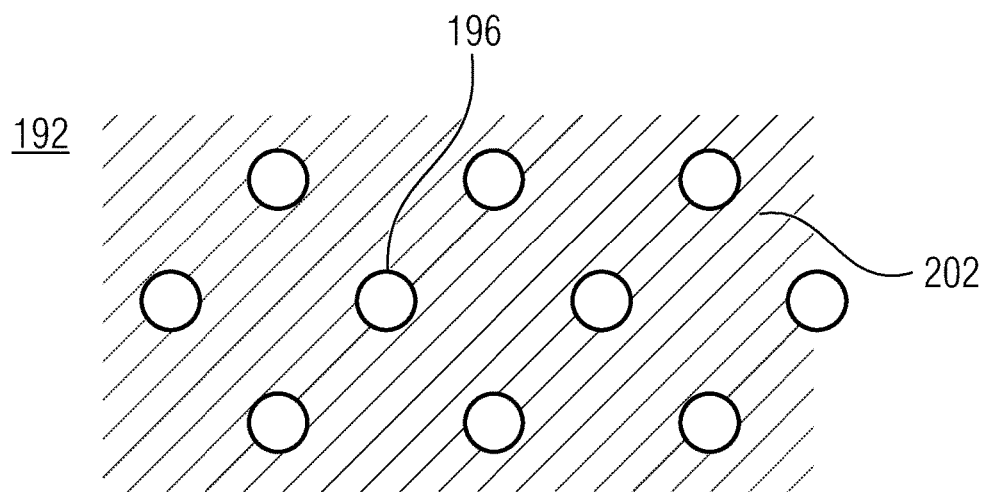

A first embodiment for the micro-optics beam-homogenizer layer 192 is described with respect to FIG. 13a-c. FIG. 13a-c shows exemplarily a combination of a light emitter and a concentrator such as a primary light source 60 and a Fresnel lens 64 as an example for the collimated light source 190, but as already stated in the preceding paragraph, the beam-homogenizer layer 192 exemplified in FIG. 13a-c is combinable with any of the embodiments for the black-when-off illumination device described so far above in order to result in further embodiments for the black-when-off illumination device comprising a combination of collimated light source 190 and beam-homogenizer layer 192.

The micro-optics beam-homogenizer layer 192 of FIG. 13a-c comprises a 2-dimensional array of microlenses 194 and an absorber shaped as an absorbing layer 202 perforated by a 2-dimensional array of pinholes 196 positioned and extending downstream the 2-dimensional array of microlenses 194 so that each microlens 194 has a pinhole 196 associated therewith. The embodiment of FIG. 13a exemplarily refers to the case in which the output-light direction 32 is perpendicular to the plane containing the 2-dimensional array of microlenses 194. Each pinhole 196 is positioned at a distance to the respective microlens 194 corresponding to a focal length 198 of the respective microlens and at a direction coincident with an output-light direction 32. For reasons set out in more detail below, the microlenses 194 advantageously have a circular aperture with a diameter $D_m$. Advantageously, the diameter $D_m$ is smaller than 5 mm, more advantageously smaller than 3 mm, even more advantageously smaller than 1.5 mm. Advantageously, the microlenses 194 are packed together into the 2-dimensional array as closely as possible, i.e. at the highest possible density, and accordingly the number of microlenses 194 facing one collimating lens 64 in accordance with any of the embodiments of FIGS. 6 and 8 as a collimated light source 190 will very likely be higher than illustratively shown in FIGS. 13a-c. For example, the pitch at which microlenses 194 and pinholes 196, respectively, are arranged within their 2-dimensional arrays, may be equal to diameter $D_m$ or at least smaller than $1.5 \times D_m$.

Further, the focal length $f_m$ 198 of the microlenses 194 may be chosen so as to obey $D_m/f_m < 2 \cdot \tan(7.5°)$, advantageously $< 2 \cdot \tan(5°)$, most advantageously $< 2 \cdot \tan(2.5°)$. The diameter of the pinholes 196, which exemplarily may also be of circular shape, is chosen in accordance to the HWHM divergence $\vartheta_{IN}$ of the collimated light impinging onto the beam-homogenizer layer 192 from the collimated light source 190, e.g. $d_m$ may obey $d_m \geq 2f \tan(\vartheta_{IN})$.

Using these constraints, the above constraints put onto the luminance profile L could be achieved at the downstream side of the beam-homogenizer layer 192 which would, in accordance with the embodiment of FIGS. 13a-c, form the emitting surface 28. In a different embodiment, as described below, the emitting surface 28 may be positioned downstream of the beam-homogenizer layer 192, so that the constraints on the luminance profile L would be achieved only at this surface. In case of the shape of the pinholes 196 being non-circular, $d_m$ may denote the diameter of a circle having the same area as the pinholes 196.

As also shown in FIGS. 13a-c, the micro-optics beam-homogenizer layer 192 may further comprise an absorber shaped as channel separation structure 200 configured to reduce crosstalk between neighboring pairs of microlenses 194 and pinholes 196. In particular, the channel separation structure 200 may be formed by tubes, each extending along direction 32 with one of the microlenses 194 positioned at an upstream side of the respective tube and one of the pinholes 196 positioned at a downstream side thereof. Advantageously, the channel separation structure 200 absorbs light in the visible region and has, for example, in the visible an absorbance of higher than 70%, advantageously 90%, more advantageously 95% for light impinging onto the channel separation structure 200. The channel separation structure 200 may also fill space 204 between the microlenses 194 as shown in FIG. 13b.

The embodiment of the beam-homogenizer layer 192 thus employs the use of a layer of lenses 194 facing the inbound collimated light front emitted from the collimated light source 190, followed by an absorbing mask 202 placed in the focal plane of these lenses 194 with a series of pinholes 196. The center or very center of each pinhole 196 corresponds to the center or very center of a lens 194 of the lens array under direction 32, i.e. the lens 194 and pinhole 196 arrays are registered one with respect to the other. By means of this configuration, the output angular profile L exhibits a flat-top distribution featuring the same shape of the aperture of lenses 194, i.e. it is a square flat-top if square type lens apertures were used or hexagonal if hexagonal apertures were used for lenses 194. In order to have a circular image of spot 40 in the observer's eyes, it is thus useful to have lenses 194 with circular aperture. The space between the apertures, i.e. space 204, should be light absorbing such as blackened with an absorbing layer. The divergence as measured, for example by $\vartheta_{HWHM}$, of the output beam is related to the focal length $f_m$ and the full diameter $D_m$ of the lenses 194 as $\vartheta_{HWHM} \approx \arctan(D_m/(2f_m))$.

The divergence of the beam impinging from the collimated light source 190 onto the array of lenses 194 affects the output divergence $\vartheta_{HWHM}$ by introducing a blur of the flat-top distribution, thus smoothing the sharp order of the circular image. The diameter of the pinholes 196 also affects the sharpness of the output angular distribution L: smaller pinholes 196 imply a sharper image; however, smaller pinholes 196 with a concurrently relatively large divergence before the array of lenses 194 also mean higher losses at the absorbing mask 202.

The beam-homogenizer layer 192 of FIGS. 13a-c has the advantage that the last layer, i.e. the one arranged at the downstream end of the beam-homogenizer, is a black (absorbing) layer perforated by a 2-dimensional array of pinholes, which masks the presence of the array of lenses 194 to the observer's eyes. Therefore the embodiment of FIGS. 13a-c ensures optimal performance with respect to the goal of minimizing the reflected luminance, i.e. of ensuring the black appearance of the black-when-off illumination device when the device is off.

However, in order to avoid the pixelation of the image in correspondence of the pinholes layer 202 due to the alternation of transmitting and absorbing zones, a low-angle white-light diffuser 230 may be positioned downstream the pinholes layer 202, as described also below, in order to blur the image of the pinholes 196 and ensure uniform luminance at the low-angle white-light diffuser 230 plane, which would then coincide with the emitting surface 28. In order to prevent excessive blurring in the narrow peak 30 of the luminance profile, the white-light diffuser 230 is taken with HWHM response function $\leq 10°$, advantageously $\leq 5°$, more advantageously $\leq 2°$. In order to ensure luminance uniformity, the white-light diffuser 230 is placed sufficiently apart from the plane of pinholes layer 202, e.g. at a distance from 1 to 3 times the $f_m$. However, the usage of white-light diffuser 230 is not always necessary, e.g. it may be not necessary when the observer is supposed to observe the illumination device from a large distance (for example, from a 3-5 m distance) and it is not necessary when the diameter $D_m$ of lenses 194 is taken as sufficiently small for the foreseen distance of observation, e.g. smaller than 1 mm, advantageously smaller than 0.5 mm.

It is worth noting that the problem of registering the array of lenses 194 and the array of pinholes 196 is solved by directly manufacturing the array of pinholes 196 by means of the array of lenses 194 itself. For example, a high intensity laser focused by lenses 194 onto the absorbing layer 202 which is at the beginning of the fabrication process a continuous layer, i.e. without any holes/pinholes 196, etches the pinholes 196 into layer 202. By controlling the power and the divergence of such a laser beam, the pinhole dimension, i.e. the pinhole diameter $d_m$, is set as appropriate.

As an example, 1.5 mm apertures for the lenses 194 and focal length of the order of 1.7 cm results in a half angular output divergence of 2.5°, approaching the desired divergence of the output light as described above.

The use of the described channel separation structure 200, the use of which is, though, optional, is to prevent crosstalk effects between neighbor pairs of lens 194 and pinhole 196. These crosstalk effects may manifest into a series of ghosts replicas of the infinite distance object's image around the central high intensity one. These might occur in presence of intense stray light in the light beam impinging onto the beam-homogenizer layer 192 at sufficiently large propagation angles, for example larger than $(D_m/f_m)-(d_m/(2\ f_m))$ radians, as illustrated by ray 206 in FIG. 13a. In this case, such intense stray light 206 propagating at large angle could be focused by one lens 194 into a pinhole 106 associated with a neighboring lens 194.

The channel separation structure, as explained above and shown in FIGS. 13a-c, may be formed by an array of tubes of absorbing material, i.e. one tube per pair of lens 194 and pinhole 196, these tubes constituting a third array of elements positioned between the array of lenses 194 and the array of pinholes 196. Light impinging onto the array of lenses 194 at a large angle and which would, without the channel separation structure 200, be focused onto neighboring pinholes, i.e. pinholes belonging to neighboring lenses 194, is then absorbed by the channel separation structure 200, thus eliminating the crosstalk. The output pinholes layer 200 may also be eliminated in the latter case since these would be substituted by the apertures of the tubes of the channel separation structure 200 itself, at the cost of adding angular blur to the output luminance distribution.

Figure 14:
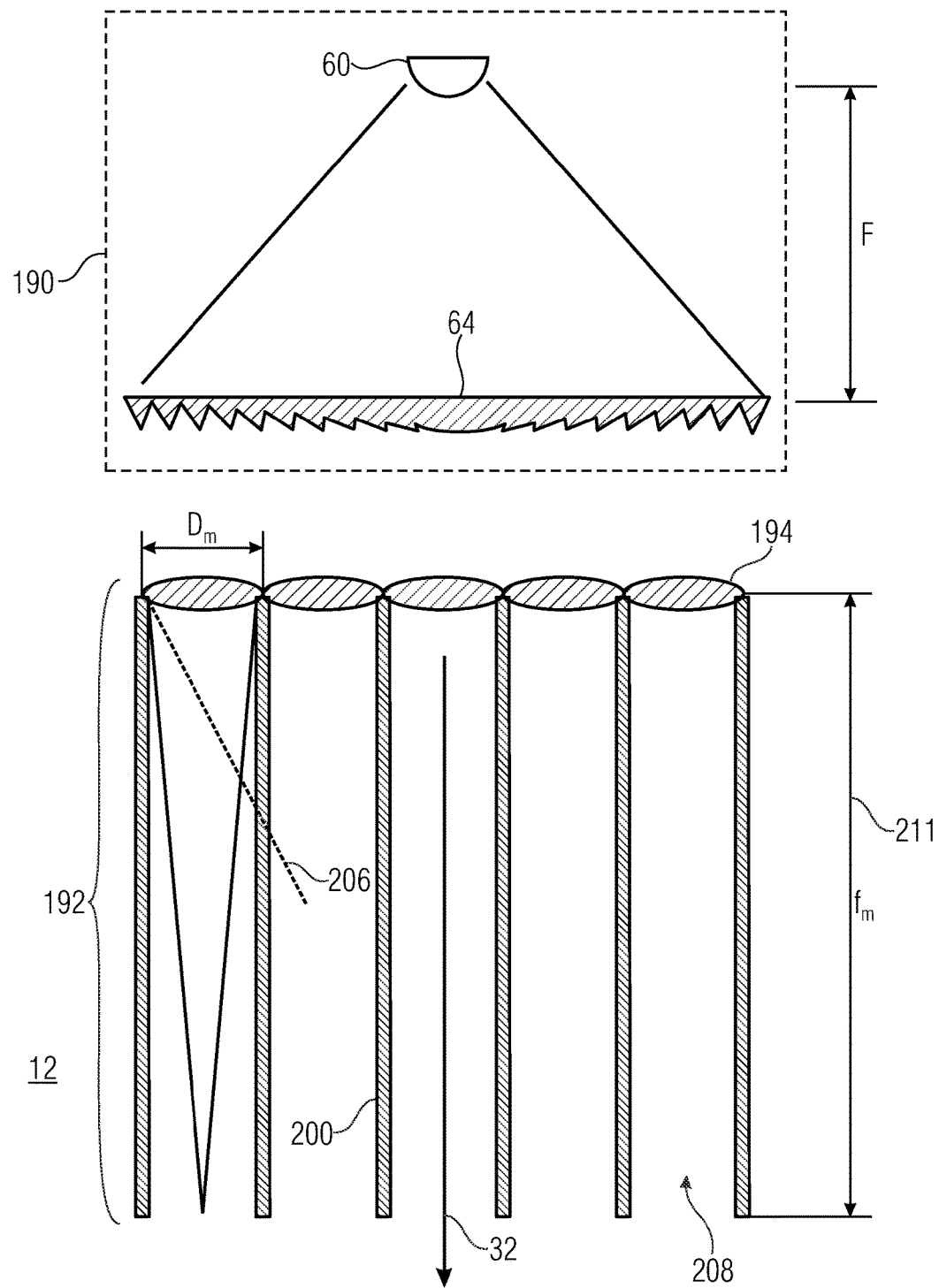
FIG. 14 schematically shows a cross section of a micro-optics beam-homogenizer layer in accordance with a further embodiment where same comprises one lens array and one tube array.

Therefore, a further embodiment for the micro-optics beam-homogenizer layer 192, as shown in FIG. 14, comprises a 2-dimensional array of microlenses 194 and an absorber shaped as a channel separation structure of a 2-dimensional array of micro tubes 200 extending downstream the 2-dimensional array of microlenses 194 so that each microlens 194 has a micro tube associated therewith which extends from the respective microlens 194 into the output-light direction 32, just as it was the case with the embodiment of FIGS. 13a-c. For what concerns the diameter $D_m$ of the microlenses 194 and the focal length $f_m$ of the microlenses 194 reference is made to the description of the embodiment of FIGS. 13a-c. For what concerns the length l of the micro tubes 200 marked as 211 in FIG. 14, such length l may not necessarily be equal to $f_m$, but it may vary in the range $0.5\ f_m < l < 1.2\ f_m$.

Figure 15:
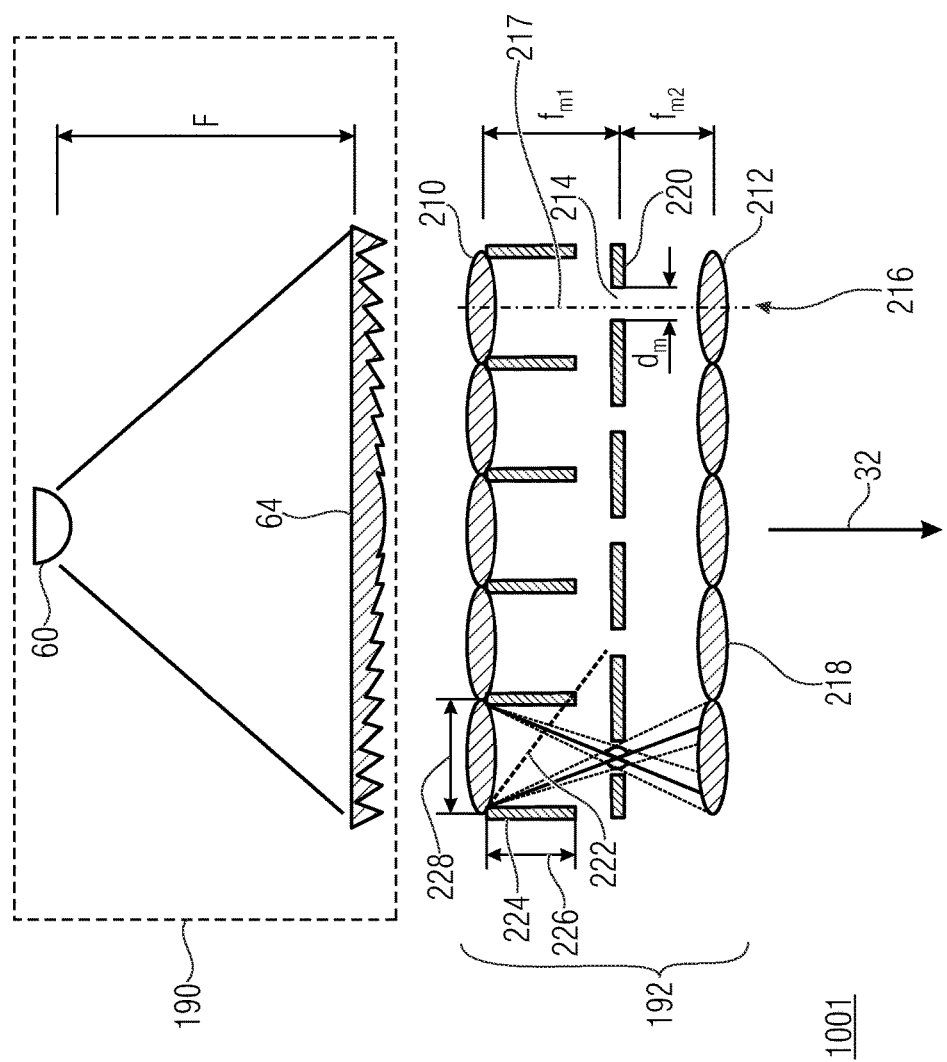
FIG. 15 schematically shows a cross section of a further embodiment of a micro-optics beam-homogenizer layer where same comprises two lens arrays and one pinhole or tube array.

FIG. 15 shows a further embodiment for a micro-optics beam-homogenizer layer 192. Just as it was the case with respective FIGS. 17a-c and 18, the micro-optics beam-homogenizer layer 192 is shown in combination with the collimated light source 190 so as to form a further embodiment for a black-when-off illumination device, but although the collimated light source 190, comprising an emitter and a concentrator, is exemplarily shown to comprise a combination of a Fresnel lens 64 and a primary light source 60 as it was the case in the example of FIG. 6, any of the previously described examples of FIGS. 5 to 11, 14 and 15 could be used for implementing the collimated light source 190.

The micro-optics beam-homogenizer layer 192 of FIG. 15 comprises a first 2-dimensional array of microlenses 210 of focal length $f_{m1}$, a second 2-dimensional array of microlenses 212 of focal length $f_{m2}$, and an absorber shaped as an absorbing layer 220 perforated by an array of pinholes 214 arranged between the first and second arrays of microlenses 210, 212 so as to form an array of telescopes 216 distributed laterally in an array-like manner such as hexagonally packed or the like, and having the telescope axes parallel to each other and parallel to the output-light direction 32. In each telescope 216, the respective pinhole 214, the respective microlens 210 of the first 2-dimensional array and the respective microlens 212 of the second 2-dimensional array are arranged along the telescope axis with a distance between the respective pinhole 214 and the respective microlens 210 of the first 2-dimensional array being $f_{m1}$ and a distance between the respective pinhole 214 and the respective microlens 212 of the second 2-dimensional array be $f_{m2}$, wherein $f_{m2} < \gamma \cdot f_{m1}$, with $\gamma < 1$, advantageously $\gamma < 0.9$, most advantageously $\gamma < 0.85$. A downstream facing outer surface 218 of the array of telescopes 216 may comprise an antireflection coating.

In the embodiment of FIG. 15, the beam-homogenizer layer 192 is thus composed of two arrays of lenses 210, 212 and a central array of pinholes 214. The pinholes 214, placed in the focal plane of both lenses 210 and 212, may be cut out of a thin layer of optical absorbing material. Accordingly, the construction of FIG. 15 is similar to the micro-optics beam-homogenizer systems shown in FIGS. 17a-c and 18, but with an additional array of lenses 212. The aperture of each lens 210 corresponds to the aperture of a lens 212 in the downstream array, and to a pinhole 214 centered on the axis 217 between the two lenses 210 and 212. The beam-homogenizer layer 192 thus forms an array of optical telescopic filters. The absorbing layer 220 within which the pinholes 214 are formed eliminate all spatial components, i.e. propagation angles, which in the focal plane fall outside the pinholes 214. The output divergence of this beam-homogenizer layer is, measured in full width, the lowest value between: $f_{m1}/f_{m2}$ times the input half width divergence of the light impinging onto the beam-homogenizer 192, and $\Delta\vartheta \approx \arctan(d_m/2 \cdot f_{m2})$, with $d_m$ being the pinhole diameter of pinholes 214. The image which is formed on the eye of the observer is the image of the focal plane of one single lens 212 of the downstream array. Accordingly, a circular image is given by a circular shape of pinholes 214. Moreover, in case of the presence of the collimating lens 64, the presence of same with the lenses 210 images the primary light source 60 onto the central pinholes 214. Accordingly, similar to the bare collimating lens case as shown in FIGS. 7 and 8, in the eye of an observer the black-when-off illumination device of FIG. 15 images the primary light source 60, which might be clipped by the pinhole aperture 214. Since the light impinging onto the array of lenses 210 from the collimated light source 190 exhibits an initial divergence such as for example at the exit of the collimating lens 64, the focal length $f_{m1}$ and $f_{m2}$ should not be the same. A 1:1 telescope 216 indeed, given an input divergence of the light impinging on a lens of the first array 210, leads to the generation of a spot onto the plane of the second array 212 which is larger than the full aperture of the corresponding lens belonging to such array 212. This case thus leads to the undesired illumination of the neighbor lenses around such corresponding output lens. From geometrical considerations for given input divergence a shorter focal length $f_{m2}$ of the downstream array determines a full illumination of the output aperture of a single lens of array 212 without such effect.

In order to reduce the loss of light at the absorbing layer 220, the pinhole diameter $d_m$ could favorably be chosen according to the divergence of the beam inbound from the collimated light source 190. If the primary source 60, for example, does not exhibit a circular shape there could be loses in correspondence of the pinholes 214. Contrary to the case of the beam-homogenizer layer 192 of FIGS. 13 and 14, the example of FIG. 15 does not require the apertures of lenses 210 to be circular, nor does it require blackening of portions of its input surface. That is, the apertures of lenses 210 may abut each other so as to continuously phase and overlap with the lateral extension of the light front inbound from the collimated light source 190, such as the lateral dimension of collimating lens 64 or the array of such lenses 64 in the case of FIG. 7.

The pinholes 214 in the central absorbing layer 220 may be written by use of a high intensity laser beam focused by the first array of lenses 210 similar to the description of the fabrication process described above with respect to FIGS. 13a-c.

That is, laser printing could be used to form the pinholes of the above micro-optics beam homogenizer layers which relies upon a first realization of a component identical to the disclosed homogenizers apart from the fact that a continuous obscurant layer is deposited on the surface where the pinholes have to be positioned, followed by laser micro fabrication of the pinholes obtained by illuminating the above mentioned component by a suitably collimated laser beam trough the upstream microlens layer, so that the micro-lenses will focus the laser beam at the exact position where the pinholes have to be fabricated, and regulating the exposure time and the beam divergence so that the desired diameter of the pinholes is obtained.

The considerations about pixelation of the output layer of the beam-homogenizer layer of FIGS. 13a-c and 14 also apply in the case of FIG. 15. Accordingly, the aperture of lenses 212 may be smaller than 5 mm, advantageously smaller than 3 mm, most advantageously smaller than 1.5 mm. However, since the final divergence is not related to the ratio between the lens aperture of lenses 210 and 212 on the one hand and the focal length $f_{m1}$ and $f_{m2}$ on the other hand, the focal length $f_{m1}$ and $f_{m2}$ of lenses 210 and 212, respectively, can be of the order of the aperture of the lenses 210 and 212, i.e. much shorter than for the case of the embodiments in FIGS. 13 and 14.

It is noted that in presence of intense stray light in the light beam impinging onto the beam-homogenizer layer 192 at sufficiently large propagation angles, for example larger than $(D_m/f_{m1})-(d_m/(2\ f_{m1}))$ radians, where $D_m$ and $d_m$ are the diameters of the lenses 210 and the pinholes 214, respectively, crosstalk might occur also in the embodiment of FIG. 15 as described for embodiments of FIG. 14. Said crosstalk, originated from light 222 focused by one lens 210 into a pinhole belonging to a neighboring lens 210, may lead to faint replicas of the desired output spot at large propagation angles, which depend on the lens aperture of lenses 210, the focal length $f_{m2}$ and the pinhole diameter $d_m$. The angles at which said faint replicas of the desired output spot might be visible is by far larger for the embodiment of FIG. 15 than FIG. 14, e.g. of the order or 45°, the reason being the much larger value of the ratio between pitch and focal length and thus the much larger angle under which neighboring pinholes are seen by the lens 210 with respect to the lens 194. For the case of the embodiment of FIG. 15 and, for example, for the case of first-order crosstalk, the secondary telescope trough which said crosstalk is preformed (i.e. the telescope formed by an input lens 210 and an output lens which is the second neighbor to the lens 210 positioned in front of the input lens 210) is not able to transmit collimated light. In fact, being the axis of said secondary telescope strongly tilted with respect to direction 32 (e.g. of about 45°, for a typical case of $D_{m=fm1}$), the distance between pinhole 214 and output lens 212 of said secondary telescope is much larger than $f_{m2}$ (e.g. about √2 times larger), whilst the actual focal length of lens 212 in the direction of the secondary-telescope axis is substantially shorter than the nominal value $f_{m2}$ due to the astigmatism caused by the large operating angle. In this circumstance, rays which might eventually exit lens 212 along parallel direction are blocked by the pinhole 214 since said pinhole is far from the actual focus of lens 212 in the direction of the secondary telescope axis. The fact that the secondary telescope is unable to transmit parallel rays prevents the crosstalk form leading to secondary narrow peaks in the luminance profile, i.e. to peaks of comparable width of the peak 30. In other terms, the secondary spot which might be formed due to crosstalk is much more blurred, and therefore much less visible, than primary spot, even in the case of non-collimated light impinging onto the beam-homogenizer layer 192. Higher order cross talk leads to an even larger blurring effect, due to larger telescope-axis angles with respect to direction 32. Therefore the embodiment in FIG. 15 has the advantage of generating a much weaker crosstalk with respect to the embodiment of FIG. 14 as long as the embodiment of FIG. 14 is operated without channel separation structure 200, the price to be played being related to the need of registering the array of lenses 212 with respect to the lenses 210.

In a further embodiment, an array of absorbing tubes, i.e. an absorbing channel separation structure 224, with one absorbing tube per telescope 216, is positioned downstream the array of lenses 210. As for the case of channel separation structure 200 the case of the embodiments of FIGS. 13a-c and 14, said absorbing channel separation structure 224 has the function of stopping crosstalk 222, which however is here much less detrimental than for the previous cases, as just described. The barriers of this absorbing channel separation structure 224 may form a grid in direct contact with lenses 210. Since the ratio between lens diameter and focal length may be much larger for the case of lens 210 in the embodiment in FIG. 15 than for the case of lens 194 in the embodiments in FIGS. 13a and 14, e.g. 3-30 times larger, the aspect ratio of the absorbing channel separation structure 224, i.e. tube length 226 divided by aperture 228 of lenses 210, of the individual tubes of the absorbing channel separation structure 224 could be much lower than in the case of FIGS. 13 and 14, e.g. in the range 0.5-3, thus leading to a much less demanding technological effort.

It is noted that tube length 226 shorter than $f_{m1}$, e.g. 25% shorter than $f_{m1}$ are sufficient for the cross talk removal, as evident from geometrical consideration (see FIG. 15).

For what concerns the characteristics of the light emitted by the outer surface 218 formed by the array of lenses 212 in the embodiment of FIG. 15, and particularly for what concerns the potential problem related to luminance modulation with spatial periodicity equal to the lens 212 pitch, the inventors realized that high uniformity is guaranteed providing that input lenses 210 are uniformly illuminated by the collimated light source 190 and that the ratio $f_{m1}/f_{m2}$ is chosen for properly matching the collimated light source 190 beam divergence, i.e. for achieving light spot onto the lens 212 which matches the lens size. In this case, in fact, the telescopes 216 reproduce onto the surface 218 the (axially reverted) luminance profile featuring the inner surface of lenses 210 but deprived from the large angular component, i.e. do not add a major luminance modulation at the lens pitch. This to say that, even if pitch values less than 5 mm are recommended, higher pitch values are also possible providing that telescopes 216 are suitably designed to match the features of collimated source 190.

For what concerns the appearance of the surface 218 formed by the array of lenses 212 when the collimated source 190 is off, i.e. under external illumination, the inventors noticed that owing to the presence of the absorbing layer 220 and the possible absorbing channel separation structure 224 light rays crossing lenses 212 in the upstream direction are absorbed but those connected to the primary light source 60. This circumstance ensures that light rays crossing lenses 212 in the upstream direction do not produce reflected luminance except for a minor contribution which might arise from reflection by the source 60, which however falls within the narrow peak 30 and therefore does not produce any disturbance. A contribution to reflected luminance may arise from direct reflection by lenses 212. To this end, if large lens 212 aperture is chosen, i.e. larger than 1-3 mm, antireflection coating may be implemented onto the lenses 214 in order to avoid the risk of the occurrence of periodic modulation in the reflected luminance that the eye is able to spot.

All of the above described embodiments for the black-when-off illumination device may be extended by additionally providing the black-when-off illumination device with a low-angle white-light diffuser 230 which has, in so far, shown in FIG. 13a representatively for the other embodiments as well, and represents a device residing within, and positioned within the internal light path of the black-when-off illumination device.

The low-angle white-light diffuser 230 may comprise, for example, a random distribution of micro-refractors, e.g. micro-lenses, micro-voids, micro-prisms, micro-scratches, or a combination of these, formed in an outer surface of a transparent layer material, or a dispersion of transparent microparticles in a transparent bulk material where particles and bulk material experience suitable refractive-index mismatch. That is, in the case of the dispersion of transparent microparticles in a transparent bulk material, a refractive-index mismatch between the transparent microparticles and the transparent bulk material may apply. However, several other embodiments for the white-light diffuser are also possible.

Note that, since light rays impinging onto the low-angle white-light diffuser may experience only small-angle deviation (e.g. smaller than 2.5°), a small-angle white-light diffuser is typically a virtually transparent element according to the definition of transparency taken in the context of the present invention (an element is considered as transparent if light rays crosses the element without experiencing angular deviation larger than 2.5°; see below for details). Accordingly, rays that cross the diffuser suffering a small angle deviation are here considered as transmitted rays (see below for details). However, according to the needed functionality, the small-angle white-light diffuser that is here considered should typically ensure that most of the transmitted rays (e.g. at least 50%, advantageously 70%, most advantageously more than 95%) experience at least some angular deviation (e.g. a deviation of at least 0.5°). In other terms, the diffuser should ensure low regular transmittance (e.g. a regular transmittance lower than 50%, advantageously lower than 30%, most advantageously lower than 5%).

The low-angle white-light diffuser 230 may have the following positive effects onto the direct-light luminance profile L. In particular, a scattering cross section of this white-light diffuser 230 may be set to 2° to 10°. A first scope is to blur any sharp angular peak in L profile, i.e. a peak featured by HWHM less than 1.5°-10°, which might occur outside the narrow peak 30. The scope is here therefore to reduce the visibility of sharp secondary angular peaks in L. To this end the diffuser may be positioned at any plane downstream the plane where said luminance angular peaks are originated. A second scope is to blur and so reduce both luminance value and its spatial derivative caused by bright, spatially localized, spots, and improve spatial uniformity in the luminance profile. To this end the low-angle white-light diffuser should be positioned at a certain distance from the plane where said luminance spots occurs, e.g. the plane of the pinholes 196 in the embodiment of FIG. 13*a*, in order to allow each localized spot to lead to a sufficiently large and so sufficiently weak blurred spot onto the plane. In so doing, the low-angle white-light diffuser causes a blur in the spatial luminance profile wherein (in the case of negligible regular transmittance) a point is blurred into a blurred spot with radius approximately equal to the product of the tangent of the diffuser angular response and the distance between the original-luminance plane and the diffuser. Naturally, the new blurred luminance profile occurs at the diffuser plane. For example, an observer sees a localized spot of original size ds under a luminance reduced by a factor of $\cong \alpha^2$ if a 2.5° HWHM white-light diffuser 230 is positioned downstream said spot at a distance of $\cong \alpha 10 \cdot ds$, wherein a proportionally larger distance may be used for white-light diffusers featured by narrow angular response.

In what follows, a series of different embodiments based on a mirror-lens telescope configuration are presented. These embodiments rely upon the usage of a reflector positioned in the backside of the illumination device in order to fold the light path and so to ensure compact solutions without the need of using any edge-lit diffusers, the application of which is limited to the case of relatively small lighting devices. Surprisingly, conditions are found for which even the implementation of large mirrors facing toward the output light direction 32 does not deteriorate neither the peak-to-contrast background in the luminance profile nor the reflected luminance in presence of ambient light. Please note that for all these mirror-lens telescope configuration embodiments of FIGS. 16*a*-18 it holds true that same are transferable onto a two-dimensional extension thereof, just as FIG. 8 further developed FIG. 7. Moreover, as far as the interrelationship between pin hole illuminated as described herein after and the collimator 16 is concerned, all above statements with regard to elements 60 and 64 of FIG. 7 may also be applied to FIGS. 16*a*-18—either individually or combined. That is, collimator/concentrator 16 of FIGS. 16*a*-18 may be embodied as a Fresnel lens although not specifically noted, the outer (downstream) surface thereof may be anti-reflective, when put together in juxtaposition, the individual concentrators' apertures may abut each other, a homogenizer and/or filter 230 may be used and so forth.

Figure 16A:
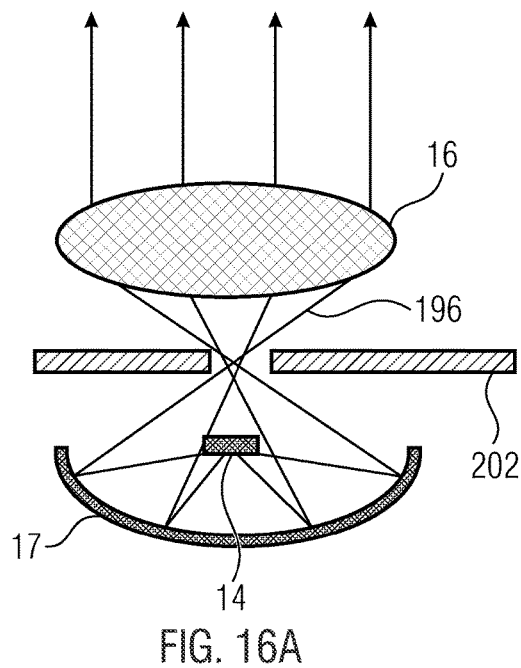
FIG. 16a schematically shows a cross section of a further embodiment of the black-when-off illumination device based on a mirror-lens telescope configuration.

In the embodiment shown in FIG. 16*a* the black-when-off illumination device comprises:
  (i) a collimating lens (16) and a concave reflector (17) positioned upstream of the collimating lens and configured to focus the primary light in order to create a beam waist positioned upstream of the collimating lens; and
  (ii) an absorbing layer (202) perforated by a pin hole (196) and positioned so that the pin-hole is located at the beam waist;

Differently from the case shown in FIG. 10, here the mirror, the source and the lens are aligned on axis, which is relevant for the purpose of minimizing the need of lateral space and so allowing the possibility of positioning several elements one close to the other, for the purpose of increasing the depth effect. Notably, the use of the absorber and the pin hole is here the key element in order to prevent the luminous ambient to be reflected by the mirror, with consequent degradation of said depth effect.

Figure 16B:
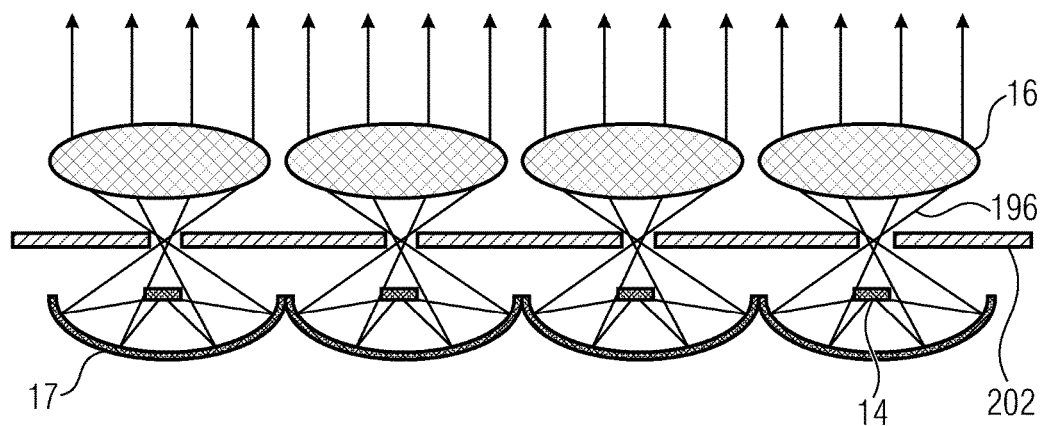
FIG. 16b schematically shows a cross section of a further embodiment of the black-when-off illumination device based on a plurality of mirror-lens telescope configurations.

FIG. 16*b* shows a different embodiment based on mirror-lens telescope configuration, comprising a plurality of triplets of
  a primary light source (14) configured to emit primary light; and
  a concentrator comprising a collimating lens (16) and a concave reflector (17) positioned upstream of the collimating lens and configured to focus the primary light from the primary source in order to create a beam waist upstream of the collimating lens; and
  an absorber comprising an absorbing layer (202) perforated by a pin hole (196) and positioned so that the pin-hole is located at the beam waist,
  wherein the plurality of triplets is positioned in juxtaposition with the collimating lenses and/or the curved reflector of the triplets abutting each other so that the collimating lenses and/or the curved reflector form a joint surface.

As mentioned above, said juxtaposition is not possible, e.g. for the embodiment in FIG. 10, where off-axis condition is implemented due to the absence of the pin hole.

In a certain embodiment based on mirror-lens telescope configuration the pin hole is chosen with a circular shape; this choice facilitates the appearance of a round artificial object at virtually infinite distance. In fact, in order to produce a collimated beam the pin-hole should be positioned at or close to the back-focal plane of the collimating lens, which cause the eyes of the observer focused at the infinity to form on the retina the image of the pin-hole.

In a different embodiment based on mirror-lens telescope configuration the pin hole is configured to transmit at least 85% of the primary light reflected by the curved reflector. In other configurations, the size of the pin hole is chosen so that the area of the pin hole is in the range of 0.5-10 times the area of the beam waist, larger figures being useful when the primary light source does not allow sharp (i.e. flattop) focused beam-waist profile.

Figure 17:
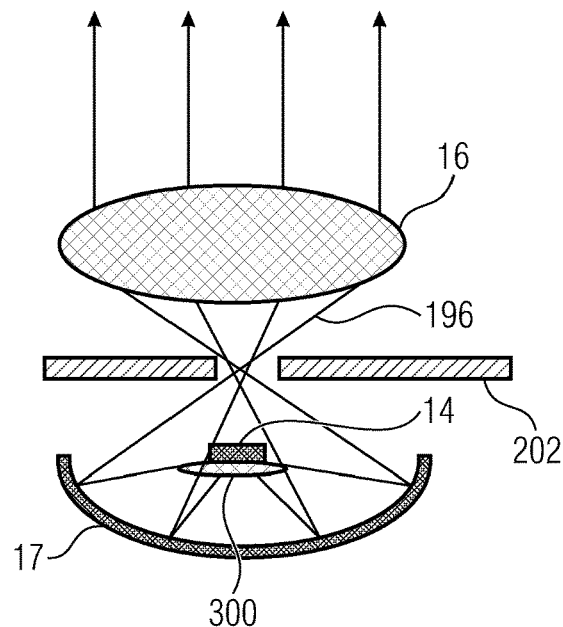
FIG. 17 schematically shows a cross section of a further embodiment of the black-when-off illumination device based on a mirror-lens telescope configuration and including a free-form lens for improving the illumination of the reflector.

In a different embodiment based on mirror-lens telescope configuration a primary collimation optics, e.g. a free-form lens or mirror, is positioned between the primary light source and the curved reflector, with the aim of improving the uniformity of the illuminance downstream and close to the curved reflector. This setting facilitates the achievement of a uniform luminance at the focusing lens output surface. An illustrative embodiment therefore using a free-form lens 300 is shown in FIG. 17.

In a different embodiment based on mirror-lens telescope configuration all the optical components, e.g. the primary light source, the concave reflector, the free-form lens or mirrors, the pin hole and the focusing lens are mutually or individually configured to ensure uniform luminance profile onto the focusing lens output surface, i.e. the emitting surface 28, as well as to ensure minimum transmission and minimum cross talk between adjacent channels when the illumination device operates a number of adjacent triplets.

In a certain embodiment based on mirror-lens telescope configuration the central axis of each reflector coincides with the central axis of the corresponding focusing lens and passes through both the corresponding aperture and primary light source, being parallel to the output light direction 32. This condition, however, is not compulsory since a small lateral displacement of optical components from their ideal position might be useful, e.g. in order to blur the image of possible defects.

With reference to all the embodiments illustrated until here, advantageously, the output light 236 emitted by black-when-off illumination device covers the visible region of the spectrum, that is wavelengths between 400 nm and 700 nm. Advantageously, the spectrum of the output light 236 has a spectral width $\Delta\lambda$ which is larger than 100 nm, more advantageously larger than 200 nm, where the spectral width $\Delta\lambda$ may be defined as the standard deviation of the spectrum of the output light 236.

In accordance with many of the above described embodiments, the black-when-off illumination device further comprises an absorber made of light-absorbing material arranged so that the emitting surface 28 shows a total reflectance factor $\eta_r < 0.4$.

Examples for such absorbers were shown with reference signs 58, 72, 82, 122, 158, 200 and 224. The absorber may be made of light-absorbing material. This light-absorbing material may, although not mentioned every time in the above description, have an absorption coefficient for visible light greater than 95%, although 80% may also suffice. The light-absorbing material may be positioned downstream of the black-when-off illumination device's primary light source, i.e. 14, 46, 60, 114, 138, 150, where the term "downstream" is then defined to follow the light propagation direction including light-bending at reflectors such as in the case of FIGS. 9, 10 and 11. On the other hand, the light-absorbing material is positioned upstream of the emitting surface 28 and the low-angle white-light diffuser 230 (if present). To be more precise, thus positioned, the light-absorbing material is configured to substantially absorb light rays which cross the black-when-off illumination device's emitting surface 28 in an upstream direction and which in the absence of the absorber would not be directed toward the black-when-off illumination device's first light source.

In many of the above described embodiments, for example, the artificial illumination device comprises a light concentrator being an optical element positioned downstream the primary light source of the black-when-off illumination device and configured to reduce the divergence of the primary light generated by the primary light source. In the above embodiments, the light concentrator was embodied, for example, as a lens 16, 48, 64, 130 (such as dome lens, Fresnel lens, or microlens), a wedge-shaped lightguide 80 coupled to light exit layer 84, a reflective light concentrator 17, 108, 112, 113, 140, 152, but in general the light concentrator may be any refractive, reflective (including total internal reflective), diffractive optical component or any system comprising a plurality of such optical components. In that case, the absorber has its light-absorbing material positioned such that the absorber substantially absorbs light rays which cross the black-when-off illumination device emitting surface 28 in the upstream/reverse direction and are redirected by the light concentrator toward somewhere else than the primary light source of the black-when-off illumination device, where the term "substantially" may mean that at least 70%, advantageously 90%, or more advantageously 95% of such light rays may be absorbed. To this end the absorber is made of a light absorbing material which absorbs at least 70%, advantageously 90%, or more advantageously 95% of the impinging visible light. In this circumstance, the absorber substantially contributes in reducing the amount of stray light in the output light 236, i.e. the amount of light generated by the black-when-off illumination device out of the narrow peak 30. In fact, it is noticed that such an embodiment guarantees for the black-when-off illumination device a black appearance when off for observation directions departing from direction 32 of an angle larger than the angle width of the narrow peak 30. In other terms, the embodiment ensures that, under external illumination and when the black-when-off illumination device is off, the emitting surface 28 may re-emit light only from those directions under which the bright spot is seen when the black-when-off illumination device is on. Moreover, such an embodiment ensures that light rays originated by the emitter which are scattered or reflected by the concentrator or by other components of the device 1001 positioned downstream the emitter and which in the absence of the absorber would not be ascribable to the collimated light beam exiting the emitting surface 28 are absorbed.

Summarizing the above, specific embodiments have been described as well as the thoughts underlying the same. In particular, FIGS. 4 to 10 and 11a to 17 concentrated on different exemplary implementations for the black-when-off illumination device. These embodiments have in common that the black-when-off illumination device comprises a primary light source which is embodied in element 14, 46, 60, 114, 138, 150, respectively. This primary light source is configured to emit, i.e. actively generate, primary light 62. It might be an LED, an incandescent lamp, a fluorescent lamp, or a metal halide lamp or some other light source. Further, the black-when-off illumination device comprises an emitting surface 28 positioned downstream the primary light source. In particular, as described above, the black-when-off illumination device produces from the primary light 62 the output light 236 such that the latter exits the emitting surface 28 with a luminance profile which is uniform across the emitting surface 28 and has a narrow peak 30 in the angular distribution around the output-light direction 32 and has a low background for observation directions corresponding to polar angle outside the narrow peak.

Figure 18:
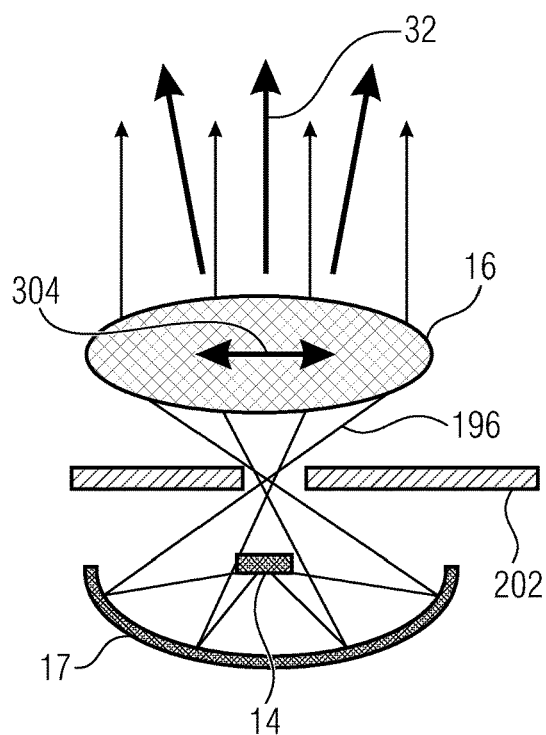
FIG. 18 schematically shows a cross section of a further embodiment of the black-when-off illumination device, here with adjustable output-light direction.

FIG. 18 exemplarily shows using the embodiment of FIG. 16a as a basis that the illumination device according to any of the above embodiments may comprise an actuator for causing a tilting of the output-light direction 32. FIG. 18, for example, illustrates that the actuator causes a lateral movement of lens 16 with respect to pinhole 196, thereby causing a tilting of the optical axis and the output-light direction 32, respectively. Needless to say that the actuator may, alternatively, move the absorbing layer 202 along with the primary light-emitting element 14 and the concentrator 17 laterally with respect to collimating lens 16. Using the embodiment of FIG. 16a as a basis is, however, merely an example. Any of the above-outlined embodiments may be modified by use of an actuator configured to, when activated, tilt the output-light direction 32 relative to the light-emitting surface such as, for example, by causing a lateral relative movement between concentrator and primary light source.

Moreover, although it has already been outlined above, it is explicitly stated again here that all of the above-described embodiments for an illumination device could be used for synthesizing the light of an object at a very far distance other than the sun such as, for example, the moon. In the latter embodiments, no diffuser may have to be positioned downstream the illumination device. Especially, no Rayleigh scattering characteristics need to be present. Rather, the illumination device would generate a rather black background surrounding the spot representing the moon if the user directly looks onto the illumination device.

With reference to all the embodiments illustrated until here, it is worth mentioning that the black-when-off illumination device according to the present invention is ideal for providing not only a faithful reproduction of the appearance of the infinite-distance object and of the illumination produced by the infinite-distance object, but also of the appearance and of the illumination produced by the combined action of the infinite-distance object and the surrounding background. To this end black-when-off illumination device might be combined, for example, with a transparent skylight emitter, shaped e.g. as a panel, or a film, or a plate, i.e. with a layer which emits bluish diffused light while preserving the transmission of the low-divergence light from the black-when-off illumination device and so the vision of the virtual image of the artificial sun as an example of the object at infinite distance.

With this respect an application of the present invention refers to artificial illumination device for reproducing the natural light of the sun and the sky, comprising a black-when-off illumination-device according any of previous embodiments and a layer of a Rayleigh-like scattering material which advantageously scatters the short-wavelength components of the impinging radiation with respect to the long-wavelength components, wherein said layer of Rayleigh-like scattering material is positioned downstream the black-when-off illumination-device.

Alternatively or additionally, a further embodiment for realizing an artificial illumination device for reproducing the natural light of the infinite-distance object and the surrounding background comprises a black-when-off illumination-device according any of previous embodiments and an edge-lit diffusing panel lit by a secondary primary light source with Correlated Color Temperature (CCT) at least 1.2 times larger than a CCT of the primary light source, advantageously 1.5 times larger, more advantageously 1.7 times larger, wherein said edge-lit diffusing panel is positioned downstream the black-when-off illumination-device.

It should be further noted that some derivations of the above mentioned embodiments are further feasible. For example, above-outlined characteristics of the luminance profile are interpreted to be sufficiently met as long as an observer 38 (cp. FIG. 3) sees, when looking towards the emitting surface 28, a bright spot 40 which, when the observer 38 moves relative to the emitting surface 28, moves relative to the emitting surface as if the bright spot stemmed from an object positioned at infinity. This implies that above-outlined embodiments also reveal an illumination device for synthesizing light from an object at virtually infinite distance, comprising a plurality such as a two- or one-dimensional array, of pairs of a primary light source element such as 60 configured to emit a primary light 62; and a concentrator element such as 64 configured to collimate the primary light into the direction 32; and an emitting surface 28 positioned downstream the concentrators; and an absorber such as 72 made of light-absorbing material positioned upstream the emitting surface 28 and configured to absorb light rays which cross the emitting surface 28 in an upstream direction and which, in the absence of the absorber would not be directed toward the primary light source; wherein the primary light source and the concentrator of the plrality of pairs, the emitting surface and the absorber are configured so that they produce from the primary light 62 an output light 236 that exits the emitting surface 28 along the output-light direction 32 so that an observer 38 sees, when looking towards the emitting surface 28, a bright spot 40 which, when the observer moves relative to the light-emitting surface, moves relative to the emitting surface 28 as if the bright spot 40 stemmed from an object positioned at infinity. Alternatively, the above embodiments revealed, inter alias, an illumination device for synthesizing light from an object at virtually infinite distance, comprising a plurality, such as a two- or one-dimensional array, of triplets of a primary light source element 14 configured to emit primary light; and a collimating lens 16 and a concave reflector 17 both having the primary light source element positioned therebetween and configured to focus the primary light from the primary source element in order to create a beam waist upstream of the collimating lens; and a pin hole 196 in an absorbing layer 202, the pin hole in an absorbing layer, positioned so that the pin-hole is located at the beam waist, an emitting surface 28 positioned downstream the collimating lenses; wherein the primary light source element, the collimating lens and the concave reflector of the plurality of triplets, the emitting surface and the absorbing layer are configured so that they produce from the primary light 62 the output light 236 accordingly.

Note that the fact that the spot/sun which, when the observer moves relative to the light-emitting surface, moves relative to the emitting surface as if the bright spot stemmed from an object positioned at infinity, also entails that the "width" w of the emitting surface 28 which defines the "window" through which the viewer 38 feels to view, is greater than the spot/sun such as, for example, for a target distance d of the viewer's eyes from the emitting surface as large as 0.5 m (i.e. in the range 0-0.5 m), advantageously as large as 1 m, more advantageously as large as 3 m The latter distances stem for typical application sceneries of artificial illumination devices of embodiments of the present invention. In fact, if installed in the ceiling, considering that (i) typical ceiling heights are in the range 2.4-3.5 meters, (ii) typical height of a person is in the range 1.2 (considering children) to 1.9 m, and (iii) acceptable angles for the direct-light direction 32 with respect to the horizontal direction are in the range 45°-90° (in order to prevent the glare occurring when the light source is lower on the horizon), it emerges that, for an observer looking into the beam formed by the an output light 236 (the "sun" or "moon"beam), the typical maximum distance of the eyes from the emitting surface ranges from 0.5 m (low ceiling, vertical light, tall observer) to 3 m (high ceiling, 45° light, child observer). In the case of window-like, wall-type, application, closer distances are possible (up to contact) whilst larger figures are virtually prevented, the height of the emitting surface with respect to the floor being inherently lower for the wall than for the ceiling case.

In other terms, independently from the specific application, there is a typical maximum distance from which the device can be observed by an observer looking into the "sun beam" (i.e. the light beam travelling along the output-light direction 32). The condition for the emitting surface of being greater than the perceived width of the spot/sun has to be fulfilled up to device-observer distance as large as said typical maximum distance. Note that, since the observer perceives the spot/sun under a given angle of view, the relative size of the perceived spot/sun with respect to the size of the emitting surface naturally increases with the increase of the distance of the observer from the emitting surface, as it happens for the case of the real sun seen through a real window. However, said distance cannot arbitrarily increase, for the reasons mentioned above.

Further, the fact that the spot/sun which, when the observer moves relative to the emitting surface, moves relative to the emitting surface as if the bright spot stemmed from an object positioned at infinity, also entails that when the viewer sees the artificial illumination device from a direction so that the "spot/sun" has "left" the emitting surface, either no light or merely a diffuse background such as the sky in the latter alternative, is visible.

In even other words, divergence angle being defined, for example, as the HWHM and being smaller, for example, than 2.5°, 1.5° or 0.5° should be smaller than the "view angle" of the artificial illumination device, i.e. the half-width angular aperture at which the device—to be more precise, the light-emitting surface—is typically seen from viewers that are standing with theirs eyes under the beam formed by the luminaire (the "sun beam"). Applying above exemplary distances, the view angle $\theta_{view}$ may be defined as the half width angular aperture for viewer's eyes at some distance d such as 0.5, 1 or 3 meter distance from the emitting surface with the viewer concurrently seeing sun and sky. For example, the view angle of the device (i.e. the angle under which an observer standing into the "sun beam" sees the light-emitting surface) may be selected to be greater than X times the divergence angle of the output light 236 with X being e.g. between 2-3, both inclusively, and the divergence angle being defined, for example, as the HWHM. In other words, the half width divergence may be smaller than X times the half width view angle at the respective maximum distance, i.e. $\theta_{HWHM} < X \cdot \theta_{view}$, wherein X may be, for example, 2, 3, or 4. For example, the width of the light-emitting surface could be set to be larger than 2 times the product of: (i) 2 times the tangent the divergence angle, and (ii) 0.5 m, 1 m or 3 m, with 0.5 m, 1 m or 3 m being chosen to be a typical maximum distance between viewer and artificial illumination device. For example, assuming a device featured by a divergence angle of 2.5°, the minimum width of the emitting surface should be about 8 cm, 16 cm or 48 cm (for the selected maximum distances of 0.5 m, 1 m or 3 m, respectively). This implies that an observer at some distance such as 0.5 m, 2 m or 3 m will see the object within the light-emitting surface of the luminaire, moving when the viewer moves.

It should be briefly noted that, in case of different "widths" of the emitting surface depending on the lateral direction inspected, same may, for example, denote the minimum width, i.e. in case of a rectangular shape of the emitting surface the shorter side length.

Some interesting features of above embodiments are summarized below:

The presence of stray light should be reduced as far as possible. This issue of stray light may arise, for example, when using Fresnel lenses due to the imperfection of the Fresnel lenses. Such stray light may cause the lens to be seen and perceived as a physical object, thereby attracting the viewer's attention. Possible counter measures have been described above such as the use of the absorber, the pin holes and the micro-optics beam-homogenizer layer 192.

In particular, for preventing the just-outlined stray light effect to occur above embodiments revealed: (i) an antireflection coating of the Fresnel lens; (ii) a beam homogenizer made as a tandem lens array, which smears the luminance peaks at large angles over a broad angular domain, thus bringing the said stray light luminance below the luminance of the sky; (iii) a angularly selective filter which absorbs the undesired stray light occurring at angles over some threshold; (iv) the low angle white light diffuser, which (on average) produces a convolution of the angular spectrum with the filter impulse-response function; any combination of the means of above. Note that aliasing effect can be due to the beating in the periodicity of the Fresnel lens, which has radial symmetry, with the periodicity of any of these homogenizer settings.

The just-mentioned aliasing effect may be reduced by appropriately selecting the ratio of periodicities of the Fresnel and homogenizer micro-milli structure.

In the aim of maximizing light uniformity the implementation of a free-form optical element between the primary light source and the lens, as well as the combined design of free-form and Fresnel lens profile, can be appropriately selected.

A further problem of using a Fresnel, as well as of any refractive element, concerns the chromatic aberration. With this respect, one can address special design of the Fresnel (e.g. which comprises both refractive and diffractive patterns, which have chromatic aberration of the opposite sign) which minimize this effect. In addition or in alternative, one can consider to position downstream the lens a low-angle diffuser which washes out the aberration, which typically occurs over 1 deg, by means of the convolution of above Again for the implementing the natural effect, the Fresnel lens should, as described above, not be round but square or better hexagonal and abutting each other, to cover the full area.

Although not mentioned before, in each light-emitting-device/concentrator pair, the collimators' 64 aperture may be greater than 300 cm². The array size of the array of pairs may be greater than 4×4. Further, in order to suppress the ambient reflections, a downstream-facing outer surface of the pairs' collimators may comprise an anti-reflection coating. The illumination device may further comprise an angularly selective filter configured to absorb light divergent relative to the output-light direction by more than a predetermined threshold, for example to absorb the light which departs from the output-light direction 32 by more than 2°, advantageously more than 1°. As to the collimators/concentrators of the emitter/collimator pairs, it should be noted that same do not have to be implemented by a single component, respectively. Rather they may each be composed of a combination of two lenses, serially connected to each other, for example, or a combination of a concave mirror and lens. The combination, thus formed, may be described as an "effective collimator" having, for example, an effective focal length. The optical axis of the emitter/collimator pairs need not to coincide with the direct-light direction, or differently speaking, the optical axis may be bend somewhere. For example, ray bending elements such as mirrors, phase plates, wedge-shaped prisms or the like may result in bending the optical path between the first light-emitting device and the collimator in each pair, within the collimator of each pair or at the downstream side of the collimators. When using freeform lens or reflective CPC as described above, the distance between collimator and light-emitting device in each emitter/collimator pair may differ from a focal length. Moreover, due to optical path bending as described, the geometric arrangement of light-emitting device and collimator may differ from a serial arrangement along the output-light direction.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus comprising:
   an array of light sources configured to produce a plurality of primary diverging light beams extending generally along a light emitting direction, each light source having an extent in a direction perpendicular to the light emitting direction;
   an array of collimators, with each collimator positioned downstream of a light source, wherein the array of collimators is configured to reduce a divergence of the primary diverging light beam to thereby form an array of collimated light beams configured to have a luminance with a peak in the polar-angle distribution along the light-emitting direction, the peak having an average half width at half maximum less than 10°;
   an emitting surface that extends along x and y directions and is defined by the collimated light beams being uniformly and adjacently packed across the emitting surface, wherein an output beam is formed from the collimated light beams at the emitting surface that exits the emitting surface along an output-light direction, the emitting surface providing an output light that forms a virtual image at infinite distance; and
   an array of absorbers between the emitting surface and the light source array, each of the absorbers including a light absorbing material and being configured to absorb ambient light that crosses the emitting surface apart from ambient light that returns to the respective light source.

2. The apparatus according to claim 1, wherein:
   a peak of a luminance of the output light at the emitting surface comprises an average half-width at half maximum value less than 5°; and
   the luminance outside the peak is lower than 10% of a maximum value $L_{max}$ for any polar angle greater than 3 times the average half-width at half maximum value.

3. The apparatus according to claim 1, wherein the emitting surface comprises a total reflectance factor $\eta_r \leq 0.4$.

4. The apparatus according to claim 1, wherein each collimator is positioned at its focal length from a respective primary light source along an optical axis which coincides with the output-light direction.

5. The apparatus according to claim 4, wherein
   each absorber includes a dark box, the dark box comprising an aperture where the respective collimator is positioned.

6. The apparatus according to claim 5, wherein the internal surface of each dark box is formed by a light-absorbing material and the light-absorbing material comprises an absorption coefficient for visible light greater than 90%.

7. The apparatus according to claim 4, further comprising a plurality of freeform optical elements, each freeform optical element associated with a primary light source and configured to flatten an illuminance distribution of the primary light onto the collimator, wherein the freeform optical element includes a lens or a reflective collimator.

8. The apparatus according to claim 4, wherein each light source comprises a circular aperture.

9. The apparatus according to claim 1, wherein:
   the collimators are positioned so that they abut each other so that the array of collimators form a joint surface.

10. An artificial illumination device comprising an apparatus according to claim 1 and a Rayleigh scattering panel which is configured to scatter short-wavelength components of the impinging radiation with respect to the long-wavelength components, wherein said Rayleigh scattering panel is positioned downstream the apparatus.

11. A system made-up of a plurality of the apparatuses according to claim 1, wherein the apparatuses are arranged relative to each other so that the directions of the output light from the apparatuses are the same.

12. The apparatus of claim 1, wherein the light sources in the light source array are identical to each other and the collimators in the collimator array are identical to each other such that the array of collimated light beams is an array of substantially identical collimated light beams.

13. The apparatus of claim 1, wherein the array of light sources includes a two-dimensional array of light sources that extends along a plane that is parallel with the x and y directions, the array of collimators is a two-dimensional array that extends along a plane that is parallel with the x and y directions, with each collimator aligning with a respective light source and offset in the z direction from the respective light source.

14. The apparatus of claim 1, wherein each light source includes a light emitting diode having an extent in a direction perpendicular to the light emitting direction that is less than or equal to 3 millimeters (mm).

15. The apparatus of claim 1, wherein a pitch of the array of light sources is less than or equal to 3 mm.

16. The apparatus of claim 1, wherein each collimator includes a lens or a Fresnel lens.

17. The apparatus of claim 1, wherein each collimator is antireflection coated.

18. An artificial illumination device comprising:
an apparatus according to claim 1, and
an edge-lit diffusing panel lit by a secondary light source having a correlated color temperature (CCT) that is at least 1.2 times larger than a CCT of the light sources, wherein the edge-lit diffusing panel is positioned downstream the apparatus.

19. The apparatus of claim 1, wherein each collimator has a focal length that is at least ten times as large as the extent of the respective light source.

20. The apparatus of claim 1, wherein the array of absorbers comprises a black sheet having an array of pin holes.

21. The apparatus of claim 1, wherein the output light from the emitting surface has a luminance that:
varies in a portion of the emitting surface by less than 50% of an average value calculated over the portion of the emitting surface with respect to the output-light direction,
is substantially independent of an azimuthal direction measured relative to the output-light direction, and
has a dark background for observation directions corresponding to a polar angle outside the peak.

22. An illumination device for synthesizing light, the illumination device comprising:
a collimated light source comprising:
a plurality of primary light sources configured to emit primary light; and
a plurality of collimators, each collimator being associated with a primary light source, each collimator comprising a collimating lens and a concave reflector;
wherein each primary light source is positioned between a collimating lens and a concave reflector;
wherein the concave reflector is configured to focus the primary light from the primary light source in order to create a beam waist upstream of the collimating lens;
an absorbing layer comprising a plurality of pin holes, each pin hole positioned at the beam waist of primary light;
an emitting surface positioned downstream the collimated light source; and
wherein the plurality of the primary light sources and the collimators, the emitting surface, and the absorbing layer are configured so that they produce from the primary light an output light that exits the emitting surface along the output-light direction so that a bright spot is visible when viewing the output light exiting the emitting surface, and the bright spot moves relative to the emitting surface when the output light is viewed at different locations as if the bright spot stemmed from an object positioned at infinity.

23. The illumination device according to claim 22, wherein:
each pin hole exhibits a circular shape.

24. The illumination device according to claim 22, wherein each pin hole is configured to transmit at least 85% of the primary light that reaches the pin hole after being reflected by the respective curved reflector.

25. The illumination device according to claim 22, wherein the pin hole comprises an area in the range of 0.5-10 times the area of the beam waist.

26. The illumination device according to claim 22, further comprising a primary collimation optics positioned between the primary light source and the curved reflector.

27. The illumination device according to claim 26, wherein the primary collimation optics is configured to tailor the angular distribution of the primary light in order to flatten the illuminance distribution on a surface downstream and close to the concave reflector.

28. The illumination device according to claim 22, wherein:
the central axis of each concave reflector coincides with the central axis of the corresponding collimating lens and passes through both the corresponding aperture and primary light source, being parallel to the output light direction.

29. A method comprising:
producing output light that forms a virtual image at infinite distance from an emitting surface that extends along x and y directions, the output light exiting the emitting surface along an output-light direction, wherein producing the output light comprises:
producing a two-dimensional array of primary light beams;
collimating each of the primary light beams to form an array of collimated light beams that are uniformly and adjacently packed across the emitting surface and form the output light at the emitting surface;
for each collimated light beam formed from a corresponding primary light beam, absorbing ambient light that crosses the emitting surface in an upstream direction, wherein ambient light is light not produced by the primary light beams; and
reducing ambient light from being reflected from the emitting surface into a downstream direction;
such that the output light has a luminance:
that varies in a portion of the emitting surface by less than 50% of an average value calculated over at least the portion of the emitting surface with respect to the output-light direction,
that is substantially independent of an azimuthal direction measured relative to the output-light direction,
that has a peak in the polar-angle distribution along the output-light direction, the peak having an average half width at half maximum less than 10°, and
that has a dark background for observation directions corresponding to a polar angle outside the peak.

30. The method of claim 29, further comprising, for each collimated light beam formed from a corresponding primary light beam, absorbing scattered primary light produced from other primary light beams that would otherwise cross into the collimated light beam.

31. The method of claim 29, further comprising, for each primary light beam, flattening an illuminance distribution of the primary light beam at the point at which the primary light beam is collimated.

32. The method of claim 29, further comprising:
transforming each collimated light beam into a collimated light beam free of stray light; and
diffusing the output light.

33. The method of claim 29, wherein absorbing, for each collimated light beam formed from the corresponding primary light beam, the ambient light that crosses the emitting surface in an upstream direction comprises separating the paths of the collimated light beams in the array to thereby reduce crosstalk effects between neighboring collimated light beam paths.

* * * * *